(12) United States Patent
Bierenbaum

(10) Patent No.: US 6,961,708 B1
(45) Date of Patent: Nov. 1, 2005

(54) EXTERNAL INTERFACE FOR REQUESTING DATA FROM REMOTE SYSTEMS IN A GENERIC FASHION

(75) Inventor: Steven E. Bierenbaum, Winter Park, FL (US)

(73) Assignee: Computer Sciences Corporation, Austin, TX (US)

( * ) Notice: Subject to any disclaimer, the term of this patent is extended or adjusted under 35 U.S.C. 154(b) by 802 days.

(21) Appl. No.: 09/648,655

(22) Filed: Aug. 25, 2000

Related U.S. Application Data

(60) Provisional application No. 60/151,253, filed on Aug. 27, 1999.

(51) Int. Cl.[7] .............................................. G06F 17/60
(52) U.S. Cl. ............................ 705/8; 707/104; 345/866
(58) Field of Search ........... 705/8–9, 35; 707/100–104; 345/734–745, 866; 709/200–217

(56) References Cited

U.S. PATENT DOCUMENTS

| | | | |
|---|---|---|---|
| 4,878,167 A | 10/1989 | Kapulka et al. | |
| 5,099,422 A | 3/1992 | Foresman et al. | |
| 5,191,522 A | 3/1993 | Bosco et al. | |
| 5,201,044 A | 4/1993 | Frey, Jr. et al. | |
| 5,233,513 A | 8/1993 | Doyle ........................ | 354/401 |
| 5,386,566 A | 1/1995 | Hamanaka et al. | |
| 5,394,555 A | 2/1995 | Hunter et al. | |
| 5,434,994 A | 7/1995 | Shaheen et al. | |

(Continued)

FOREIGN PATENT DOCUMENTS

| | | | |
|---|---|---|---|
| EP | 0 280 773 | 9/1988 | |
| EP | 0 465 018 | 1/1992 | |
| EP | 0 926 608 | 6/1999 | |
| JP | 09237181 A | * 9/1997 | ............. G06F/9/06 |

OTHER PUBLICATIONS

Steyer, "The World Bank's Open Network", Datamation, v36, n4, p109 (3), Feb. 15, 1990, ISSN: 1062–8363.*
Continuum Connections, vol. I, No. 1, The Continuum Company, Inc., Nov. 1991, 16 pages.

(Continued)

*Primary Examiner*—James P. Trammell
*Assistant Examiner*—Mary Cheung
(74) *Attorney, Agent, or Firm*—Meyertons, Hood, Kivlin, Kowert & Goetzel, P.C.; Eric B. Meyertons

(57) ABSTRACT

A system, method and carrier medium for communicating between a Financial Service Organization (FSO) computer system and a computer system external to the FSO in a generic fashion. For each direction of a message (i.e., outbound from the FSO computer system or inbound to the FSO computer system), two templates are constructed and subsequently stored in a database. The first type of template is the message template; the second type of template is the message layout template. The outbound message template represents outbound messages; the inbound message template represents inbound messages. The outbound message layout template represents outbound message layouts; the inbound message layout template represents inbound message layouts. An outbound message represents a request for FSO data from an external computer system to be used in a FSO computer system for processing a FSO transaction between a FSO and a FSO customer. An inbound message represents a receipt of FSO data from an external computer system to be used in the FSO computer system for processing a FSO transaction between a FSO and a FSO customer. The corresponding message layouts represent graphical presentations of the outbound and inbound messages. A strategy design template represents a process for processing the FSO transaction between the FSO and the FSO customer. A first channel template represents a first channel wherein the first channel represents a means for transmitting data to and from the external computer system.

28 Claims, 36 Drawing Sheets

U.S. PATENT DOCUMENTS

| | | | |
|---|---|---|---|
| 5,455,947 A | | 10/1995 | Suzuki et al. |
| 5,483,632 A | | 1/1996 | Kuwamoto et al. |
| 5,499,330 A | | 3/1996 | Lucas et al. |
| 5,504,674 A | | 4/1996 | Chen et al. |
| 5,523,942 A | | 6/1996 | Tyler et al. |
| 5,530,861 A | * | 6/1996 | Diamant et al. ............ 395/650 |
| 5,550,976 A | | 8/1996 | Henderson et al. |
| 5,586,310 A | | 12/1996 | Sharman |
| 5,630,069 A | | 5/1997 | Flores et al. |
| 5,638,508 A | | 6/1997 | Kanai et al. |
| 5,689,706 A | | 11/1997 | Rao et al. |
| 5,699,527 A | | 12/1997 | Davidson |
| 5,745,901 A | | 4/1998 | Entner et al. |
| 5,764,989 A | | 6/1998 | Gustafsson et al. |
| 5,768,505 A | | 6/1998 | Gilchrist et al. |
| 5,768,506 A | | 6/1998 | Randell |
| 5,787,412 A | | 7/1998 | Bosch et al. |
| 5,797,134 A | | 8/1998 | McMillan et al. |
| 5,832,481 A | | 11/1998 | Sheffield |
| 5,870,711 A | | 2/1999 | Huffman |
| 5,873,066 A | | 2/1999 | Underwood et al. |
| 5,878,403 A | | 3/1999 | DeFrancesco et al. |
| 5,900,870 A | * | 5/1999 | Malone et al. .............. 345/333 |
| 5,907,848 A | | 5/1999 | Zaiken et al. |
| 5,909,683 A | | 6/1999 | Miginiac et al. |
| 5,928,082 A | | 7/1999 | Clapper, Jr. |
| 5,930,759 A | | 7/1999 | Moore et al. |
| 5,930,776 A | | 7/1999 | Dykstra et al. |
| 5,933,816 A | | 8/1999 | Zeanah et al. |
| 5,937,189 A | | 8/1999 | Branson et al. |
| 5,950,169 A | | 9/1999 | Borghesi et al. |
| 5,987,434 A | | 11/1999 | Libman |
| 5,991,733 A | | 11/1999 | Aleia et al. |
| 6,023,572 A | | 2/2000 | Lautzenheiser et al. |
| 6,023,578 A | | 2/2000 | Birsan et al. |
| 6,035,300 A | | 3/2000 | Cason et al. |
| 6,038,393 A | | 3/2000 | Iyengar et al. .............. 395/701 |
| 6,049,665 A | | 4/2000 | Branson et al. |
| 6,061,057 A | * | 5/2000 | Knowlton et al. .......... 345/335 |
| 6,064,983 A | | 5/2000 | Koehler |
| 6,081,832 A | | 6/2000 | Gilchrist et al. |
| 6,092,049 A | | 7/2000 | Chislenko et al. |
| 6,105,007 A | | 8/2000 | Norris |
| 6,115,690 A | | 9/2000 | Wong |
| 6,119,103 A | | 9/2000 | Basch et al. |
| 6,122,627 A | | 9/2000 | Carey et al. |
| 6,134,582 A | | 10/2000 | Kennedy |
| 6,134,706 A | | 10/2000 | Carey et al. |
| 6,163,770 A | | 12/2000 | Gamble et al. |
| 6,167,564 A | | 12/2000 | Fontana et al. |
| 6,185,540 B1 | | 2/2001 | Schreitmueller et al. |
| 6,226,623 B1 | | 5/2001 | Schein et al. |
| 6,236,975 B1 | | 5/2001 | Boe et al. |
| 6,336,096 B1 | | 1/2002 | Jernberg |
| 6,347,307 B1 | | 2/2002 | Sandhu et al. |
| 6,381,640 B1 | | 4/2002 | Beck et al. |
| 6,434,590 B1 | | 8/2002 | Blelloch et al. |
| 6,505,176 B2 | | 1/2003 | DeFrancesco, Jr. et al. |
| 6,591,300 B1 | | 7/2003 | Yurkovic |
| 6,601,034 B1 | | 7/2003 | Honarvar et al. |
| 6,604,114 B1 | | 8/2003 | Toong et al. |

OTHER PUBLICATIONS

Continuum Connections, vol. I, No. 2, The Continuum Company, Inc., Jan./Feb. 1992, 17 pages.
Continuum Connections, vol. I, No. 3, The Continuum Company, Inc., Mar./Apr. 1992, 16 pages.
Continuum Connections, vol. I, No. 4, The Continuum Company, Inc., Jul./Aug. 1992, 15 pages.
Continuum Connections, vol. II, No. 1, The Continuum Company, Inc., Oct./Nov. 1992, 16 pages.
Continuum Connections, vol. II, No. 2, The Continuum Company, Inc., Dec./Jan. 1993, 24 pages.
Continuum Connections, vol. II, No. 3, The Continuum Company, Inc., Mar./Apr. 1993, 16 pages.
Continuum Connections, vol. II, No. 4, The Continuum Company, Inc., Jul./Aug. 1993, 16 pages.
Continuum Connections, vol. II, No. 5, The Continuum Company, Inc., Nov./Dec. 1993, 20 pages.
Continuum Connections, vol. II, No. 6, The Continuum Company, Inc., Jan./Feb. 1994, 19 pages.
Continuum Connections, vol. III, No. 1, The Continuum Company, Inc., Mar./Apr. 1994, 24 pages.
Continuum Connections, vol. III, No. 2, The Continuum Company, Inc., Nov./Dec. 1994, 20 pages.
Continuum Connections, vol. III, No. 3, The Continuum Company, Inc., Mar./Apr. 1995, 16 pages.
Continuum Connections to the Americas, vol. 1, No. 1, The Continuum Company, Inc., Sep. 1995, 49 pages.
Continuum Connections, vol. III, No. 4, The Continuum Company, Inc., Oct./Nov. 1995, 24 pages.
Continuum Connections to the Americas, vol. 2, No. 1, The Continuum Company, Inc., Jan. 1996, 59 pages.
Continuum Connections to the Americas, vol. 2, No. 2, The Continuum Company, Inc., Mar. 1996, 59 pages.
Continuum Connections to the Americas, vol. 2, No. 3, The Continuum Company, Inc., May 1996, 51 pages.
Continuum Connections to the Americas, vol. 2, No. 4, The Continuum Company, Inc., Jul. 1996, 55 pages.
Continuum Connections to the Americas, vol. 2, No. 5, The Continuum Company, Inc., Sep. 1996, 59 pages.
Connections to the Americas, vol. 3, No. 1, CSC Continuum, Jan. 1997, 55 pages.
Connections to the Americas, vol. 3, No. 2, CSC Continuum, Feb. 1997, 55 pages.
Connections to the Americas, vol. 3, No. 3, CSC Continuum, Mar. 1997, 48 pages.
Connections to the Americas, vol. 3, No. 4, CSC Continuum, Apr. 1997, 40 pages.
Connections to the Americas, vol. 3, No. 5, Computer Sciences Corporation, May/Jun. 1997, 66 pages.
Connections to the Americas, vol. 3, No. 6, Computer Sciences Corporation, Jul./Aug. 1997, 56 pages.
Connections to the Americas, vol. 3, No. 7, Computer Sciences Corporation, Sep./Oct. 1997, 76 pages.
Connections to the Americas, vol. 4, No. 1, Computer Sciences Corporation, Jan. 1998, 64 pages.
Connections to the Americas, vol. 4, No. 2, Computer Sciences Corporation, Feb./Mar. 1998, 50 pages.
Connections to the Americas, vol. 4, No. 3, Computer Sciences Corporation, May/Jun. 1998, 48 pages.
Connections to the Americas, vol. 4, No. 4, Computer Sciences Corporation, Sep./Oct. 1998, 62 pages.
Insurance Connections, Computer Sciences Corporation, Feb./Mar. 1999, 52 pages.
Banking Connections, Computer Sciences Corporation, Apr./May 1999, 44 pages.
Insurance Connections, Computer Sciences Corporation, Jun./Jul. 1999, 56 pages.
Banking Connections, Computer Sciences Corporation, Aug./Sep. 1999, 52 pages.
Insurance Connections, Computer Sciences Corporation, Oct./Nov. 1999, 56 pages.

Cost Containment: Products and Solutions for the Property and Casualty Insurance Industry, Computer Sciences Corporation, Oct. 1999, 40 pages.

Banking Connections, Computer Sciences Corporation, Dec. 1999, 48 pages.

Insurance Connections, Computer Sciences Corporation, Feb./Mar. 2000, 60 pages.

Banking Connections, Computer Sciences Corporation, Apr./May 2000, 48 pages.

Insurance Connections, Computer Sciences Corporation, Jun./Jul. 2000, 43 pages.

Insurance Connections, Computer Sciences Corporation, Sep./Oct. 2000, 43 pages.

Banking Connections, Computer Sciences Corporation, Nov./Dec. 2000, 48 pages.

"@ Fault A Commitment to Consistency," Computer Sciences Corporation, Copyright 2000, pp. 1–2.

Borland, Russel; "Running Microsoft Outlook 97," Microsoft Press, 1997.

Deitel & Deitel, C++ How to Program, 1998, Prentice Hall.

Fabrik A Visual Programming Environment, 1998, ACM Inc.

Introduction to Visual Basic 5.0 Programming, Last Updated 1999, printed from http://www.dcs.napier.ac.uk/hci/VB50/home.html.

Juhl, Randy P., "The OTC Revolution"; Drugtopics.com; Mar. 3, 1997.

Mead, Jay, "Technical Communication", Aug. 1998, V. 45, N. 3.

Programmer's Guide Microsoft Visual Basic, 1992, Microsoft.

Scopus and Entrust Technologies to Deliver World's First Secure Customer Care Solution for the Financial Services Market; PR Newswire dated Nov. 5, 1997.

"Enterprise Customer Acquisition: CSC Assessment Solutions" CSC Brochure, 1998.

Corrano, Helman, Veroff, Data Abstraction And Problem Solving With C++, 1998 Addison Wesley Longman, Inc.

Basic Aspect Of Squeak And The Smalltalk–80 Programming Language, Jun. 22, 1998.

Scopus and Entrust: Call Center Sales Helper is Unveiled; American Banker, Nov. 10, 1997, vol. 162, Issue 217.

U.S. Appl. No. 09/648,929.

U.S. Appl. No. 09/648,912.

U.S. Appl. No. 09/648,246.

* cited by examiner

EXTERNAL INTERFACE FOR REQUESTING DATA FROM REMOTE SYSTEMS IN A GENERIC FASHION

This application claims the benefit of U.S. Provisional Application No. 60/151,253 entitled "External Interface For Requesting Data From Remote Systems In A Generic Fashion," filed Aug. 27, 1999.

BACKGROUND OF THE INVENTION

1. Field of the Invention

The present invention generally relates to computer software programs for use in Financial Service Organizations (FSO). More particularly, the present invention relates to a system for communicating between a FSO computer system and a computer system external to the FSO.

2. Description of the Related Art

FSOs such as banks, credit unions, insurance companies, mutual fund companies, credit card companies, brokerage houses, etc., market many types of financial products to their existing or potential customers, such as savings accounts, brokerage accounts, commercial loans, mortgage loans, auto loans, personal loans, and credit cards. To acquire a credit product, for example, a customer of an FSO is typically required to submit an application for the credit product. The FSO then follows an application processing procedure for the credit product to determine whether the application is approved or rejected.

The application procedure may include such steps as gathering financial related information of the customer applying for the credit product, requesting credit reports on the customer, and scoring the credit product application to determine if the customer's credit product application is to be approved or rejected. This application procedure is typically referred to as account acquisition.

Another function of a FSO is the management of existing FSO credit products. Part of this function is tracking the status of a customer's credit products such as loans and credit cards to determine if the customer's payments on a credit product or products are delinquent. If the customer is delinquent in payments to a credit product for more than a certain period of time, typically 30 days, the customer may be submitted to a collections process in an attempt to resolve the customer's delinquency status. The collections process may involve many steps, such as an FSO representative calling the customer, sending delinquency notices to the customer, contacting an attorney or collections agency for funds collection, or repossession of property used to secure the credit product. The process of attempting to resolve delinquent customer accounts may be called account collections.

Account acquisition and account collections computer software programs are used in FSOs to implement account acquisition and account collection. These software programs are typically executed on mainframe-based computer systems. Collectively, these software programs executing on mainframe-based computer systems may be referred to as customer credit systems. Being mainframe-based, customer credit systems are centralized, typically with a mainframe computer including the software and databases located at a central computing center, and user workstations for accessing the software and databases distributed among local and remote offices. These workstations are typically computer terminals, or in some cases microcomputers running terminal emulation software. Mainframe-based customer credit systems are not easily scalable. If the demands on a mainframe-based customer credit system outgrow the processing, storage, or workstation support capacity of the mainframe computer, the only recourse may be to replace the existing mainframe with a new, more powerful mainframe. As mainframe systems cost from the hundreds of thousands to millions of dollars, upgrading can be very expensive. Further, downtime associated with the rollover to a new system with a larger mainframe may be disruptive to the account acquisition and account collection operations of the FSO.

Data such as credit product applications may be entered into existing customer credit systems by file access. File access involves copying files into the mainframe computer's memory or disk storage for processing by the customer credit system software. The formats of files to be read into the customer credit system are hard-coded into the system. As used herein, "hard-coded" indicates behavior that is inserted directly into a program, where it cannot be easily modified without the intervention of a computer programmer to make code changes, re-compile, and test the changes. Thus, all files copied into the mainframe for processing by the system must be in a fixed, correct format. Data may also be entered at a workstation by filling in fields on a computer screen presented on the workstation by the customer credit system. An example of data entered at a workstation is a loan application. The format and contents of an application displayed on a workstation, including titles and labels on fields, are hard-coded in the customer credit system.

Some FSO customer credit systems for implementing account acquisition and collection are static in that each customer application for product or each customer with a delinquent account is treated the same regardless of whether the customer is a new customer or an existing customer or whether the customer has an extensive and good credit history. Static account acquisition processes follow a preprogrammed, linear, fixed series of steps for all customers applying for the loan. For example, a long-term customer of a bank may apply for a credit card. The bank's customer credit system follows a fixed series of steps for all customers applying for the credit card, the first step of which is to request a full credit report from an external agency. The bank may have to pay for the credit report. If the customer has a large savings account, maintains a significant balance in a checking account, has little outstanding debt with the bank, and has a spotless credit history with the bank, it may not be necessary to request a credit report from an external agency before approving the credit card. However, since all customers are processed the same, a credit report will be requested for the customer. The same is true for the collections process. All customers entered into an account collections process in a customer credit system follow a preprogrammed, linear, fixed series of steps attempting to resolve a delinquency status.

The fixed linear hierarchy of steps in existing customer credit systems often result in redundant data entry. For example, one or more steps in the process may be to get a customer's credit history. Notwithstanding the existence of this data in the FSO's customer database, one or more of the steps require access to an external source to retrieve the same information.

Processing steps are programmed into existing customer credit system's software during the system's development. Data such as values used in approving or declining a credit product applications, time limits in the collections process, and screen formats to be presented at workstations are hard-coded into the software during the system's development. This makes customer credit systems inflexible and difficult to modify, limiting the adaptability of the systems to changing business environments. The process to modify a customer credit system typically requires the following steps: officers of the FSO determining the changes to be made to the system; communicating the changes to the Information Technology department of the FSO; systems analysts in the Information Technology department creating software design and specification documents; a team of software engineers modifying and compiling source code based upon the design and specification documents; database analysts modifying databases to meet the new specifications; testing and verification of the modified system, and; operations personnel replacing the customer credit system production system. This modification process is time-consuming and expensive, and may take months or even years to complete. Some desired changes may be lost or modified in the process of transferring the desired changes from business officers to source code changes. Business requirements may change during the modification process, requiring either a delay in the modification process so that new requirements can be added, or starting a new modification process overlapping the modification process in progress.

Existing customer credit systems are mainframe-based and are therefore not easily scalable. It is therefore desirable to provide a customer credit system that is easily scalable to meet increased processing demands in a financial service organization. Modifying existing customer credit systems to meet changing business needs is a long process requiring many steps, including code changes by programmers that may have limited business knowledge in the customer credit marketplace. It is therefore desirable to provide a customer credit system that may be modified quickly and easily by business officers that understand the customer credit marketplace and know what changes need to be made to address changes in the marketplace. All customers are treated the same in an existing customer credit system, regardless of the customers' current or previous history with the FSO. It is therefore desirable to provide a customer-centric customer credit system that may be tailored to handle customer transactions dynamically, allowing different customer credit strategies to be applied to customers with distinctly different credit profiles.

Current customer credit system software is usually designed in one system (e.g., a word processing program) and later implemented in computer programming languages in yet another system. This makes it difficult to visualize the credit product processing actually implemented in the customer credit system software. It is therefore desirable to provide an integrated, graphical design and implementation process to better visualize and understand the credit product processing implemented in the system. Current customer credit system software also does not provide a way to model the business structure of a FSO. It is therefore desirable to provide a modeling tool for describing the business structure of a FSO, and for describing the credit product processing relationships among the organizational units in the FSO. It is also desirable to provide a method for adapting a customer credit system to a variety of credit products, including developing custom documents such as product applications and correspondence and developing custom product processing strategies, without a lengthy design and coding process.

SUMMARY OF THE INVENTION

A system, method and carrier medium for communicating between a Financial Service Organization (FSO) computer system and a computer system external to the FSO in a generic fashion. For each direction of a message (i.e., outbound from the FSO computer system or inbound to the FSO computer system), two templates are constructed and subsequently stored in a database.

The first type of template is the message template; the second type of template is the message layout template. The outbound message template represents outbound messages; the inbound message template represents inbound messages. The outbound message layout template represents outbound message layouts; the inbound message layout template represents inbound message layouts.

An outbound message represents a request for financial service organization data from an external computer system to be used in a financial service organization computer system for processing a financial service organization transaction between a financial service organization and a financial service organization customer. A list of outbound data elements may be displayed on a display screen wherein each outbound data element when contained in an outbound message is configured to be sent to the external computer system by the financial service organization computer system. A user may select outbound data elements from the list. Once selected, an outbound data element may then be added to the outbound message template, and stored in a database.

Similarly, an inbound message represents a receipt of financial service organization data from an external computer system to be used in the financial service organization computer system for processing a financial service organization transaction between a financial service organization and a financial service organization customer. A list of inbound data elements may be displayed on a display screen wherein each inbound data element when contained in an inbound message is configured to be received from the external computer system by the financial service organization computer system. A user may select inbound data elements from the list. Once selected, an inbound data element may then be added to the inbound message template, and stored in a database.

An outbound message layout represents a graphical presentation of the outbound message. A list of outbound data elements may be displayed on a display screen. A user may select outbound data elements from the list and place them in (or add them to) the outbound message layout template. For example, a user may choose to arrange the outbound data elements according to the frequency of their use. The outbound message layout template may then be stored in a database.

An inbound message layout represents a graphical presentation of the inbound message. A list of inbound data elements may be displayed on a display screen. A user may select inbound data elements from the list and place them in (or add them to) the inbound message layout template. The inbound message layout template may then be stored in a database.

A strategy design template represents a process for processing the financial service organization transaction between the financial service organization and the financial service organization customer. The process may include a plurality of tasks, wherein the tasks are executed in a sequential order. The strategy design template may be stored in the database after the selected first task is added to the strategy design template.

A first channel template represents a first channel wherein the first channel represents a means for transmitting data to and from the external computer system. The first channel is configured for transmitting data between the financial service organization computer system and the external computer system that stores the financial service organization data. A first translator may be specified on the first channel template. The first translator when contained in the first channel is configured to convert the first outbound message template to a format recognizable to the external computer system and to convert the first inbound message template to a format recognizable to the financial service organization computer system. A first queue handler may be specified on the first channel template. The first queue handler when contained in the first channel is configured to move translated messages between a financial service organization computer system queue and an external computer system queue. The first channel template may be stored in the database after the first translator and the first queue handler are specified on the first channel template.

Figure 1A:
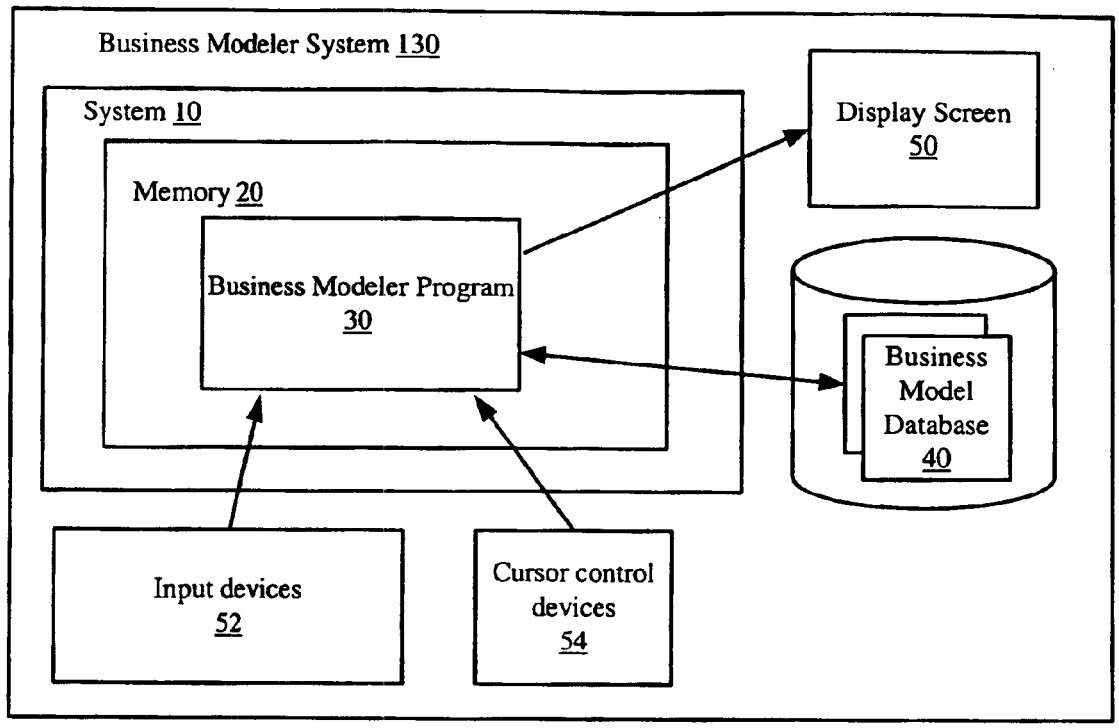
FIG. 1a is a block diagram illustrating the architecture of one embodiment of a business modeler system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims.

DETAILED DESCRIPTION OF SEVERAL EMBODIMENTS

The term "computer system" as used herein generally describes the hardware and software components that in combination allow the execution of computer programs. The computer programs may be implemented in software, hardware, or a combination of software and hardware. A computer system's hardware generally includes a processor, memory media, and Input/Output (I/O) devices. As used herein, the term "processor" generally describes the logic circuitry that responds to and processes the basic instructions that operate a computer system. The term "memory" is used synonymously with "memory medium" herein. The term "memory medium" is intended to include an installation medium, e.g., a CD-ROM, or floppy disks, a volatile computer system memory such as DRAM, SRAM, EDO RAM, Rambus RAM, etc., or a non-volatile memory such as optical storage or a magnetic medium, e.g., a hard drive. The memory medium may include other types of memory as well, or combinations thereof. In addition, the memory medium-may be located in a first computer in which the programs are executed, or may be located in a second different computer which connects to the first computer over a network. In the latter instance, the second computer provides the program instructions to the first computer for execution. Also, the computer system may take various forms, including a personal computer system, mainframe computer system, workstation, network appliance, Internet appliance, personal digital assistant (PDA), television system or other device. In general, the term "computer system" can be broadly defined to encompass any device having a processor which executes instructions from a memory medium.

The memory medium preferably stores a software program or programs for process and document management (PDM) for directing and managing transactions as described herein. The software program(s) may be implemented in any of various ways, including procedure-based techniques, component-based techniques, and/or object-oriented techniques, among others. For example, the software program may be implemented using ActiveX controls, C++ objects, JavaBeans, Microsoft Foundation Classes (MFC), or other technologies or methodologies, as desired. A CPU, such as the host CPU, executing code and data from the memory medium includes a means for creating and executing the software program or programs according to the methods, flowcharts, and/or block diagrams described below.

A computer system's software generally includes at least one operating system such as Windows NT available from Microsoft Corporation, a specialized software program that manages and provides services to other software programs on the computer system. Software may also include one or more programs to perform various tasks on the computer system and various forms of data to be used by the operating system or other programs on the computer system. The data may include but are not limited to databases, text files, and, graphics files. A computer system's software generally is stored in non-volatile memory or on an installation medium. A program may be copied into a volatile memory when running on the computer system. Data may be read into volatile memory as the data is required by a program.

A server may be defined as a computer program that, when executed, provides services to other computer programs executing in the same or other computer systems. The computer system on which a server program is executing may also be referred to as a server, though it may contain a number of server and client programs. In the client/server model, a server is a program that awaits and fulfills requests from client programs in the same or other computer systems.

As used herein, a Financial Service Organization (FSO) is a business organization that provides credit products, such as loans and credit cards, to customers. Examples of FSOs include, but are not limited to: banks and credit unions. A FSO may include one or more organizational units. Examples of organizational units include, but are not limited to: main offices, divisions, regional offices, and branch offices.

As used herein, a FSO business product transaction may be defined as a service of a FSO. Examples of business product transactions include, but are not limited to: financial transactions such as deposits, withdrawals, loan application servicing, and credit card application servicing. Business product transactions may also include services related to previously issued financial products such as loans and credit cards. The services may include collection of payments, including delinquent payments, by the financial institution or an agent thereof from a customer who previously obtained a financial product.

As used herein, a FSO production system is a series of instructions executed by a computer system for processing a FSO's business product transactions. A production system may include multiple processing tasks. As used herein, a processing task may be defined as a sequence of one or more atomic transactions, or processing steps, associated with the business product transaction to be processed by the production system. As used herein, an atomic transaction may be defined as a sequence of information exchange and related work that is treated as a unit for the purposes of satisfying a production system business product transaction request and for ensuring data integrity in the production system. Examples of atomic transactions may include reading a value from a database, updating a field in a database, and filling in a field on a form on a computer screen.

As used herein, a FSO business modeler is a computer system configured to allow an officer of the FSO who is not necessarily an information technology professional to graphically or otherwise create a business model of the FSO which may then be easily implemented in a production system. In this application, a business model may be defined as a computer representation of the business structure of a FSO and the business relationships among organizational units that make up the FSO. One relationship among the elements of a FSO is the hierarchical relationship among the organizational units used for reporting. For example, a business model may include a relationship with a main office, one or more divisions under the main office, and one or more branch offices under the divisional offices. A second relationship among the elements of a FSO is the processing flow for a credit product or service. The processing flow relationship may differ significantly from the reporting relationship. For example, a branch office may receive an application for a credit card and may forward the application to a divisional office for assignment. The divisional office may evaluate the credit card application, decide the applicant is too high-risk for the division, and forward the application to another division specializing in high-risk, high-interest-rate credit cards.

The elements of a FSO are represented by business model objects. In this application, a business model object may be defined as a computer data structure representing a business element. A business model object may include a number of properties that define the business model object. A business model object may also include other business model objects. Business model objects may be representations of real-world features of businesses. Examples of types of business features that a business model object may represent include, but are not limited to: business entities such as divisions, offices, positions in the company, and employees; business products such as loan applications and correspondence; interfaces to external business organizations; work tasks such as calculations, decisions, and assignment to organizational units; temporal objects such as calendars, schedulers, and timers; and elemental data necessary to accomplish work tasks such as interest rates, risk factors, and loan limits. There may be several types of business model objects. Examples of types of business model objects include, but are not limited to: root or desktop, organizational unit, product, processing task, assignment map, strategy map, external interface, data element, user, queue, and job seat. A business model object may be represented on the computer screen by a graphical icon or by a display listing the properties of the business model object in graphic and alphanumeric format.

Organizational unit objects represent offices or functional business units of a FSO, such as headquarters, divisional offices, and branch offices. Scheduler objects-may be used to hold a business product transaction for future processing; for example, in a collections process, a letter may be sent to a customer expecting a response within 30 days. A scheduler object may be used to hold further processing of the business product pending a user response or the expiration of the 30-day period.

A business model may be constructed by defining the business model objects that represent the elements of a FSO and arranging the business model objects in a relationship that represents the FSO from an organizational viewpoint. This relationship may be called a "business relationship" or "inheritance relationship." The relationship among business model objects may be described as a hierarchical tree structure. The business model objects on the tree may be referred to as "nodes" on the tree. The tree may be viewed as an inverted tree, with a root object as the highest level node in the tree. All business model objects added under the root object may be descendents of the root object. The root object may be an ancestor of all business model objects in the tree. A business model object that is included in another business model object may be called a child of the business model object. A business model object that includes another business model object may be called a parent of the included business model object. Business model objects that are included in the same parent object may be called sibling objects.

The relationships of the business model objects are governed by the rules of inheritance and reference. If a child object is of the same type as the parent object, it may inherit the properties of the parent object and of ancestors of the parent object. For example, if a parent object includes a "Name" property set to "Main Office" and a "City" property set to "New York," a child object of the parent object may inherit the "Name" property set to "Main Office" and the "City" property set to "New York". Child objects may override properties inherited from a parent object. In the example above, the child object may override the "Name" property with a value of "West Branch Office".

A business model object may be able to reference other business model objects in the tree. If a business model object references another business model object, the referenced business model object, or a property thereof, may be included as a property of the referencing business model object. For example, a business model object in the tree may be able to reference a sibling business model object in the tree, and thus have access to the properties of the sibling business model object.

In one embodiment, for definition and display purposes, business model objects may be represented as icons in a business model design window. An object name may be displayed next to an icon. The business model object icons may be displayed in a hierarchical order in the business model design window representing the hierarchical tree relationship described above. When a business model object icon is selected, properties and child objects of the selected business model object may be displayed.

A second relationship may be created among business model objects created in a business view relationship as described above. The second relationship may be called a process flow map. A process flow map may be a representation of how a business product transaction is processed in an organization. Each organizational unit object may include at least one assignment map object and at least one strategy map object. An assignment map object may be configured to gather information for the business product transaction and to assign the business product transaction to an appropriate strategy map object. An assignment map object may be created by adding a number of processing task objects to an assignment map and linking the processing task objects in the order in which business product transactions will proceed through the assignment map object. Each processing task object may include one entry point for business product transactions and one or more exit points for the business product transactions. Each exit point on a processing task object is linked to one entry point on another processing task object. One processing task object may serve as the starting point for business product transactions in the assignment map. If, during the processing of a business product transaction, an assignment map determines the business product transaction should be processed by another organizational unit, the business product transaction may be sent to the appropriate organizational unit object through a "send to organizational unit" task object. The receiving organizational unit object may then start processing the received business product transaction at the starting point task of an assignment map object included in the receiving organizational unit object.

If, during processing of a business product transaction, an assignment map determines the current organizational unit should process the business product transaction, an appropriate strategy map object may be selected and the business product transaction may be sent to the selected strategy map object through a "send to strategy map object" task object.

A strategy map object may be configured to gather and evaluate data for the business product transaction and to automatically make decisions about the business product transaction. A strategy map object may be created by adding a number of processing task objects to a strategy map and linking the processing task objects in the order in which business product transactions will proceed through the strategy map object. Each processing task object may include one entry point for business product transactions and one or more exit points for the business product transactions. Each exit point on a processing task object is linked to one entry point on another processing task object. One processing task object may serve as the starting point for business product transactions in the strategy map. If, during the processing of a business product transaction, a strategy map determines the business product transaction cannot be automatically processed and requires human intervention, the business product transaction may be added to a queue of business product transactions to be manually processed through a "send to queue" task object. A FSO employee working at a client system may then iterate through the business product transactions and resolve the transactions as necessary.

An organizational unit may have a master assignment map object, where all business product transactions initially enter the processing map for the organizational unit. A product object may also have an assignment map object that may route a business product transaction to the appropriate organizational unit or strategy for processing. A product object may be used to model a FSO product, such as a credit card, auto loan, or mortgage loan. Product objects may exist as child objects of organizational units.

FIG. 1a: A block Diagram Illustrating the Architecture of One Embodiment of a Business Modeler System In FIG. 1a, an embodiment of a business modeler system 130 may include a computer system 10, a display screen 50 connected to the computer system, and a business model database 40 residing on external storage. System 10 includes memory 20 configured to store computer programs for execution on system 10, and a central processing unit (not shown) configured to execute instructions of computer programs residing on system 10. Business modeler program 30 may be stored in memory 20. Upon startup, business modeler program 30 may access business model database 40, use the contents of business model database 40 to construct a business model in memory, and may display a representation of the business model on display screen 50. A user may view the representation of the business model on display screen 50, and may make modifications, additions, and deletions to the business model. System 10 may also include one or more user input devices 52 such as a keyboard for entering data and commands into business model program 30 and one or more cursor control devices 54 such as a mouse for using a cursor to modify a business model viewed on display screen 50. In response to the updating of the business model, business modeler program 30 may convert the business model to a business model database format and store the updated business model in business model database 40.

Figure 1B:
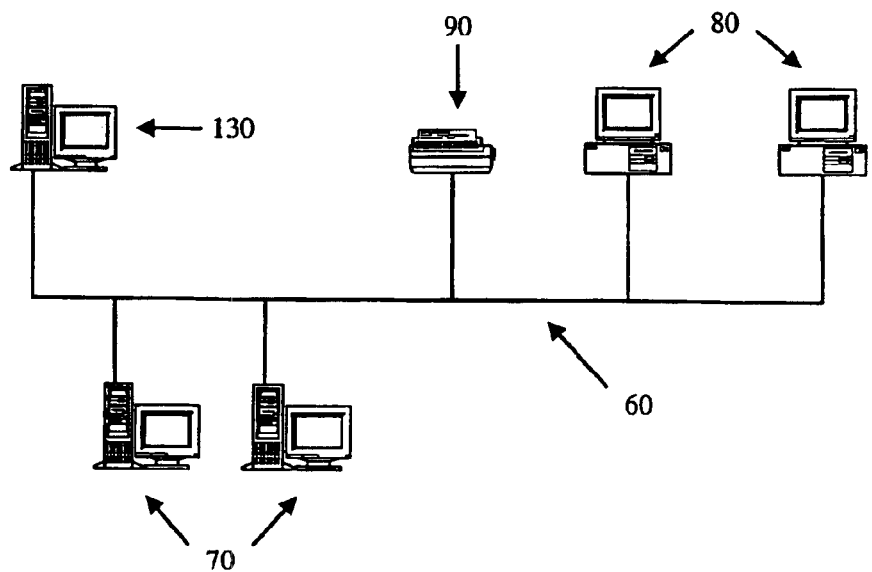
FIG. 1b illustrates one embodiment of a financial service organization business product transaction processing system with a business modeler system, a production system, and user systems in the network.

FIG. 1b: One Embodiment of a FSO Business Product Transaction Processing System

FIG. 1b illustrates one embodiment of a FSO business product transaction processing system. In this embodiment, the system is shown as a client/server system with the server systems and client systems connected by a network 60. Network 60 may be a local area network or wide area network, and may include communications links including, but not limited to: Ethernet, token ring, Internet, satellite and modem. One or more production system servers 70 may be connected to network 60. The production system software and production system database may be distributed among the one or more production system servers 70 to provide a distributed processing system for business product transactions. In other words, a business product transaction being processed by the production system may be routed to a production server based upon the workload distribution among servers 70 at the time of the transaction. Production system servers 70 may be located on a local area network or may be geographically dispersed in a wide area network.

Business modeler system 130 may also be connected to network 60. Business modeler system 130 may also be a server in the client-server system. Business modeler system 130 may include a business modeler program and a business model database as illustrated in FIG. 1a. Business modeler system 130 may be accessed directly or may be accessed from production system servers 70 and client systems 80.

One or more client systems 80 may also be connected to network 60. Client systems 80 may reside at one or more organizational units within the FSO. In a wide area network, client systems 80 may be geographically dispersed. Client systems 80 may be used to access production system servers 70 and business modeler system 130. A FSO employee may use a client system 80 to access a queue of business product transactions in the production system for manually processing business product transactions that the production system has determined cannot be automatically processed. An employee may also use a client system 80 to enter business product transactions into a production system. An example of a business product transaction that may be entered by an employee at a client system 80 is a credit card application. Some employees of the FSO may also be given security access to business modeler system 130. Examples of tasks an employee may perform on a client system 80 include, but are not limited to: defining or modifying business models, defining or modifying assignment and strategy maps, and applying updated business models to the production system. One or more printers 90 may also be connected to network 60 for printing documents associated with business product transactions.

Figure 2:
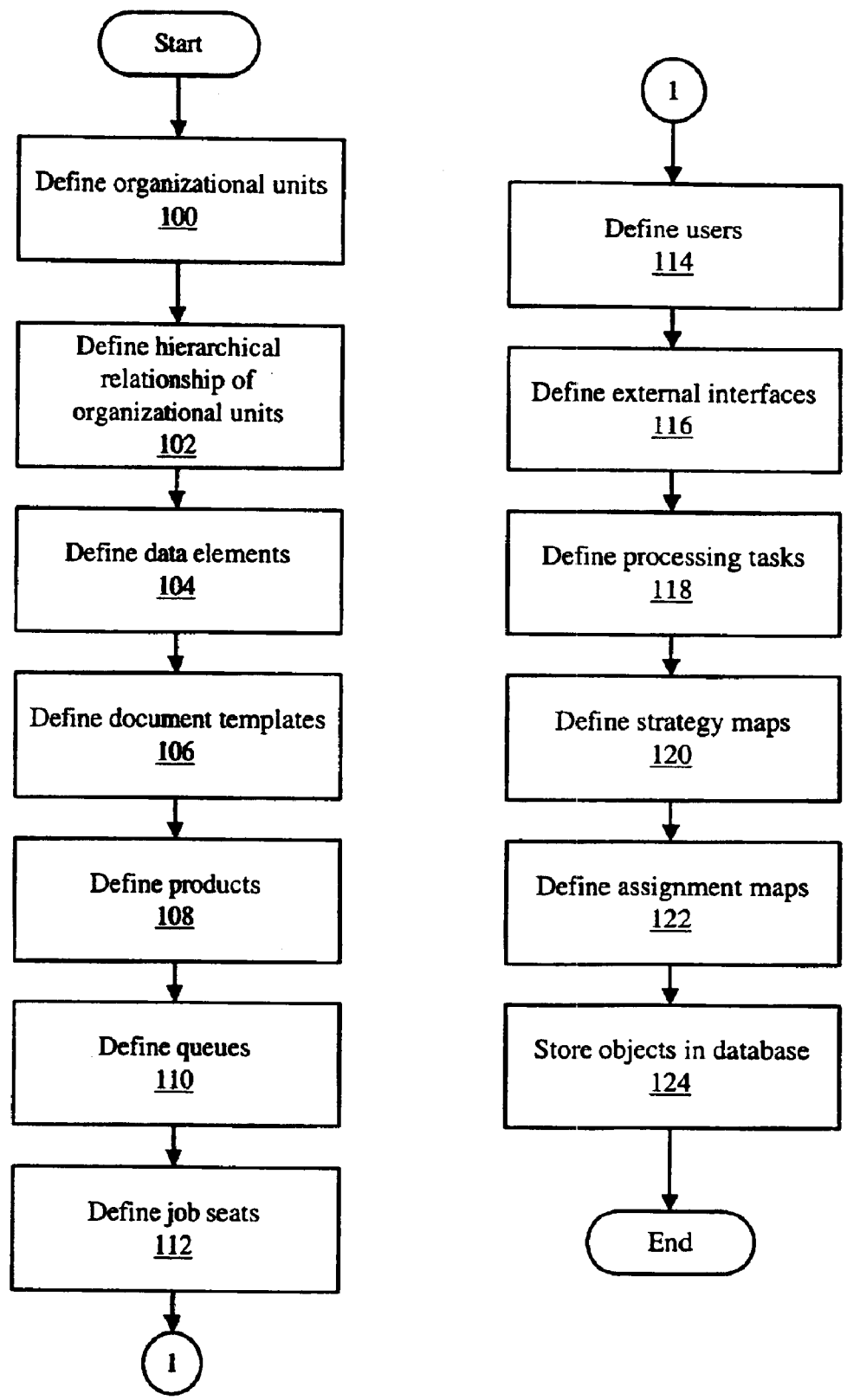
FIG. 2 is a flow diagram illustrating an example of the business model design process using one embodiment of a business modeler system.

FIG. 2: A Flow Diagram Illustrating an Example of the Business Model Design Process Using One Embodiment of a Business Modeler System FIG. 2 illustrates an example of a business model design process in one embodiment of a business modeler system. In step 100, the organizational units making up the real-world business to be modeled are identified, and an object representing each organizational unit may be created and initialized with the properties of the organizational unit, such as name, address, and contact persons. In step 102, a hierarchical relationship among the organizational units may be established. The hierarchical relationship among organizational units may be established by the location of the organizational units in the hierarchical tree structure. An organizational unit object created directly below another organizational unit object may report to the higher organizational unit. For example, a main office may be created as the highest organizational unit in the hierarchical tree structure, a division office reporting to the main office may be created in the main office organizational unit, and a branch office reporting to the division office may be created in the division office organizational unit.

Data element objects may be defined in step 104. Data element objects are the smallest pieces of information in the business model. Data element objects may represent alphanumeric and numeric items such as customer name, customer address, interest rates, loan terms, dates and risk factors. Data element objects may include properties such as data type, display parameters, and storage parameters. Data types may include, but are not limited to: alphanumeric string, character, date, real number, and integral number. Display parameters may include, but are not limited to: display width. Storage parameters may include, but are not limited to: numerical value precision and storage width. Data elements may be given a default value or may be empty until initialized in a production system.

In step 106, document template objects may be defined. Document templates may be computer representations of paper documents from a customer file used in the FSO. Document templates may include one or more data elements as fields in the template, and may include graphical objects such as pictures and icons. Examples of documents modeled by document templates include, but are not limited to: loan applications, credit card applications, and correspondence letters. In a production system, the fields on a document template may be automatically filled in by the production system, the document may be presented on a computer screen to an employee of the FSO or to a customer who may manually enter data in the fields on the document, or fields in the document may be filled with data retrieved from an external data source via an external interface. Examples of uses of a document in a production system include, but are not limited to: forwarding the document to another organizational unit, printing and mailing the document to a customer of the FSO, and electronically archiving the document in the customer's files in a FSO customer database.

In step 108, products of the FSO may be defined as product objects. Product objects may be defined for account acquisition systems. Examples of products include, but are not limited to: consumer finance products such as mortgages, auto loans, and credit cards. Properties of products may include, but are not limited to: product name, interest rates, terms, duration, and payment schedules. A product may have one or more associated document templates that serve as customer applications for the product. A product may also be associated with one or more assignment objects and strategy objects that combine to define the processing flow for a customer application for the product.

In step 110, queues may be defined. Queue objects may be used in strategy objects. A queue object may receive work packets representing business product customer transactions and present the transactions for manual intervention. Work packets may include one or more electronic documents, defined in step 106, related to the customer transaction. Associated with queue objects are job seats. Job seat objects may be created in step 112. Job seat objects represent employee positions in the business organization. A job seat object may be associated with one or more queue objects. User objects may be created in step 114. User objects may include properties defining an employee's name and security access rights. User objects may grant employees security access to the business modeler system and to the production system. User objects may be granted security access to "occupy" job seats. In a production system, an employee may use an assigned user object to occupy a job seat and to manually process queued work packets presented on a workstation computer screen. Documents from the work packet may be displayed on the screen, and the employee may have security access from the user object to view, modify, or act upon the customer transaction.

At step 116, external interfaces may be defined. External interfaces may allow the production system to send information from data elements to external systems and organizations, and to receive information from external systems and organizations and store the information in data elements. An external interface may include a channel object specifying the electronic communications channel on which the information is to be sent and received. Channels may include any electronic communications channel suitable for transmitting or receiving data on the production system. An external interface may also be associated with one or more documents for displaying the data elements to be transmitted and for displaying received data elements.

Processing task objects may be defined at step 118. Processing tasks are used in assignment maps and strategy maps. Processing tasks perform operations on work packets. Examples of operations that may be performed on work packets include, but are not limited to: adding documents to a work packet, modifying data elements in the documents, performing calculations with data elements, making decisions based upon data elements, invoking external interfaces, sending work packets to queues, and sending work packets to other organizational units.

In step 120, strategy maps may be defined for the organizational units. A strategy map may be created by adding one or more processing tasks to the strategy map and connecting the processing tasks in a non-linear flow from a first processing task to one or more end processing tasks. Work packet exit nodes on a processing task may be connected to work packet entry points on other processing tasks. A work packet may begin at the first processing task, proceed through a series of processing tasks, and end at an end processing task. End processing tasks for strategy maps may include assign to queue tasks and end processing tasks. Thus, a strategy map may end by assigning the work packet to a queue for manual processing or by completing automatic processing of the customer transaction.

In step 122, assignment maps may be defined for the organizational units. An assignment map may be created by adding one or more processing tasks to the assignment map and connecting the processing tasks in a non-linear flow from a first processing task to one or more end processing tasks. Work packet exit nodes on a processing task may be connected to work packet entry points on other processing tasks. A work packet may begin at the first processing task, proceed through a series of processing tasks, and end at an end processing task. End processing tasks for assignment maps may include assign to organizational unit tasks and assign to strategy tasks. Thus, an assignment map may end at the first processing task of another organizational unit's assignment map or at the first processing task of a strategy map for this organizational unit. Thus, in a production system, a work packet entering at an assignment map of one organizational unit may be routed to a second organizational unit better suited to handle the customer transaction, and the assignment map for the second organizational unit may route the work packet to the appropriate strategy map for final disposition of the customer transaction. In step 124, the objects may be stored in the FSO customer database.

FIG. 3a:

One Embodiment of a Business Modeler Display Screen with Business Model Objects

Figure 3A:
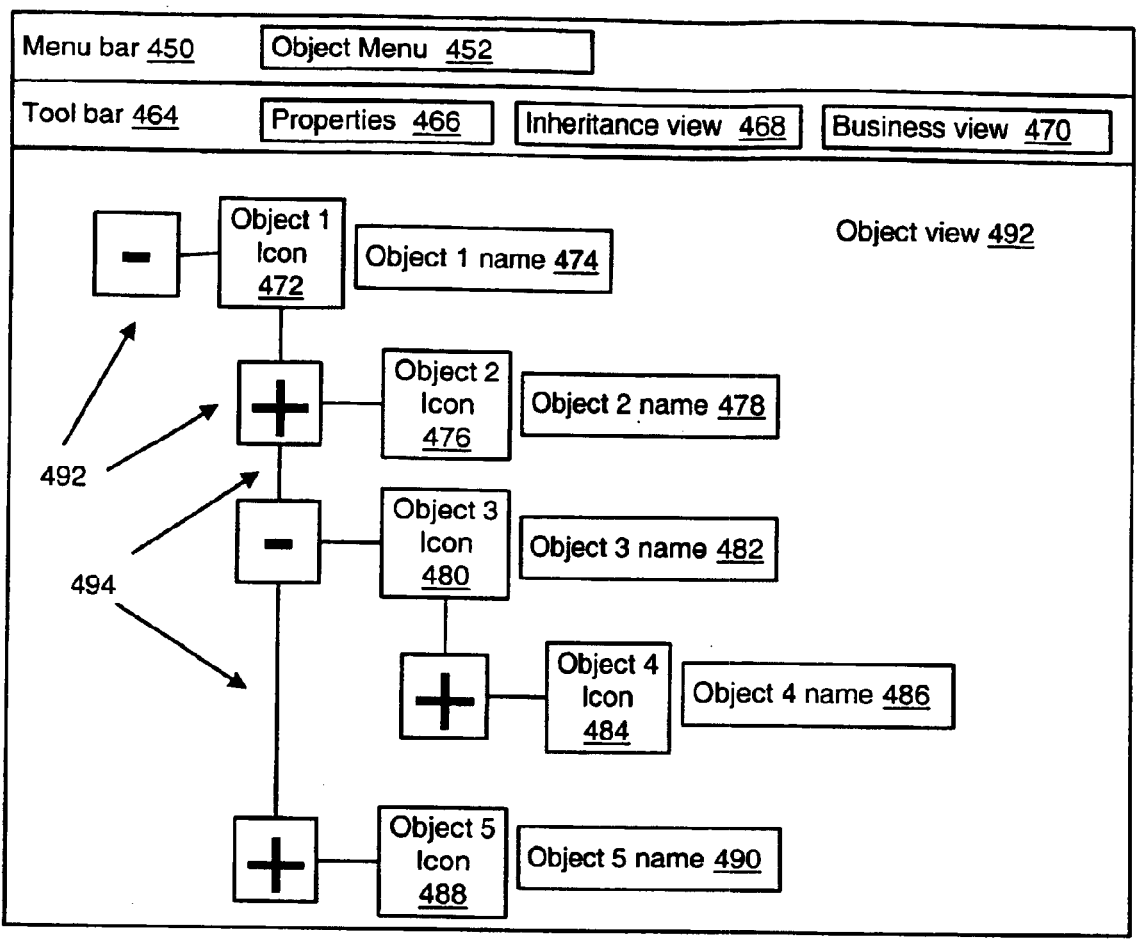
FIG. 3a illustrates one embodiment of a business modeler display screen with business model objects.

FIG. 3a illustrates one embodiment of a business modeler display screen with business model objects. A menu bar 450 may be disposed at the top of the screen. Menu bar 450 may include an object menu 452 as well as several other menus (not shown) including menu choices for managing the business model program, defining and managing business model objects, and defining relationships among the objects. A tool bar 464 may be disposed below the menu bar. Tool bar 464 may include several icons which, when selected, may perform functions similar to menu functions. Shown as examples are a properties icon 466 that may be used to open a properties sheet for a selected business model object, an inheritance view icon 468, and a business view icon 470. An object view 492 may be disposed below the toolbar 464. In object view 492, the business model objects may be displayed in either the inheritance relationship or the business relationship. Inheritance view icon 468 and business view icon 470 may be used to toggle the object view between the inheritance and business relationship viewing mode. In some embodiments, menu selections may also be used to toggle between the viewing modes.

The business model objects defined for a business model may be displayed in object view 492. The objects may be displayed in a top-to-bottom sequence corresponding to the inheritance relationship or the hierarchical business relationship of the objects. In one embodiment, the business model objects may be displayed as icons representing the type of object, with the name of the object displayed to the right of the icon. Shown as an example are object 1 icon 472 with object 1 name 474, object 2 icon 476 with object 2 name 478, object 3 icon 480 with object 3 name 482, object 4 icon 484 with object 4 name 486, and object 5 icon 488 with object 5 name 490. An object expansion icon 492 may be displayed to the left of each object icon. Object expansion icons 492 may be used to expand an object icon, that is, to show the children of the object icon. In one embodiment, an expanded object's expansion icon 492 may be displayed as a minus sign (−), and an unexpanded, or collapsed, object's expansion icon 492 may be displayed as a plus sign (+). In this example, object 1 is expanded, showing object 2, object 3, and object 5 as children of the object. Object 2 is not expanded. In some embodiments, children objectS' icons may be inset below and to the right of the parent object's icon. In some embodiments, lines 494 may be drawn between object expansion icons 492 and between object expansion icons 492 and object icons.

Figure 3B:
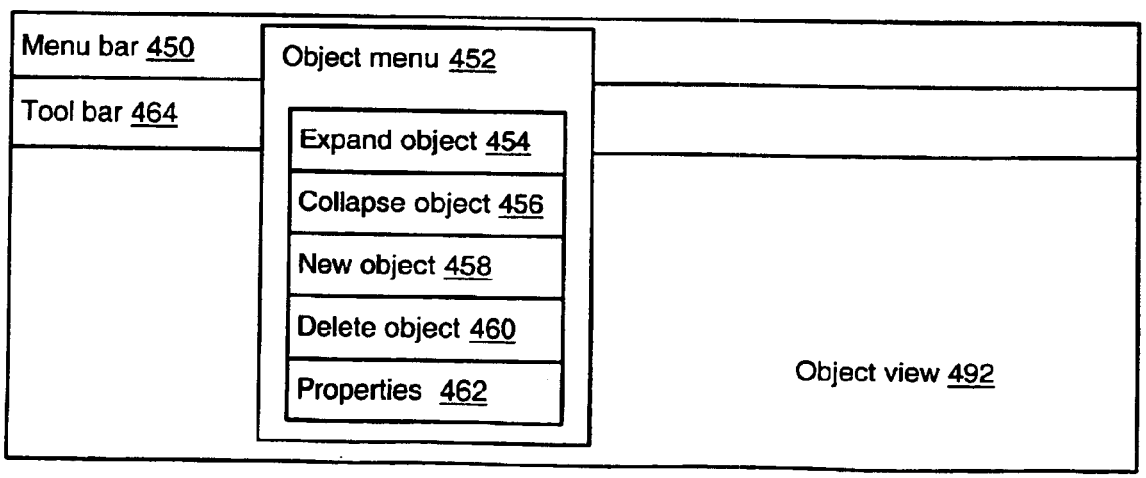
FIG. 3b illustrates one embodiment of a business modeler display screen with an object menu.

FIG. 3b: One Embodiment of a Business Modeler Display Screen with an Object Menu FIG. 3b illustrates an embodiment of the business modeler display screen of FIG. 3a with the object menu 452 opened to reveal some example menu choices that may be included. Some menu choices in object menu 452 may perform an action on a currently selected business model object in object view 492. Expand object menu choice 454 may be used to expand the currently selected business model object in object view 492. Collapse object menu choice 456 may be used to collapse the currently selected business model object in object view 492. New object menu choice 458 may present for selection a list of business model object types and create a new instance of a business model object of the selected type. Delete object menu choice 460 may delete the currently selected business model object in object view 492. Properties menu choice 462 may open a properties sheet for the currently selected business model object in object view 492. In some embodiments, the object menu 452 may include other menu choices to perform other operations on business model objects. In some embodiments, the business modeler display screen may include other menus with menu choices for performing other operations in the business modeler system.

Figure 4:
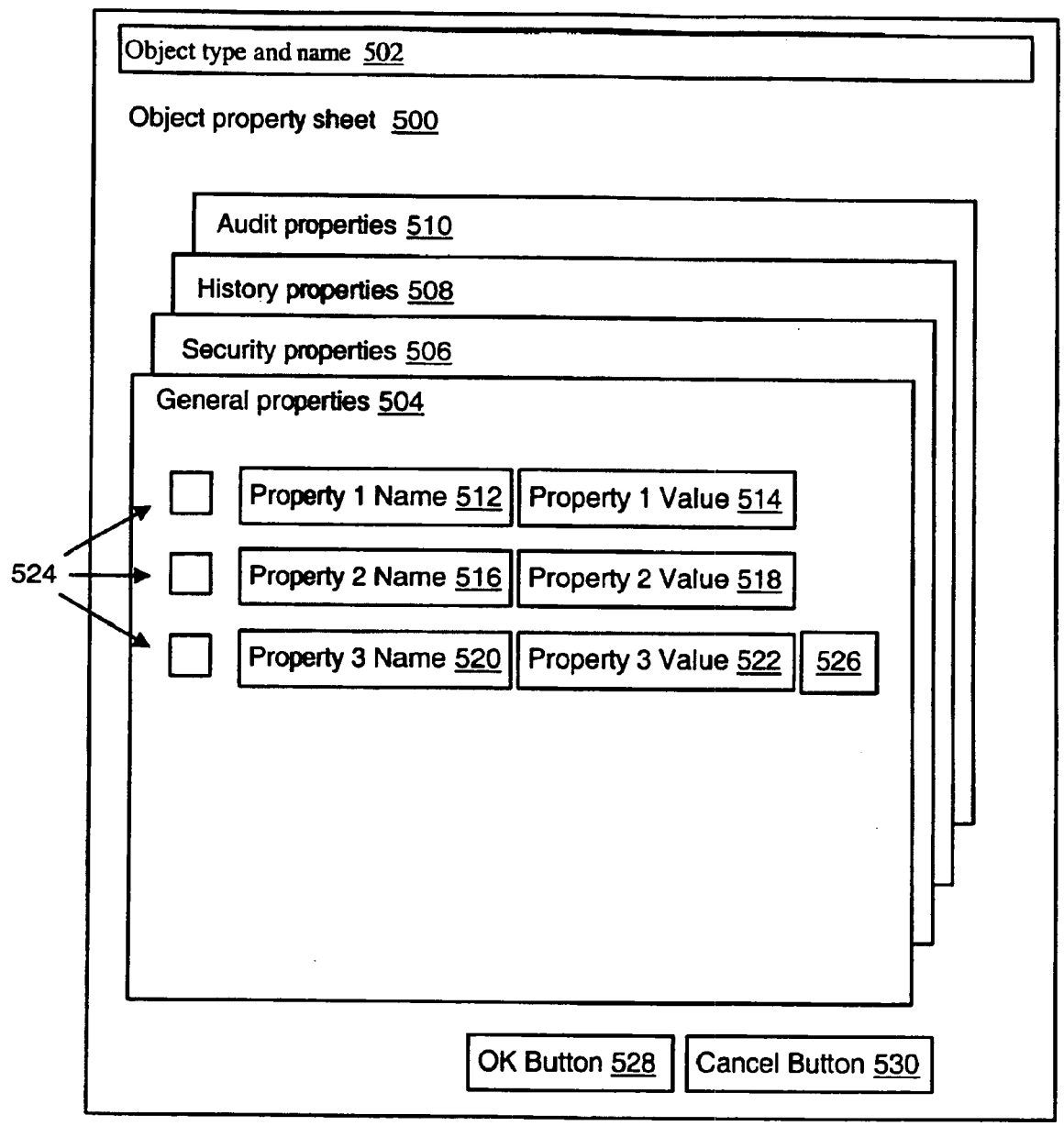
FIG. 4 illustrates one embodiment of a business model object property sheet.

FIG. 4: One Embodiment of a Business Model Object Property Sheet

FIG. 4 illustrates one embodiment of a business model object property sheet 500. In one embodiment, a business model object's property sheet may be displayed in response to the selection of a properties icon 466 from a toolbar 464 on the business modeler display screen as shown in FIG. 3a, or alternatively in response to the selection of a properties menu choice 462 from an object menu 452 as shown in FIG. 3b. The business model object's type and name 502 may be displayed at the top of property sheet 500. An object's properties may be grouped into one or more property categories. In one embodiment, the categories of object properties may be shown on separate, selectable panels in the property sheet. Shown as examples of property categories are general properties 504, security properties 506, history properties 508, and audit properties 510. Fields in the property category panels may display the names and values of the object's properties. The inheritance status of the property may also be displayed. In one embodiment, the property value field may be disposed to the right of the property name field. In one embodiment, an inheritance indicator may be disposed to the left of the property name.

In the example shown in FIG. 4, general properties panel 504 includes property 1 name 512 with property 1 value 514, property 2 name 516 with property 2 value 518, and property 3 name 520 with property 3 value 522. To the left of each property name is an inheritance indicator 524. In one embodiment, inheritance indicators may be colored black to indicate an original property value, gray to indicate an inherited property value, or green to indicate an inherited property value that has been overridden, or replaced.

Property names and values may be modified on the business model object property sheet 500. For example, property 1 value 514 may be selected and a new value entered in the field. Changing property 1 value 514 may result in a change in the inheritance indicator 524 for property 1. In some embodiments, property values may be selectable from a list of predefined values. In this example, a property value selection icon 526 is disposed to the right of property 3 value 522. Selecting property value selection icon 526 may result in a list of possible values for property 3 to be displayed. In some embodiments, business model object property sheet 500 may include one or more buttons for controlling property sheet 500. The example in FIG. 4 includes an OK button 528 and a cancel button 530. Selecting OK button 528 may result in the saving of all changes made to the object properties and the closing of property sheet 500. Selecting cancel button 530 may result in the loss of any changes made to the object properties and the closing of property sheet 500.

Figure 5A:
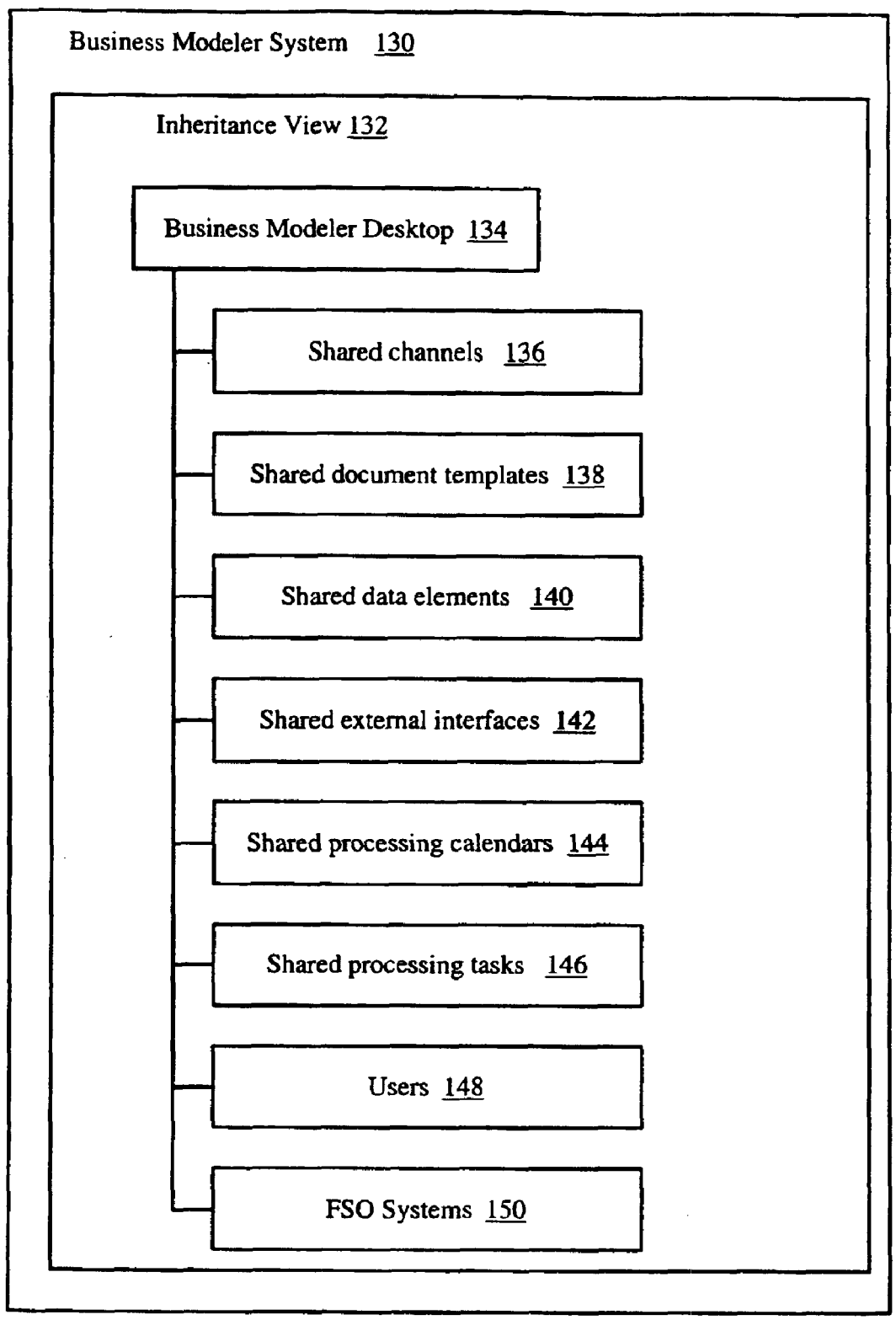
FIG. 5a illustrates one embodiment of business model objects at the highest level of the inheritance view.

FIG. 5a: Business Model Objects at the Highest Level of the Inheritance View

FIGS. 5a–5d illustrate the inheritance relationship of business model objects in a business modeler system 130. The business model objects may be displayed in an inheritance view 132 on a computer screen as described in FIG. 3a. FIGS. 5a–5d may be used to illustrate the relationship of the objects in memory as well as the relationship of the objects as displayed on the computer screen. Referring to FIG. 5a, business modeler desktop 134 may be the root object and may be the ancestor of all other business model objects in the business model. Created as children of the business modeler desktop 134 are several types of business model objects that may be shared by organizational unit objects in the business model. Shared objects may be referenced by any organizational unit in the business model. An advantage of shared objects is that an object that is common among many organizational units, such as a business calendar, may be created once, stored as a shared object in the business model hierarchical tree, and used by many organizational units. Shown are examples of shared objects including channels 136, document templates 138, data elements 140, external interfaces 142, processing calendars 144, and processing tasks 146. A shared object, when expanded, may include on or more sharable descendent objects of the same type as the shared object.

User objects 148 are shown as children of the root object. User objects may be defined at this level because user objects may be used to give employees of the business organization security access to functions of the business modeler and the production system. Properties of user objects may include user name, user title, password, and security information defining what facilities in the business modeler and the production system a particular user may access. FSO systems 150 may be the parent object of the account acquisition and account collections systems, which are in turn the parent objects of the organizational unit objects included in the business model.

Figure 5B:
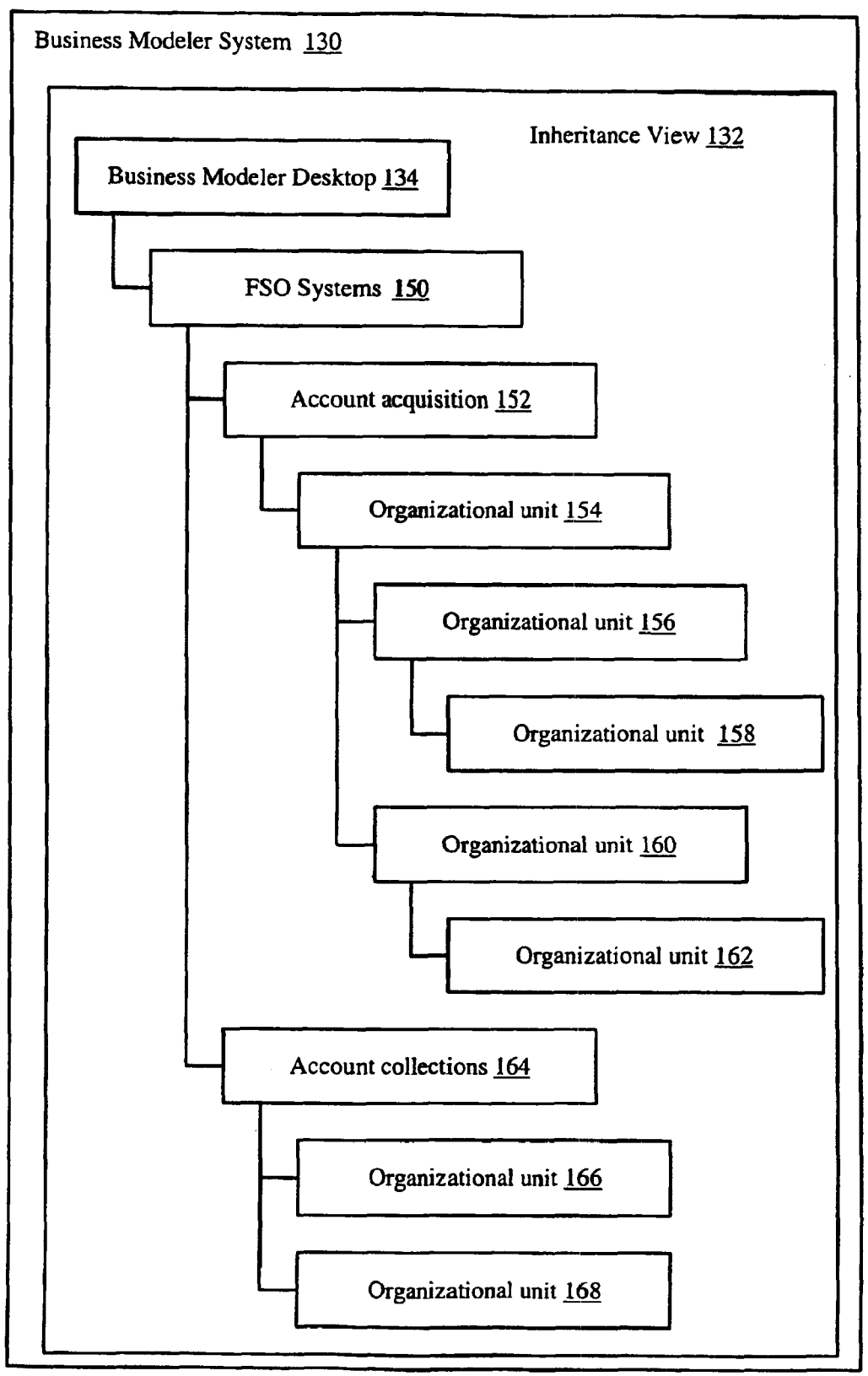
FIG. 5b illustrates one embodiment of business model objects representing organizational units in the inheritance view.

FIG. 5b:
Business model objects representing organizational units in the inheritance view FIG. 5b shows an expanded view of FSO systems 150. Shown as children of the FSO systems 150 are the account acquisition system 152 and the account collections system 164. Organizational unit objects in the inheritance view may be created as children of systems. Shown as children of the account collections system 164 are organizational unit 166 and organizational unit 168. Shown as children of the account acquisition system 152 are organizational unit 154 and organizational unit 160. Organizational unit 154 and organizational unit 160 may not be of the same object type as account acquisition system 152, and thus may not inherit any properties from account acquisition system 152. However, an organizational unit may be able to reference its ancestors, and therefore may be able to reference shared objects created at a higher level as described for FIG. 5a. Organizational unit 154 is shown to have one child organizational unit 156. Note that other object types may also be added as children of organizational units. Organizational unit 156 is shown to have one child organizational unit 158. Organizational unit 160 is shown to have one child organizational unit 162.

As organizational units 154, 156, and 158 are of the same type, organizational units lower on the tree may inherit property values from their ancestor organizational units. Thus, organizational unit 158 may inherit property values from organizational units 154 and 156. An organizational unit may not inherit property values from its descendents. Thus, organizational unit 154 may not inherit property values from organizational units 156 or 158. A business model object may not inherit property values from siblings or sibling' descendents. Thus, organizational unit 160 may inherit property values from its ancestor organizational unit 154, but may not inherit property values from its sibling organizational unit 156 or organizational unit 156's child organizational unit 158. An object may be able to reference siblings or a sibling's descendents. Thus, organizational unit 160 may be able to reference property values of organizational units 156 and 158. Security features of business model objects may also be used to regulate referencing among business model objects. For example, security properties for a business model object may be set to deny referencing of one or more properties to siblings. Thus, security properties for organizational unit 160 may be set to prohibit organizational unit 156 from referencing organizational unit 160's properties.

Figure 5C:
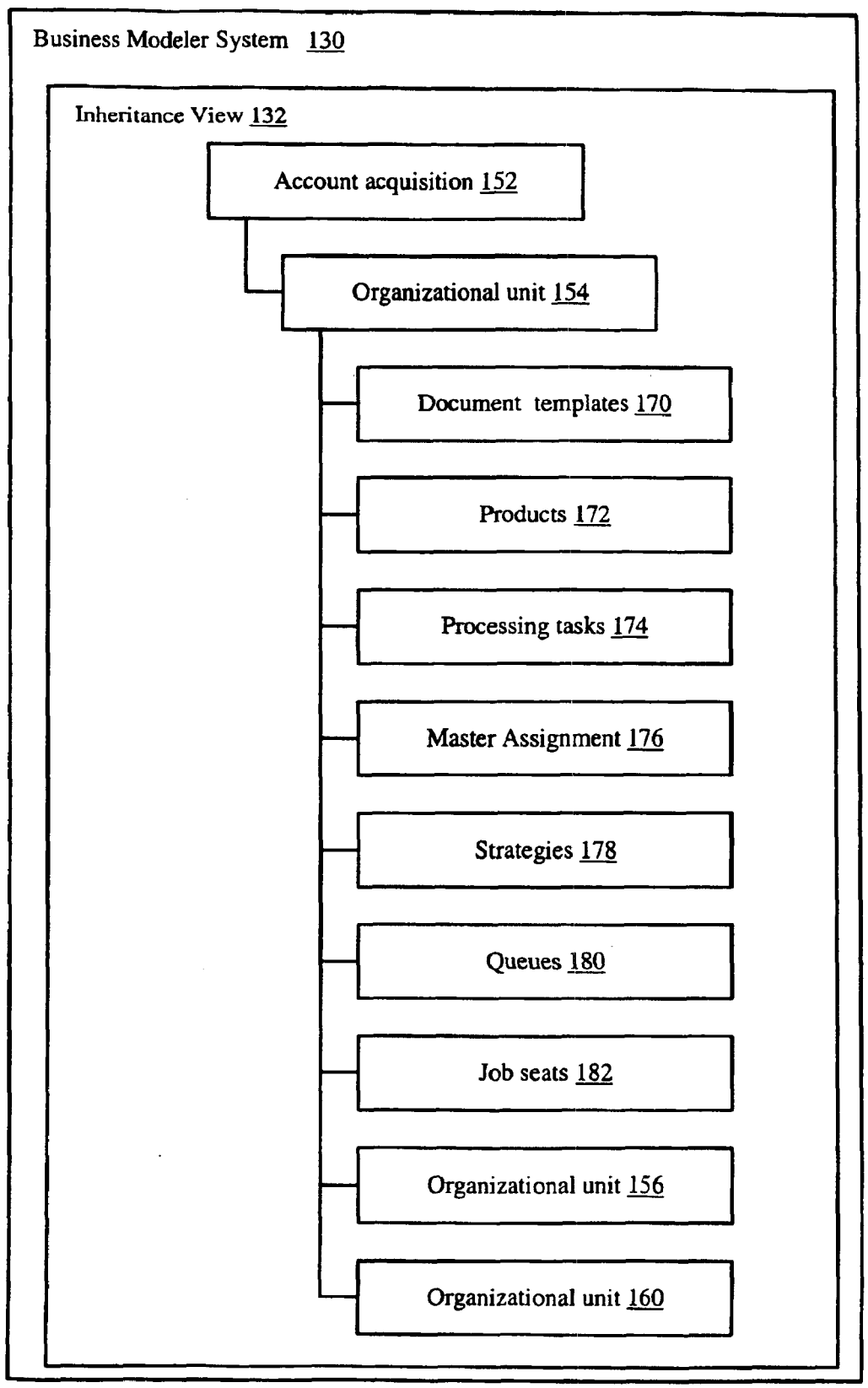
FIG. 5c illustrates one embodiment of an account acquisition organizational unit in the inheritance view.

FIG. 5c: An Account Acquisition Organizational Unit in the Inheritance View

FIG. 5c shows an expanded organizational unit 154 with child business model objects in the inheritance view. In one embodiment, to create a new child business model object under an existing business model object, the existing business model object may be selected in the object view window and the new object menu selection 458 shown in FIG. 3b applied to the selected business model object. Referring again to FIG. 5c, organizational unit 154 may include document templates 170, products 172, processing tasks 174, master assignment 176, strategies 178, queues 180, and job seats 182. Also shown are unexpanded child organizational units 156 and 160.

Figure 5D:
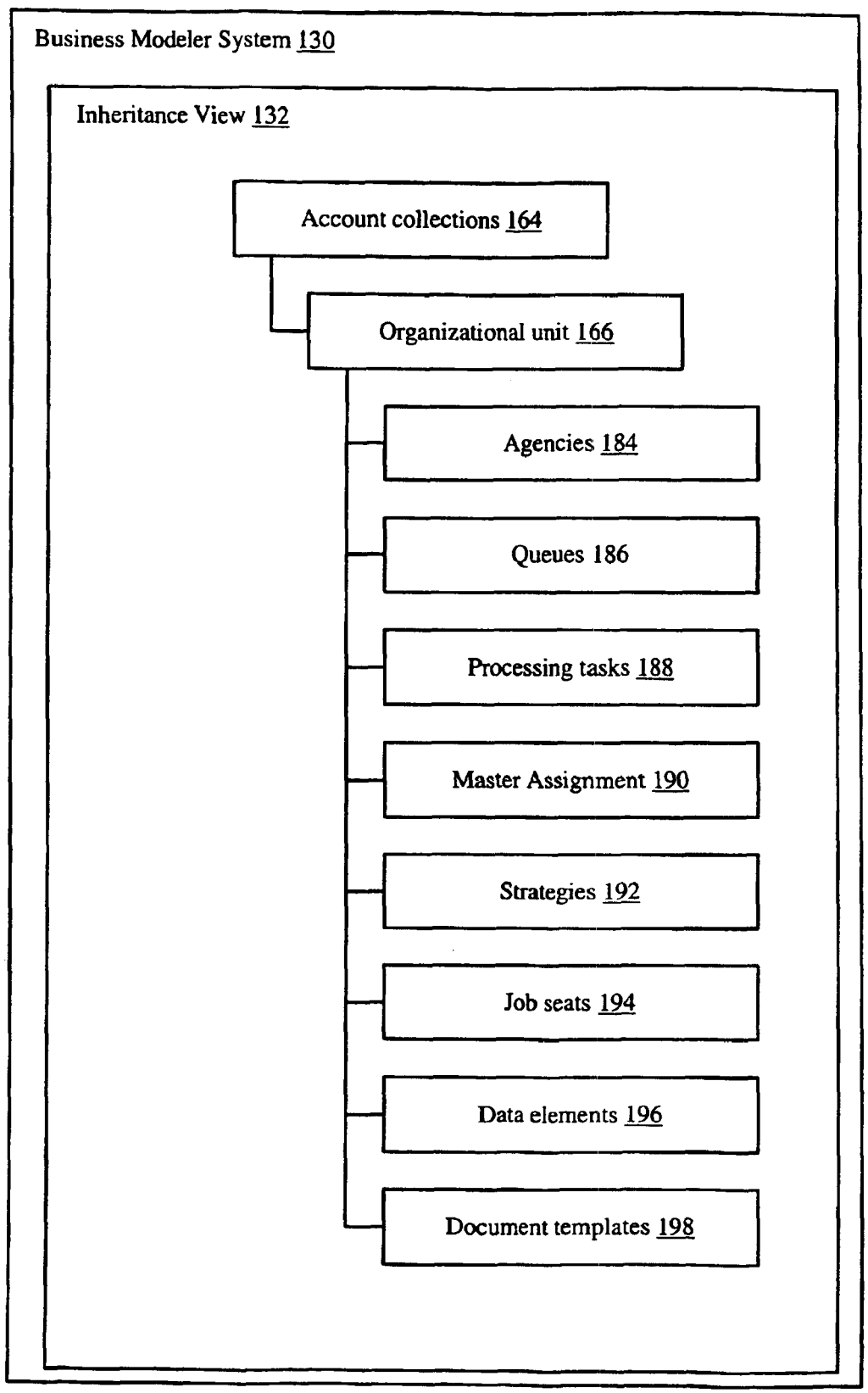
FIG. 5d illustrates one embodiment of an account collections organizational unit in the inheritance view.

FIG. 5d: An Account Collections Organizational Unit in the Inheritance View

FIG. 5d shows an expanded organizational unit 166 with several child business model objects in the inheritance view. Organizational unit 166 may include agencies 184, queues 186, processing tasks 188, master assignment 190, strategies 192, job seats 194, data elements 196, and document templates 198.

Figure 6A:
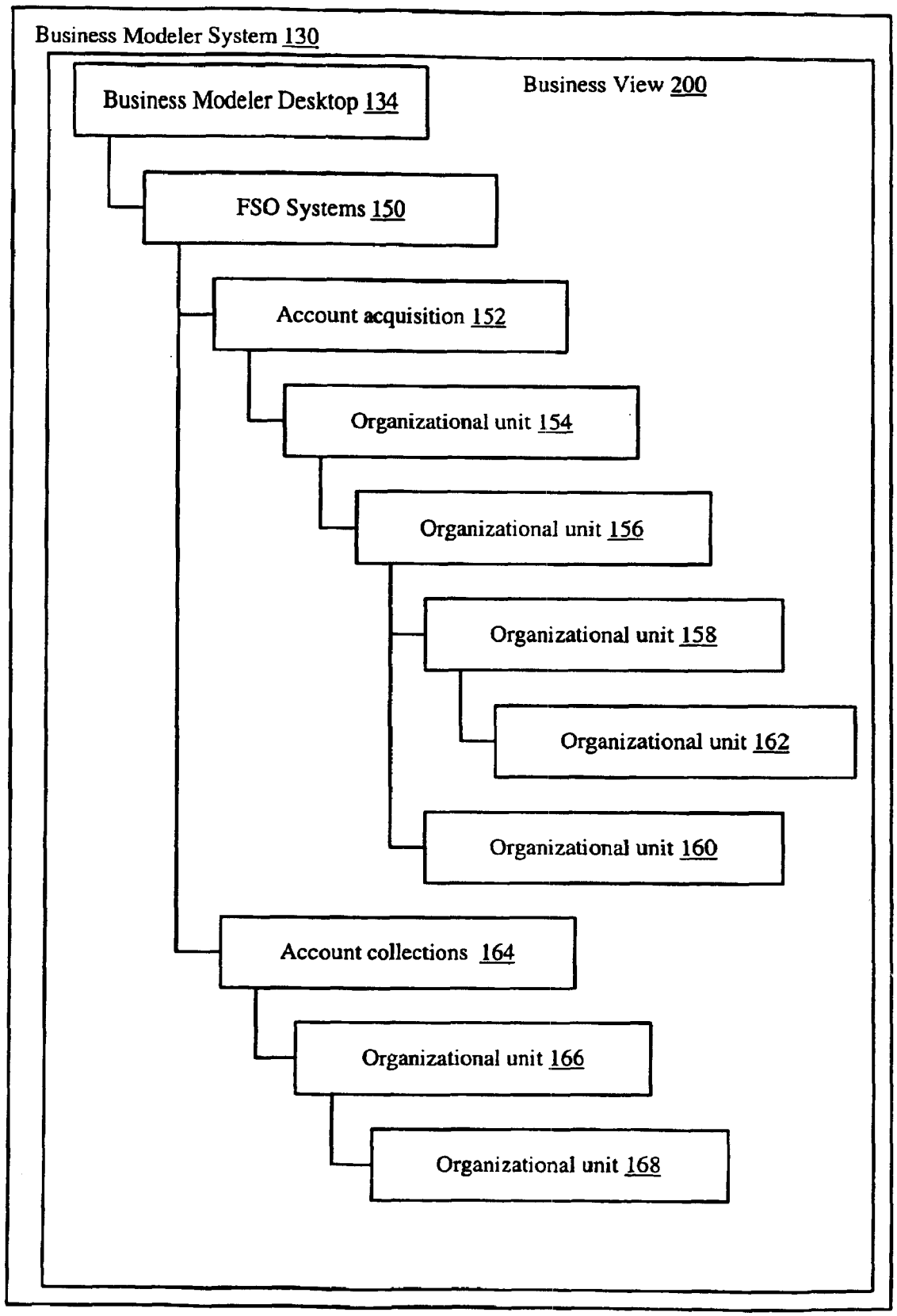
FIG. 6a illustrates one embodiment of business model objects at the highest level of the business view.

FIG. 6a: Business Model Objects at the Highest Level of the Business View

Figure 6B:
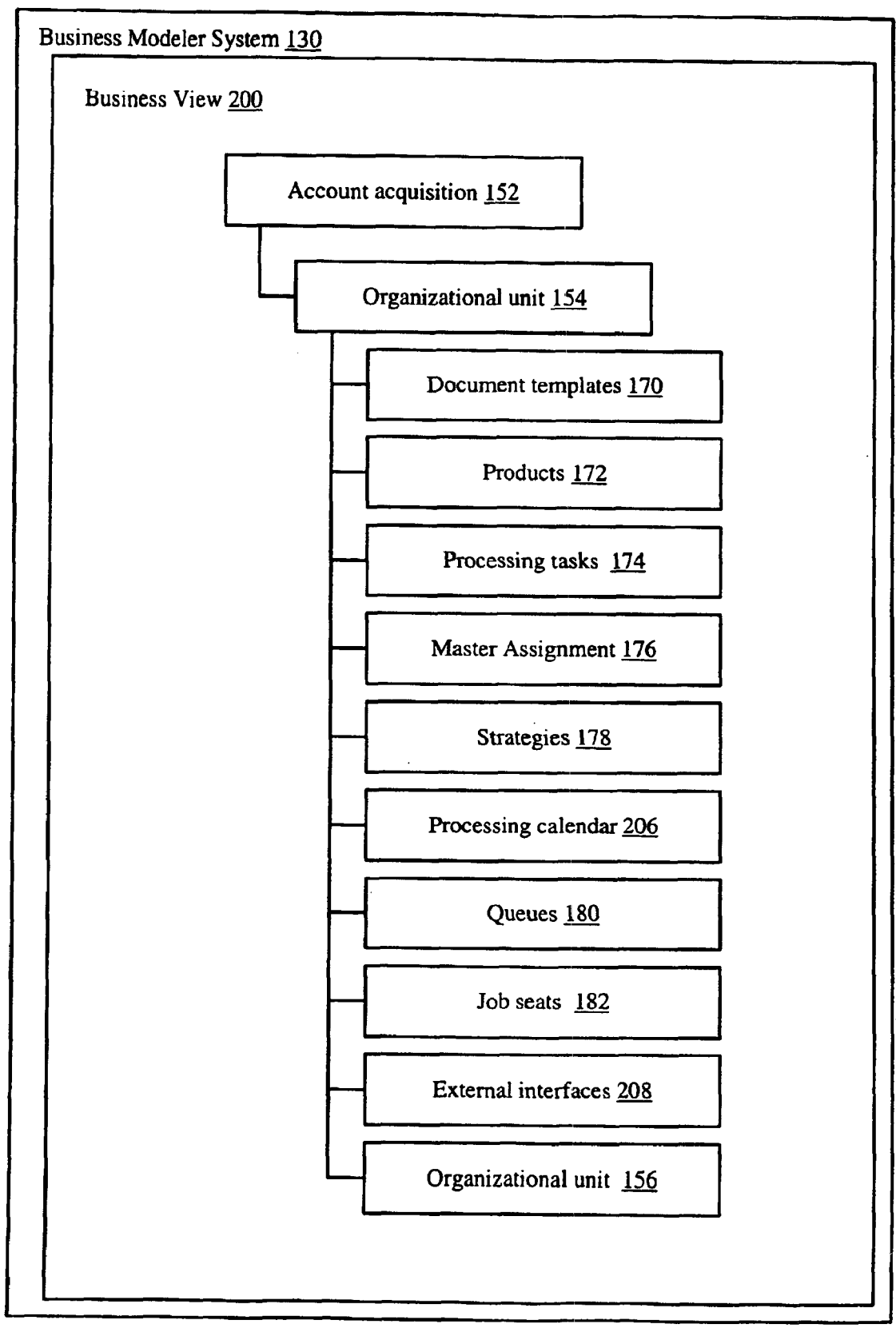
FIG. 6b illustrates one embodiment of an account acquisition organizational unit in the business view.
Figure 6C:
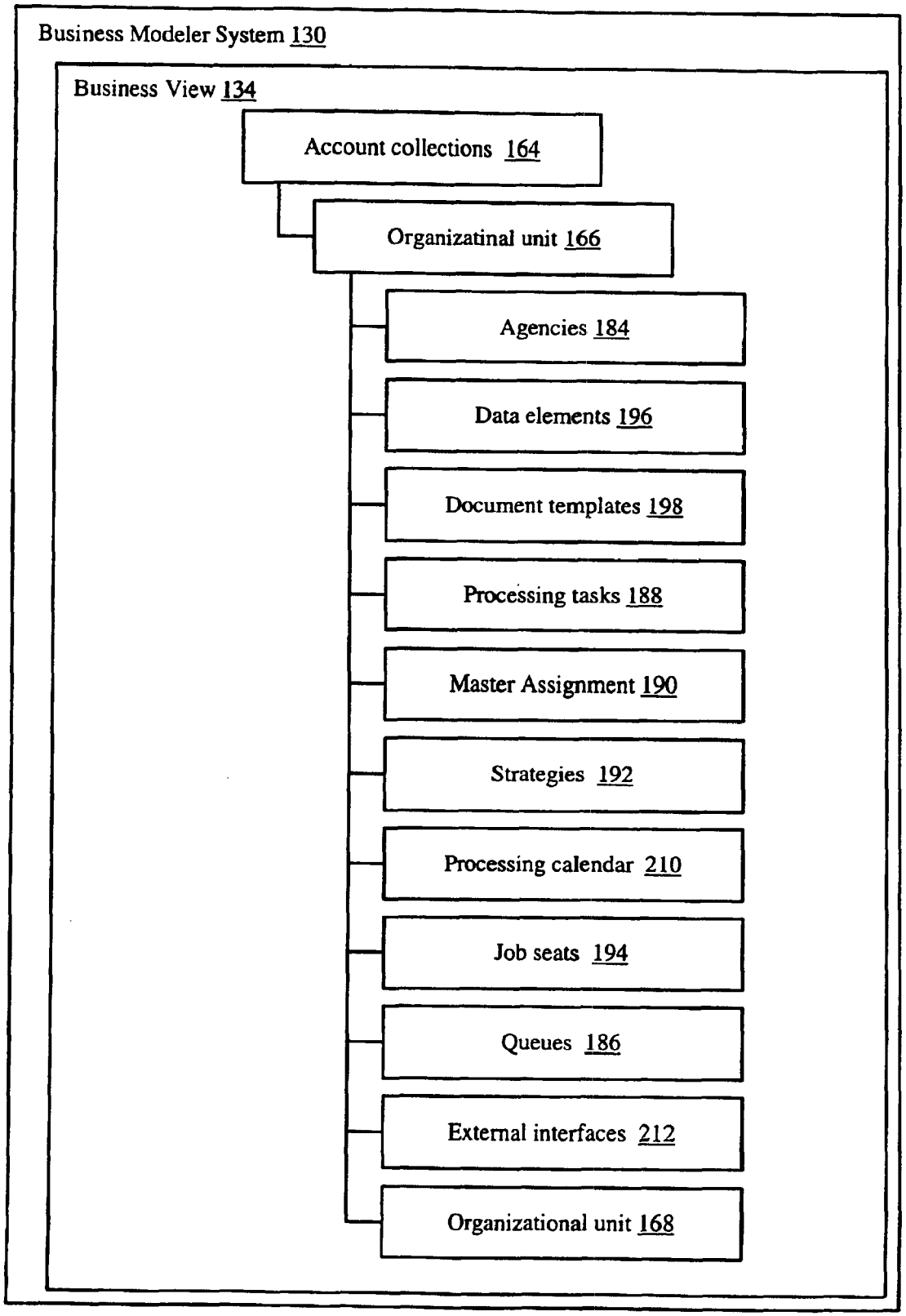
FIG. 6c illustrates one embodiment of an account collections organizational unit in the business view.

FIGS. 6a–6c illustrate the business relationship of business model objects in a business modeler system 130. The business model objects may be displayed in a business view 200 on a computer screen as described in FIG. 3a. Referring to FIG. 6a, business modeler desktop 134 may be the root object and may be the ancestor of all other business model objects in the business model. Operations that may be performed on objects in the inheritance view may also be performed in the business view. FSO systems 150 is shown expanded with its reporting account acquisition system 152 and account collections system 164 visible. The tree is expanded to show the organizational units in both systems in their reporting relationship. The organizational units shown in FIG. 5b in an inheritance relationship are shown in FIG. 6a in a business relationship. Thus, organizational unit 160 is shown reporting to organizational unit 156 rather than as a sibling of organizational unit 156, organizational unit 162 is shown reporting to organizational unit 158 rather than as a child of organizational unit 160, and organizational unit 168 is shown reporting to organizational unit 166 rather than as a sibling of organizational unit 166.

FIG. 6b: An Account Acquisition Organizational Unit in the Business View

FIG. 6b shows an expanded organizational unit 154 with reporting business model objects in the business view. Organizational unit 154 may include document templates 170, products 172, processing tasks 174, master assignment 176, strategies 178, processing calendar 206, queues 180, job seats 182, and external interfaces 208. Also shown is unexpanded organizational unit 156 which reports to organizational unit 154. Some objects shown in the business view as reporting to an object may be shown in the inheritance view at a different level in the hierarchical tree. Thus, sharable business model objects shown on the high-level inheritance view in FIG. 5a may be shown as reporting objects to an organizational unit object in the business view. For example, processing calendar 206 may be a shared business model object common to all organizational units.

FIG. 6c: An Account Collections Organizational Unit in the Business View

FIG. 6c shows an expanded organizational unit 166 with several reporting business model objects in the business view. Organizational unit 166 may include agencies 184, data elements 196, document templates 198, processing tasks 188, master assignment 190, strategies 192, processing calendar 210, job seats 194, queues 186, and external interfaces 212. Also shown is reporting organizational unit 168, which is a sibling of organizational unit 166 in the inheritance view.

Figure 7:
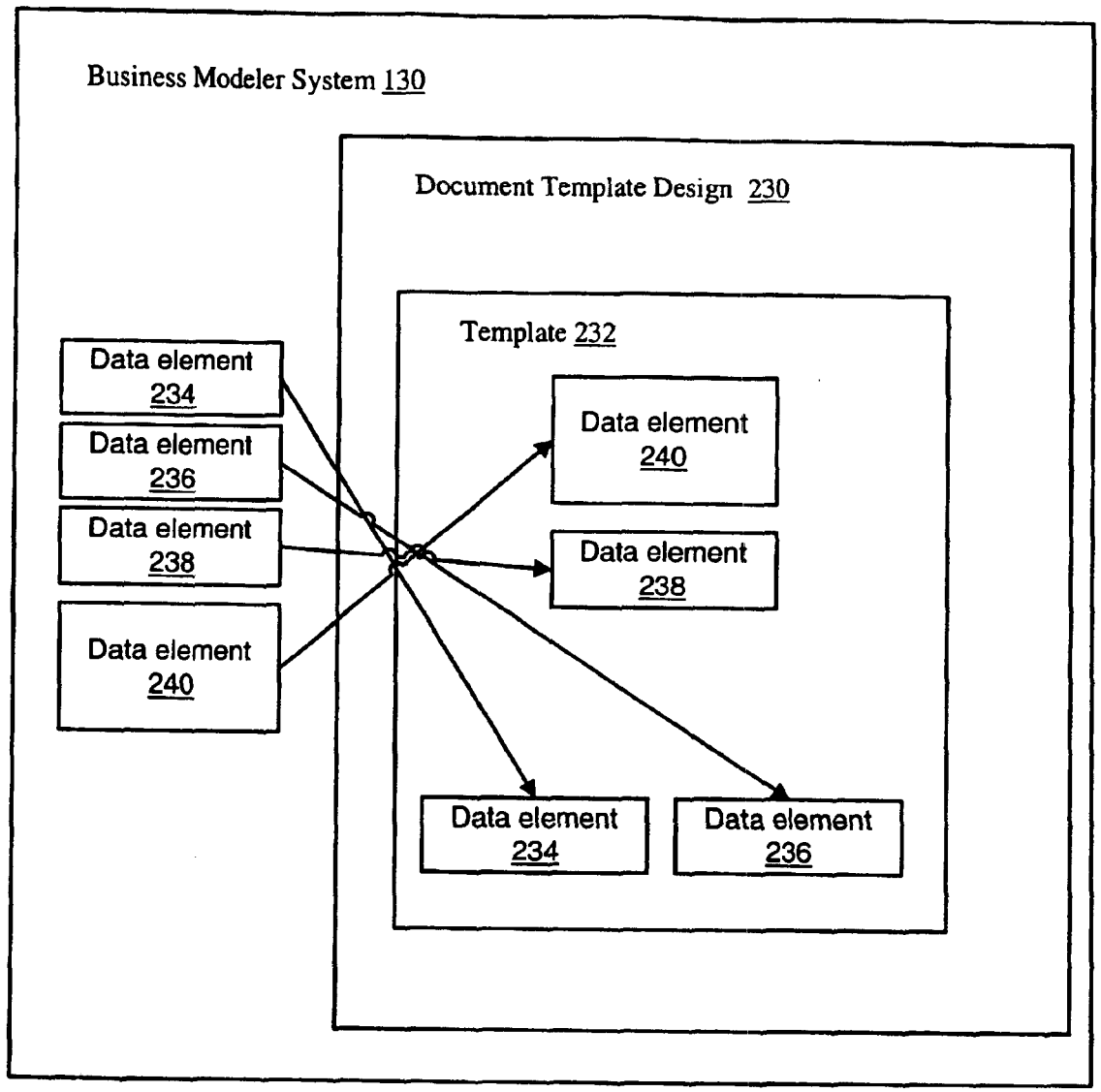
FIG. 7 illustrates an embodiment of a document template design process.

FIG. 7: One Embodiment of a Document Template Design Process

FIG. 7 shows one embodiment of a document template design process in a business modeler system 130. Business modeler system 130 may include a document template design subsystem 230. When a new document template object is created as a child of a business model object, a blank template 232 may be displayed for the document template. Data elements that are children of the business model object or that may be referenced by the business model object which is the parent of the document template are made available for adding to the blank template 232. In this example, data elements 234, 236, 238 and 240 are added as fields in template 232. The fields may include the name of the data element and a box for displaying or modifying the value of the data element. The positioning of the fields in template 232 may be how the fields will be displayed and printed in the production system. Properties of the data elements added to template 232 may determine some aspects of how the data element is displayed in the field, for example, the field width and the precision of the data element value. In one embodiment of a document template design subsystem, data elements may be selected from either the inheritance or business view and dragged and dropped onto a blank template. In one embodiment of a document template design subsystem, a position may be selected on a blank template and a data element may be selected from a list of available data elements and added to the blank template at the selected spot. Note that since a document template is an example of a business model object, the document template design subsystem may be viewed as a method for graphically defining a document template object.

Figure 8A:
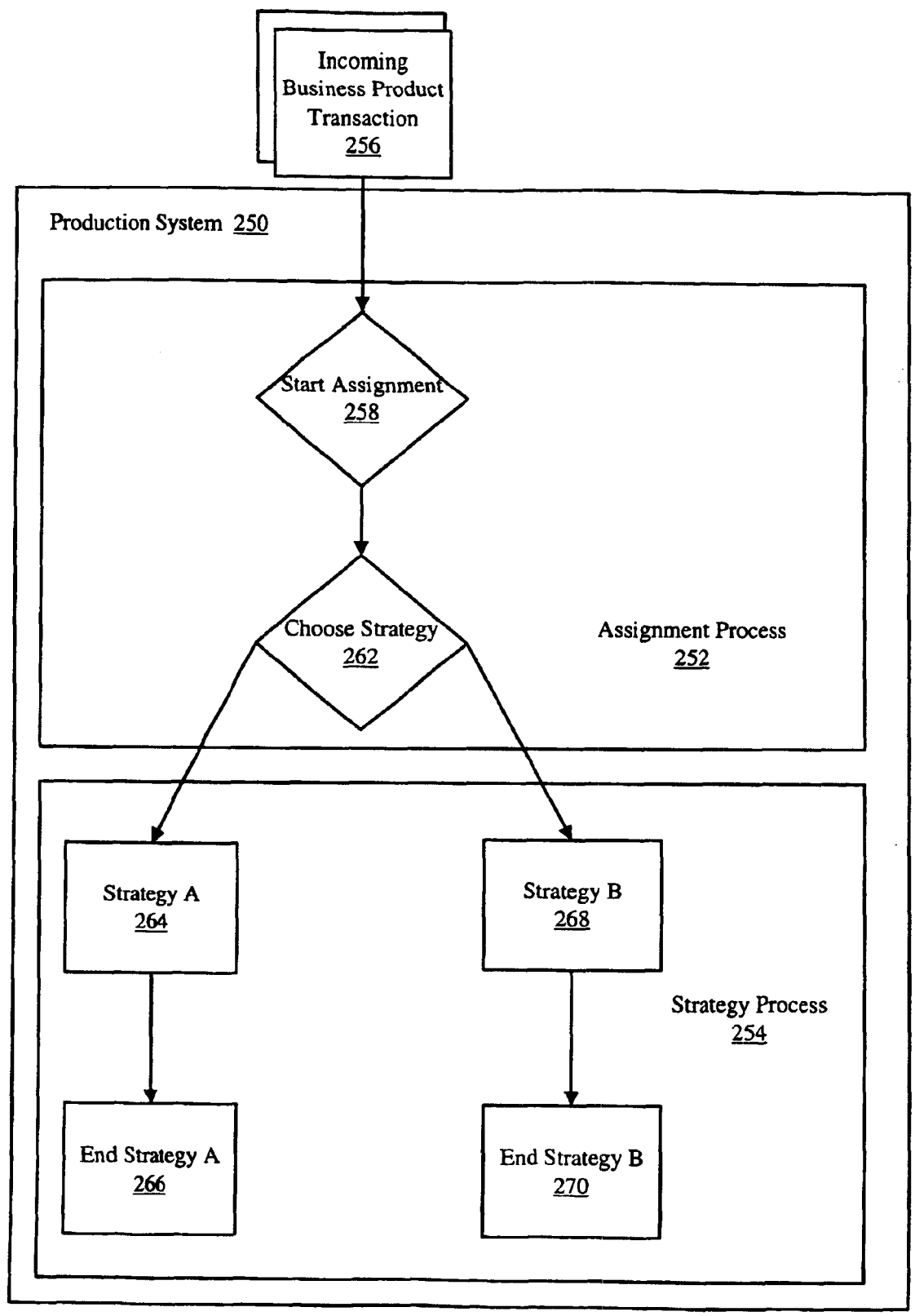
FIG. 8a illustrates high-level business product transaction processing in an embodiment of a production system.

FIG. 8a: High-Level Business Product Transaction Processing in an Embodiment of a Production System FIG. 8a illustrates at a high level how a FSO business product transaction 256 may be processed in a production system 250. Production system 250 may include an assignment process 252 and a strategy process 254. The purpose of the assignment process may be to choose an appropriate strategy for business product transaction 256. At step 258, the assignment process 252 may gather as much information as possible about the customer associated with the business product transaction. At step 262, the assignment process 252 may examine the customer information to determine which strategy is best suited for transaction 256. Once an appropriate strategy is chosen, the business product transaction is routed to the strategy. This example shows two possible strategies, strategy A 264 and strategy B 268. In this example, if assignment step 262 determines that strategy B 268 is the best strategy for transaction 256, transaction 256 is routed to strategy 268 for processing and final disposition. When strategy B 268 has completed processing transaction 256, transaction 256 may be passed to end strategy B 270 for cleanup. Cleanup operations may include, but are not limited to: archiving of documents, deletion of the electronic copies of the documents, and the freeing of any memory dynamically allocated during the processing of transaction 256.

Figure 8B:
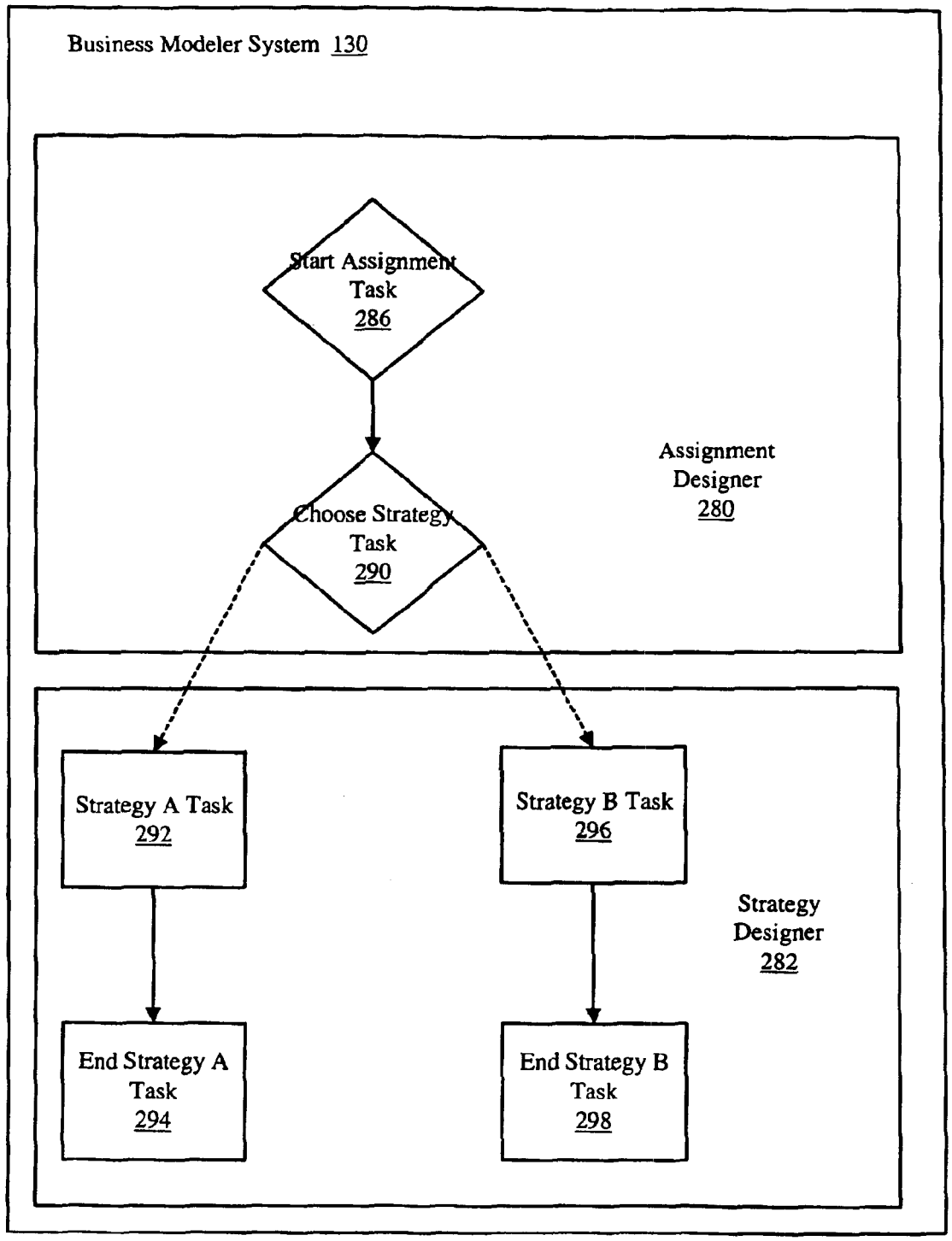
FIG. 8b illustrates how the high-level business product transaction processing may be modeled in an embodiment of a business modeler system.

FIG. 8b: Modeling High-Level Business Product Transaction Processing in an Embodiment of a Business Modeler System FIG. 8b illustrates how the high-level business product transaction processing may be modeled in an embodiment of a business modeler system 130. Business modeler system 130 may include an assignment designer subsystem 280 and a strategy designer subsystem 282. In the strategy subsystem, two strategy objects may be defined, one for strategy A and one for strategy B. A strategy A task 292 may be added to the strategy A object. The processing to be performed on a business product transaction in step 264 of the production system shown in FIG. 8a may be defined in strategy task A. An end strategy. A task 294 may be added to the strategy A object to perform the cleanup operations of step 266 of the production system shown in FIG. 8a. The output of task 292 may be connected to an input node on task 294 signifying that a business product transaction is to be passed from task 292 to task 294. Likewise, a strategy B task 296 and an end strategy B task 298 may be added to the strategy B object to model strategy B processing as shown in the production system of FIG. 8a.

In the assignment designer subsystem shown in FIG. 8b, a start assignment task 286 may be added to an assignment object. Task 286 may be defined to gather the customer information needed at step 258 of the production system shown in FIG. 8a. Thus, task 286 may reference one or more external interface objects to gather customer information from other computer systems and databases. The gathered information may be mapped to data elements included as fields on document templates associated with a business product transaction. A choose strategy task 290 may be added to the assignment object. Task 290 may be defined to choose among two or more strategies as required at step 262 of the production system shown in FIG. 8a. The output of task 286 may be connected to an input node on task 290 signifying that a business product transaction is to be passed from task 286 to task 290. Note that the output of a choose strategy task in the assignment designer subsystem may not be routed directly to a strategy object in the strategy designer subsystem. Strategy objects may be chosen from a list of available strategies and assigned as destinations for business product transactions on decision branches in a choose strategy task in the assignment designer subsystem.

Figure 9:
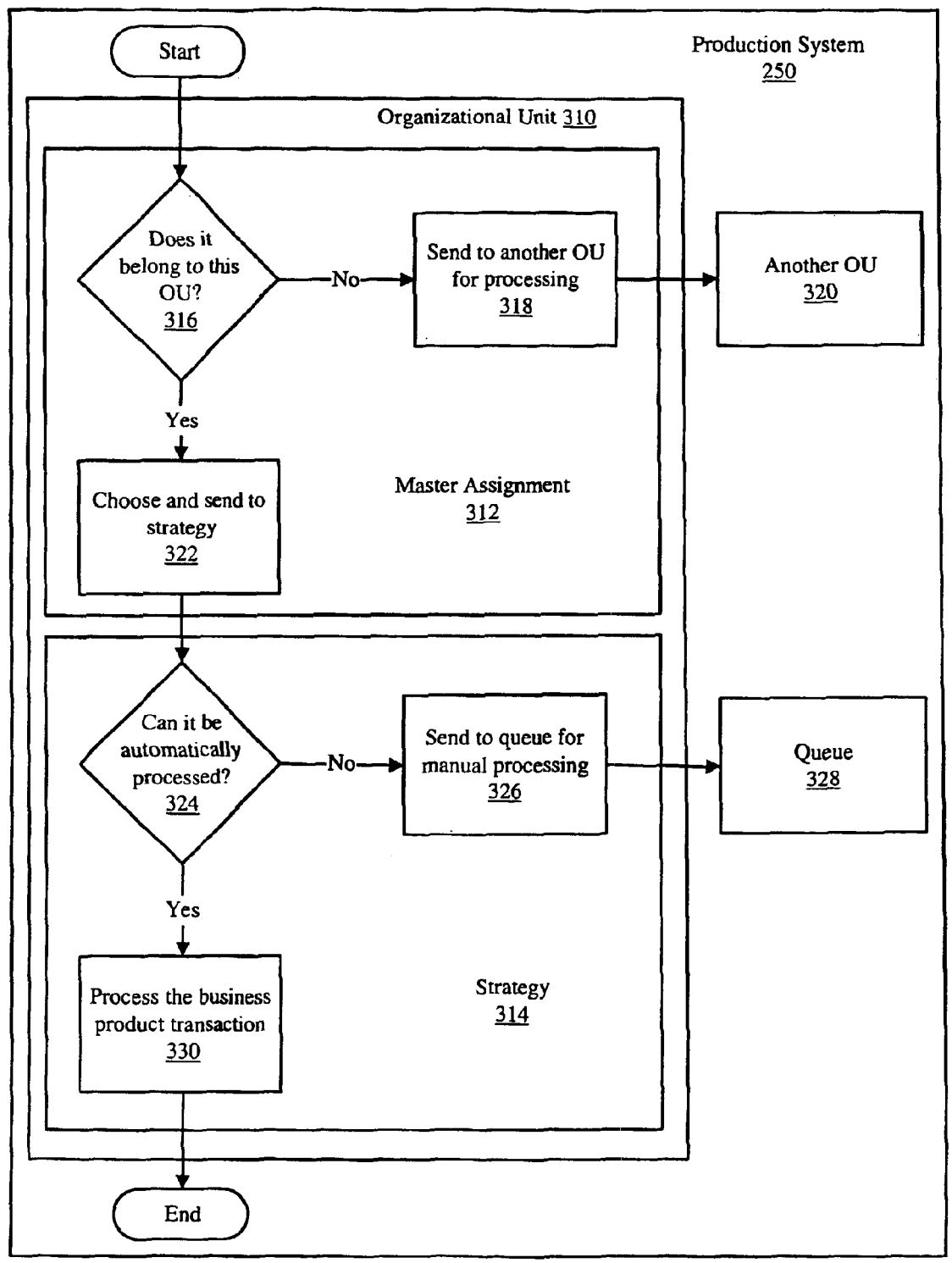
FIG. 9 illustrates a high-level assignment and strategy process in an embodiment of a production system.

FIG. 9:

A High-Level Assignment and Strategy Process in an Embodiment of a Production System FIG. 9 illustrates an embodiment of a production system, showing how a business product transaction is processed in an organizational unit 310 in a production system 250 and the possible destinations of a business product transaction in the system. Organizational unit 310 may include a master assignment process 312 and a strategy process 314. At step 316 of the assignment process, the business product transaction may be examined to see if organizational unit 310 is responsible for processing this business product transaction. If organizational unit 310 is not responsible for the processing of the business product transaction, the business product transaction may be routed to another organizational unit 320 by step 318. If organizational unit 310 is responsible for processing the business product transaction, the business product transaction may be routed to step 322 for strategy selection. In step 322, the business product transaction is examined to determine which strategy available to organizational unit 310 is best suited for processing the business product transaction. The business product transaction may then be passed to strategy 314. At step 324 of strategy 314, the business product transaction is examined to see if it can be automatically processed. If the business product transaction cannot be automatically processed, it may be posted to queue 328 for manual processing by step 326. If step 324 determines the business product transaction can be automatically processed, the business product transaction may be routed to step 330 for automatic processing. Thus, in this embodiment of a production system, a business product transaction entering an organizational unit's assignment process must either end up in a strategy process or in another organizational unit's assignment process, and a business product transaction entering an organizational unit's strategy process must either end up being automatically processed in the strategy process or being posted to a queue for manual processing.

Figure 10:
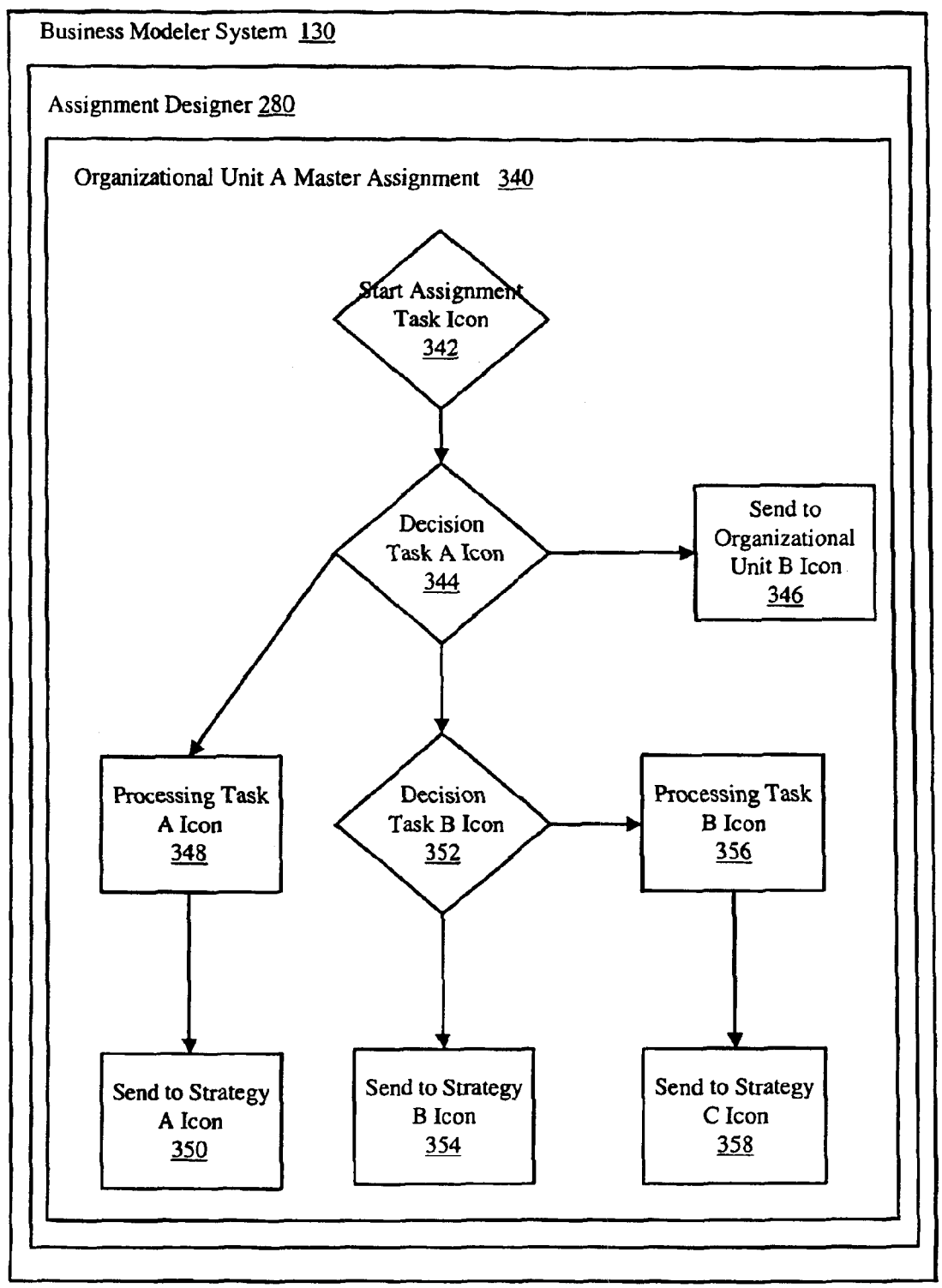
FIG. 10 illustrates an example master assignment model in an embodiment of a business modeler system.

FIG. 10:

An Example Master Assignment Model in an Embodiment of a Business Modeler System FIG. 10 illustrates how an assignment process may be modeled in an embodiment of a business modeler system 130. Business modeler system 130 may include an assignment designer subsystem 280. A master assignment object may be defined as a child of organizational unit A. A master assignment design screen 340 may be opened for the master assignment object. In one embodiment, task objects may be selected from either the inheritance or business view and dragged and dropped onto master assignment design screen 340. In some embodiments, generic task objects may also be available in a generic task object list and may be added to master assignment design screen 340. Generic task objects may be predefined tasks not created or displayed in the inheritance or business views but that are available for use in assignments and strategies. In one embodiment, generic task objects are displayed as icons in a generic task window and may be dragged and dropped onto an assignment or strategy design screen. In one embodiment, generic task objects may be listed as menu choices in an add generic task menu available during assignment and strategy design. In one embodiment, a task object added to design screen 340 may appear as an icon on the design screen. The name of the task object may also be displayed. Once a task object is added to master assignment design screen 340, the task object's property sheet may be opened and properties of the task object may be resolved. An example of resolution of a task object property may be to specify the sources of data for filling in the values of data elements included in document templates.

In master assignment 340, the first task added may be start assignment task 342. Task 342 may be configured to gather data from internal (production system) and external (other system) sources. Decision task A 344 may be added to master assignment 340 and configured to evaluate one or more data elements in a business product transaction to determine the routing of the business product transaction. A send to organizational unit task 346 may be added to master assignment 340 and the property sheet of task 346 may be opened to specify what organizational unit to send a business product transaction to. In this example, the properties of task 346 are resolved to route a business product transaction to organizational unit B. An output node on task 344 is connected to an input node on task 346. On master assignment 340, the link between nodes may be signified by a line drawn between the output and input node.

Processing task A 348 and decision task B 352 may then be added to master assignment 340. Outputs from task 344 may be connected to inputs on task 348 and task 352. Send to strategy task 350 may then be added to master assignment 340. The property sheet of task 350 may be resolved to route a business product transaction to a previously defined strategy A. Send to strategy task 354 and processing task B 356 may then be added to master assignment 340. Outputs from decision task 352 may then be connected to inputs on tasks 354 and 356. Send to strategy task 358 may be added to master assignment 340. An output from task 356 may be connected to an input on task 358. Finally, the property sheets of task 354 and 358 may be resolved to route a business product transaction to strategies B and C, respectively.

Note that the process described for FIG. 10 is used to define a master assignment object. Thus, the process may be viewed as a graphical method for defining a master assignment object. The tasks added to the master assignment object may be said to be referenced by the master assignment object.

Figure 11:
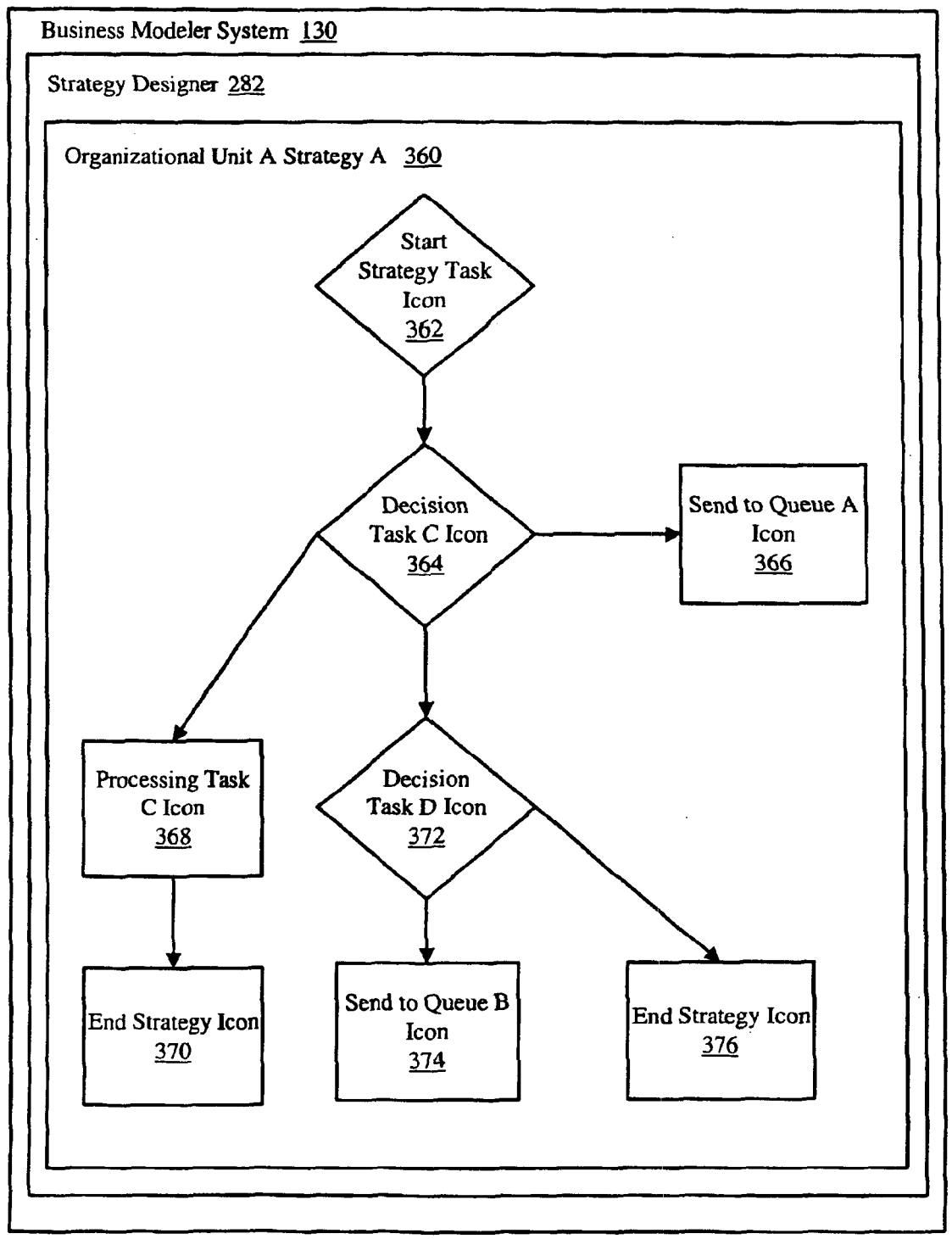
FIG. 11 illustrates an example strategy model in an embodiment of a business modeler system.

FIG. 11: An Example Strategy Model in an Embodiment of a Business Modeler System FIG. 11 illustrates how a strategy process may be modeled in an embodiment of a business modeler system 130. Business modeler system 130 may include a strategy designer subsystem 282. A strategy object may be defined as a child of organizational unit A. A strategy design screen 360 may be opened for the strategy object. In one embodiment, task objects may be selected from either the inheritance or business view and dragged and dropped onto strategy design screen 360. In some embodiments, generic task objects may also be available in a generic task object list and may be added to strategy design screen 360.

In strategy 360, the first task added may be start strategy task 362. Task 362 may be configured to perform some initial processing on the data elements in a business product transaction. Decision task C 364 may be added to strategy 360 and configured to evaluate one or more data elements in a business product transaction to determine the routing of the business product transaction. A send to queue task 366 may be added to strategy 360 and the property sheet of task 366 may be opened to specify what queue to send a business product transaction to. In this example, the properties of task 366 are resolved to route a business product transaction to queue A. An output node on task 364 is connected to an input node on task 366.

Processing task C 368 and decision task D 372 may then be added to strategy 360. Outputs from task 364 may be connected to inputs on task 368 and task 372. End strategy 370 may then be added to strategy 360. An output from task 368 may be routed to an input on task 370. Send to queue task 374 and end strategy 376 may then be added to strategy 360. Outputs from task 372 may then be connected to inputs on tasks 374 and 376. The properties of task 374 may then be resolved to route a business product transaction to queue B.

Figure 12:
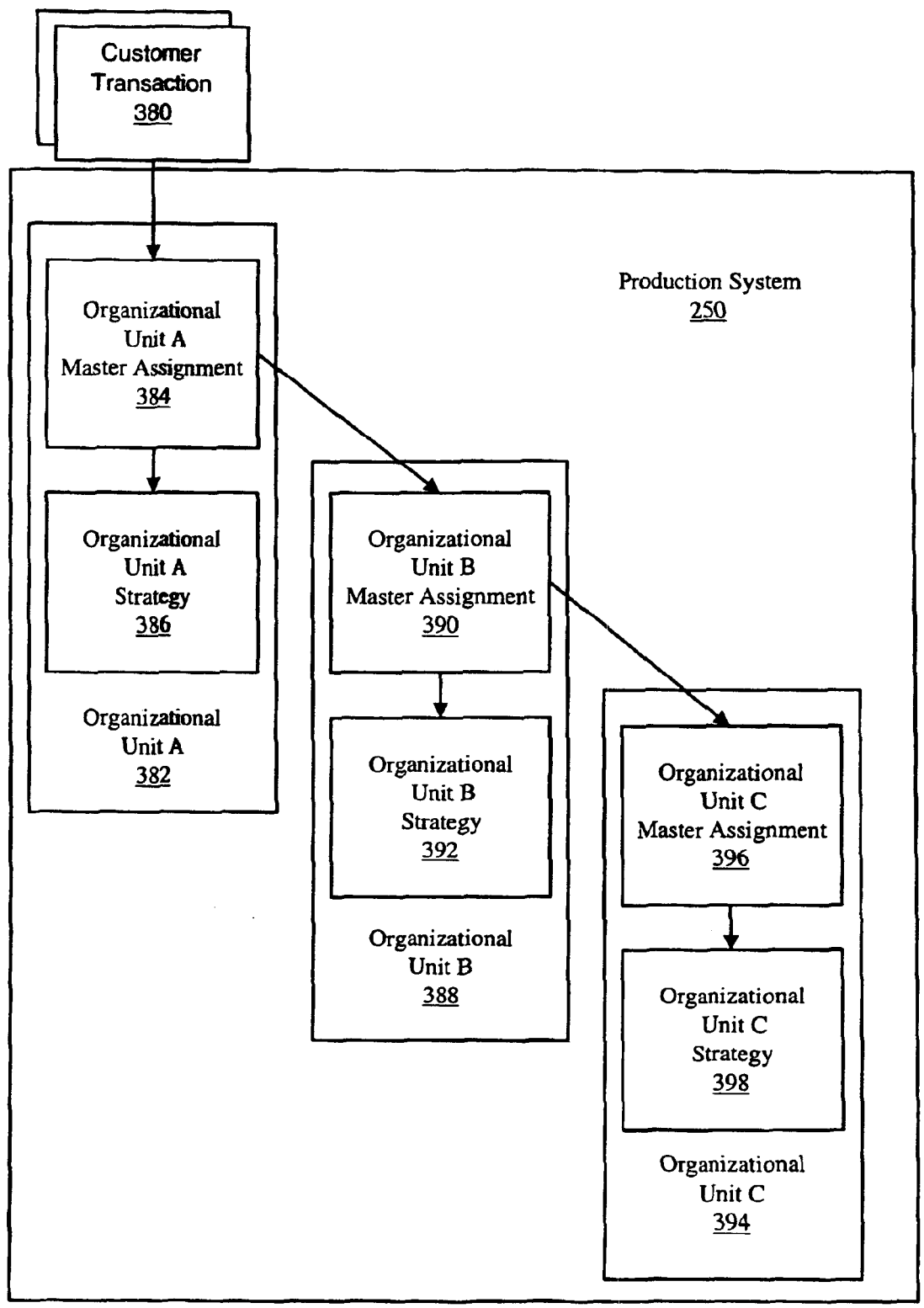
FIG. 12 illustrates the relationship among organizational units in customer processing in an embodiment of a production system.

FIG. 12: The Relationship among Organizational Units in Customer Processing in an Embodiment of a Production System FIG. 12 shows a production system 250 in which several organizational units may be configured to process business product transactions for customers of a FSO. This illustration is used to show how linking master assignments in a business model system's assignment and strategy design subsystems may be used to model a FSO-wide business product transaction processing production system involving several organizational units. A customer's business product transaction 380 may enter the production system and may start at organizational unit A's master assignment 384. Master assignment 384 may examine business product transaction 380 to determine if organizational unit A 382 is responsible for handling transactions of this type. If organizational unit A 382 is responsible for processing transaction 380, master assignment 384 may pass transaction 380 to strategy 386 for processing. If organizational unit A 382 is not responsible for processing transaction 380, master assignment 384 may forward transaction 380 to organizational unit B 388. Organizational unit B's master assignment 390 may examine business product transaction 380 and determine that organizational B is not responsible for processing transaction 380. Master assignment 390 may forward transaction 380 to organizational unit C 394 for processing.

Figure 13:
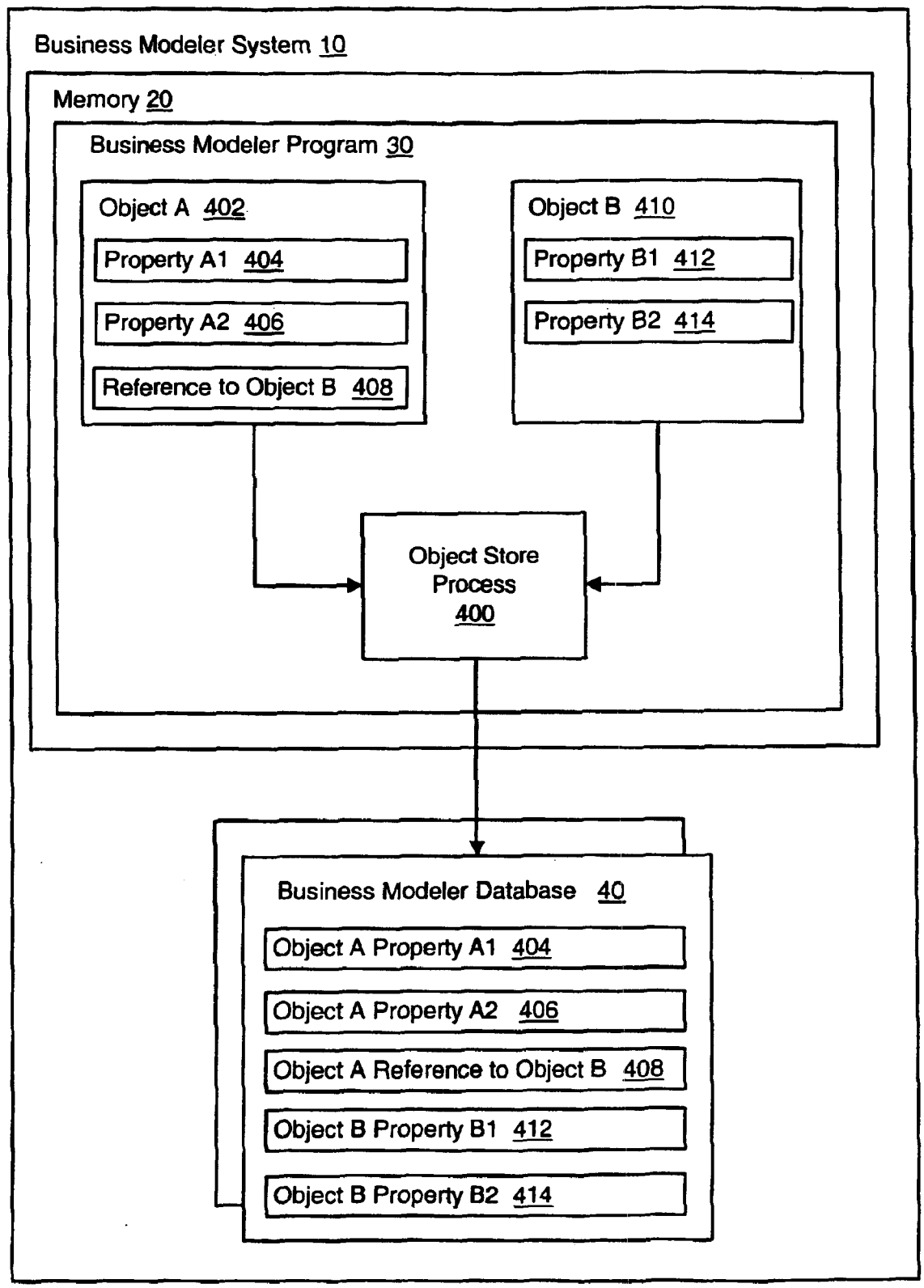
FIG. 13 illustrates an embodiment of a database store process for business modeler objects.

FIG. 13: An Embodiment of a Database Store Process for Business Modeler Objects

FIG. 13 shows an embodiment of a business modeler system similar to the one described in FIG. 1a. This embodiment includes an object store process 400 as part of business modeler program 30. Object store process 400 may take one or more business model objects currently residing in business modeler program 30's program memory and store the objects in business modeler database 40. Object store process 400 may decompose the objects into their component properties and store each property as a line or record in database 40. In this example, two objects are shown, object A 402 and object B 410. Object A 402 includes three properties. Property Al 404 and property A2 406 may be alphanumeric values such as object name, object type, numerical value, identification number, or any other property that describes object A 402. Reference to object B 408 is a special type of property. A reference property is an object property that describes the relationship an object in the business model has to another object in the business model. A reference property may describe a parent-child relationship between objects or it may describe a relationship where one object refers to another object that is not a child of the first object In this example, reference property 408 refers to a child object B 410. Object B 410 includes two properties, property B1 412 and property B2 414. Another example of a property relationship is a send to organizational unit task which is resolved to send a business product transaction from one organizational unit's assignment map to a second organizational unit's assignment map. The first organizational unit's send to organizational unit task object may include a reference property specifying the assignment map object of the second organizational unit.

Object store process 400 is aware of the business model objects included in the business model currently loaded in business modeler program 30's memory. Object store process 400 may iterate through the objects, decompose each object into its component properties, and store the object' properties as records in business model database 40. The object property records in business model database 40 may include enough information to reconstruct the business model and all of the business model objects included in the business model in a subsequent execution of business modeler program 30.

Figure 14:
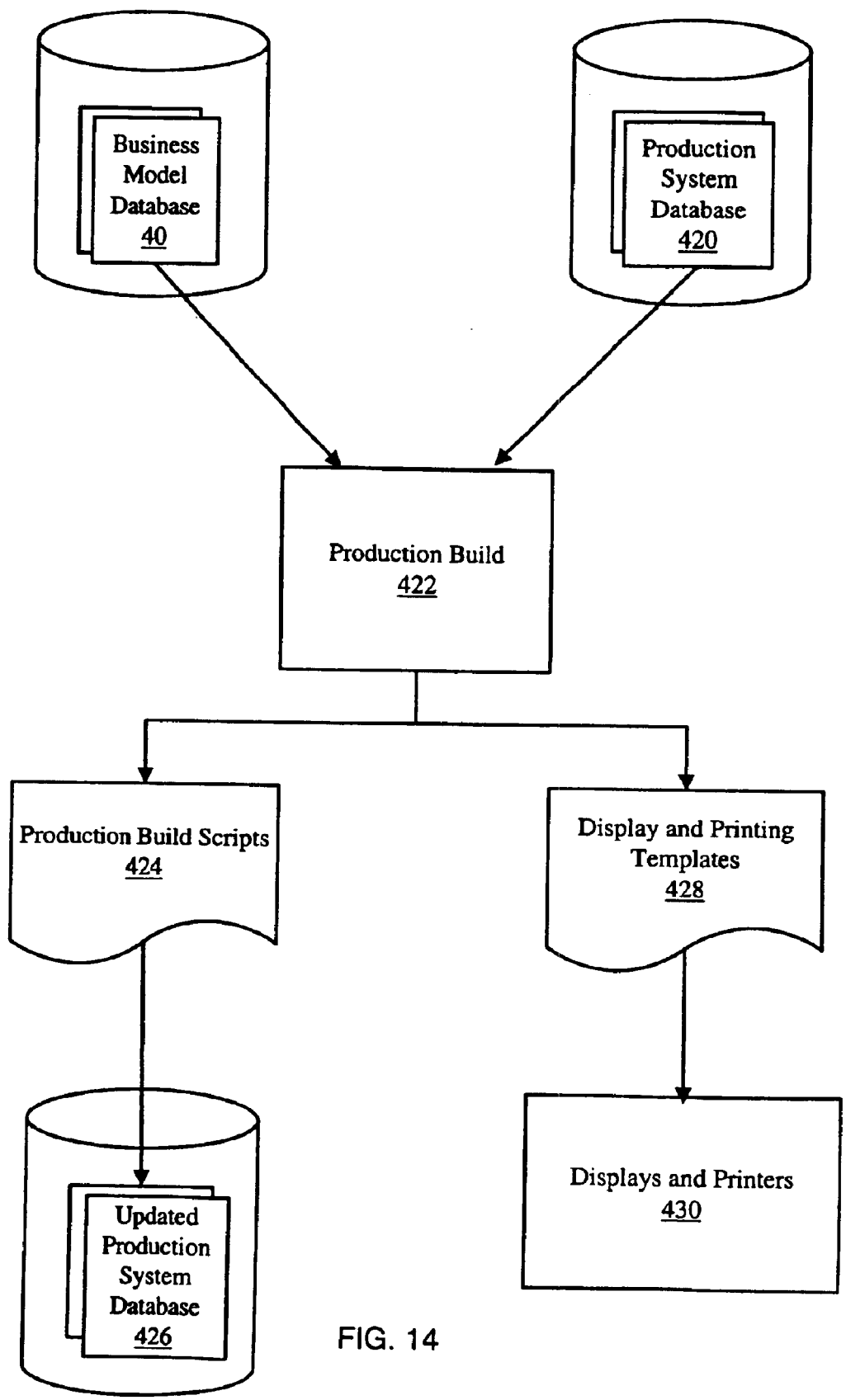
FIG. 14 illustrates an embodiment of a process for converting a business model defined in an embodiment of a business modeler into a production system database.

FIG. 14: An Embodiment of a Process for Converting a Business Model Defined in an Embodiment of a Business Modeler System into a Production System Database FIG. 14 illustrates one embodiment of a process for converting a business model defined in an embodiment of a business modeler system into a production system database. Business model database 40 may have been created or updated by a process such as that illustrated in FIG. 13. A production build program 422 may reside on the business modeler system or may reside on another system having access to the business modeler system. In one embodiment, production build 422 may be a subprogram or component of the business modeler system. In another embodiment, production build 422 may be a standalone program.

Production build 422 may include information describing t mat of business model database 40 and production system database 420. In one embodiment, production build 422 may compare the business transaction processing business model described in business model database 40 with a previously implemented business transaction processing database stored in production system database 420. Production build 422 may search for differences between the new model and the previously implemented model. In one embodiment, production build 422 may create production build scripts 424 including instructions for updating production system database 420 to match the updated business model described in business model database 40. Scripts 424 may then be prepared for application to production system database 420 by a database administrator. Scripts 424 may then be executed to apply the updates to production system database 420. The execution of scripts 424 may be performed when the production system is offline and not accessing the database or scripts 424 may be executed when the production system is online. In another embodiment, production build 422 may directly update production system database 420, bypassing the creation of scripts 424. In yet another embodiment, a business model database 40 created in a business modeler system may be used directly as a production system database 420 without going through a production build process.

Production build 422 may also output display and printing templates 428 in response to the comparison between business model database 40 and production system database 420. Display and printing templates 428 may be used in a production system to display customer information including documents included in a business product transaction on client systems and to print documents on printers available to the production and client systems. Display and printing templates 428 may have a one-to-one correspondence to document template objects defined in the business modeler system.

Figure 15:
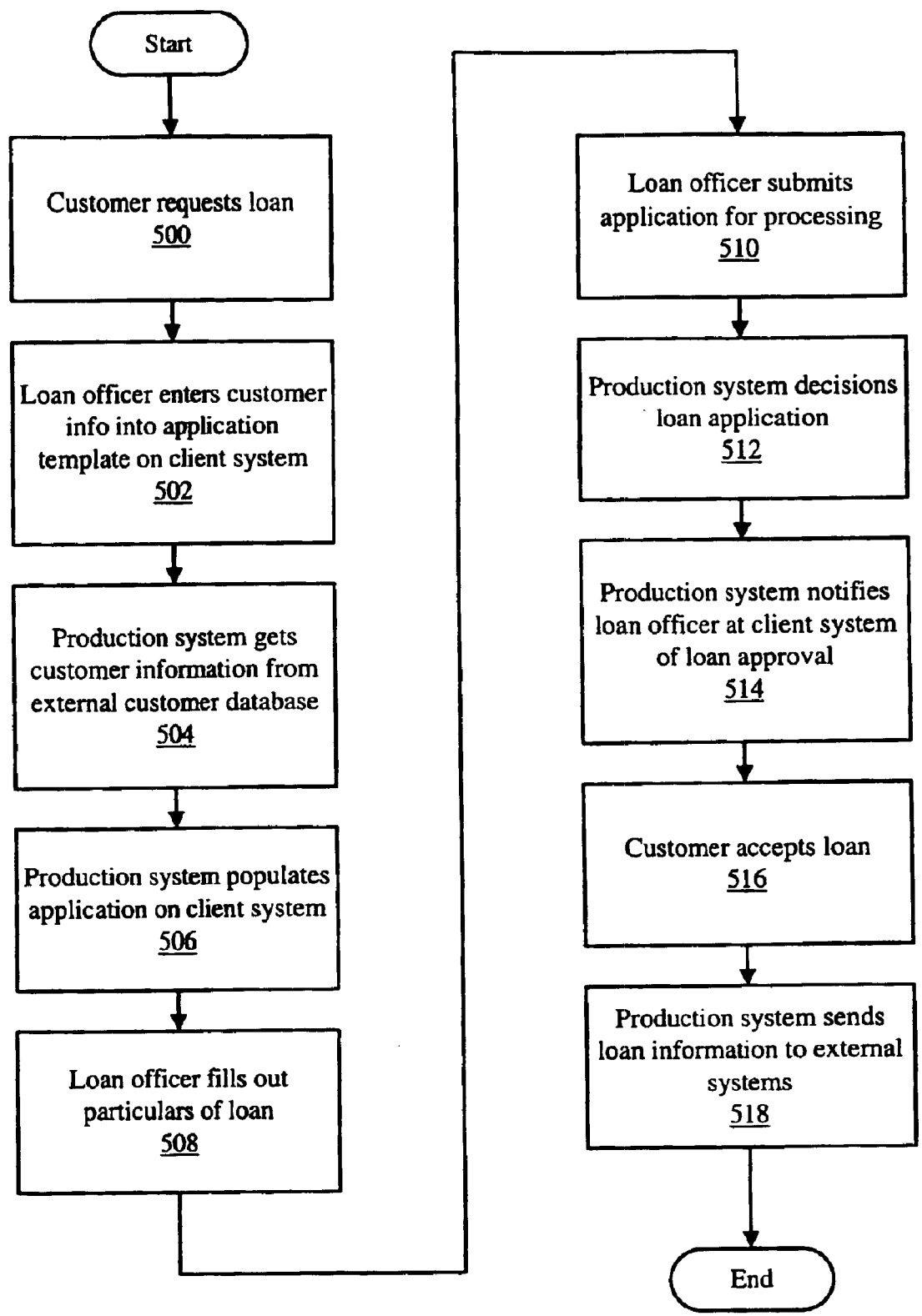
FIG. 15 is a flowchart describing an example of a business product transaction processing flow in an embodiment of a production system that was modeled in an embodiment of a business modeler system.

FIG. 15: A Flowchart Describing an Example of a Business Product Transaction Processing Flow in an Embodiment of a Production System that was Modeled in an Embodiment of a Business Modeler System FIG. 15 shows a flowchart of a business product transaction processing example in an embodiment of a production system that was modeled in an embodiment of a business modeler system. The example illustrates a typical example of a customer applying for and being approved for a loan. In step 500, the customer enters the FSO office and requests a loan. In step 502, a loan officer sitting at a client system in the production environment brings up a loan application template on the client system screen and enters basic customer information such as name and social security number, and submits the loan application to the production system. In step 504, the production system uses the customer information from the loan application to gather existing information on the customer. This may include sending a request to search for the customer in the FSO's customer database over an external interface. In step 506, the production system may populate the loan application with customer information received from external sources via external interfaces and present the populated loan application to the loan officer on the client system. In step 508, the loan officer may then fill out more information specific about this loan for this customer. In step 510, the loan officer submits the completed application to the production system for processing. In step 512, the production system then may evaluate all the information gathered about the customer, score the customer's application for this loan, and decide that the loan is approved. In step 514, the production system sends a message to the client system to notify the loan officer that the loan is approved. The customer may then accept the terms of the loan and notify the loan officer, who may tell the production system the loan is accepted in step 516. In step 518, the production system may send the loan information to external FSO computer systems for loan issuance.

Figure 16:
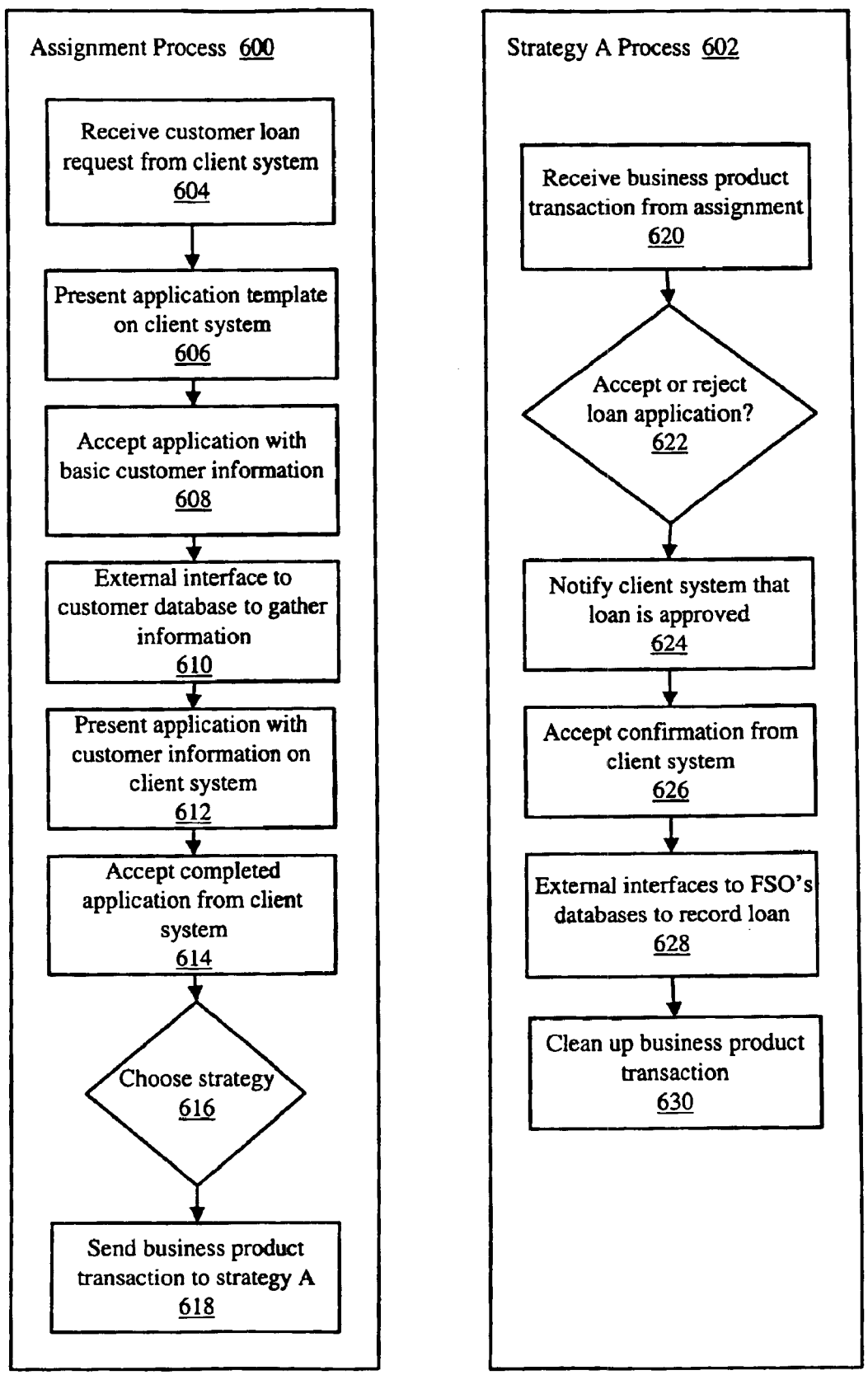
FIG. 16 illustrates how the example in FIG. 15 may be modeled in an assignment and strategy map in one embodiment of a business modeler system.

FIG. 16: Illustrates how the Example in FIG. 15 may be Modeled in an Assignment and Strategy Map in one Embodiment of a Business Modeler System FIG. 16 illustrates how the example in FIG. 15 may be modeled in an assignment and strategy map in one embodiment of a business modeler system. Part of the loan application process illustrated in FIG. 15 is modeled as tasks in the assignment process 600. The rest is modeled as tasks in the strategy A process 602. This example shows the assignment process map and strategy process map as a series of simplified, sequential tasks and leaves out branches such as alternative strategies at step 616 and loan rejection at task 622.

Task 604 is configured as a starting task for assignment process 600. Assignment process 600 may be configured to process applications for a particular FSO product. Task 604 may be configured to accept an application for a product. In this example, task 604 is configured to accept a request for a loan application. Task 606 may be configured to send a loan application to a client system. Task 608 may be configured to accept a loan application with basic customer information filled in. Task 610 may be configured to invoke an external interface to the FSO's customer database to retrieve information on a customer and to map the retrieved customer information onto a loan application. Task 612 may be configured to send a partially completed loan application to a client system. Task 614 may be configured to accept a completed application from a client system. Task 616 is a decision task that may be configured to choose an appropriate strategy for a loan application based upon information on the loan application and any other customer information that is available. Task 618 may be one of several branches off task 616. Task 618 may be configured to send a loan application and all available information to a strategy, in this example strategy A 602.

Strategy process A 602 may start at task 620, which may be configured for receiving a loan application and associated customer information from an assignment process. Task 622 is a decision task, and may be configured to gather more information about a customer, perform calculations on data elements in a loan application, and score the loan application. Task 622 may then compare a score for a loan application against a loan accept/decline score constant to determine if the loan is approved. Task 624 may be one of several branches off task 622. Other branches may include a task to be invoked if a loan application is not approved. Task 624 may be configured to notify a client system that a loan application is approved. Task 626 may be configured to accept a loan acceptance confirmation message from a client system. Task 628 may be configured to invoke one or more external interfaces to FSO systems to inform the systems to implement and record a newly approved loan. Task 630 may be configured to clean up a production system by deleting any temporary files created in the production system during loan application processing.

Figure 17:
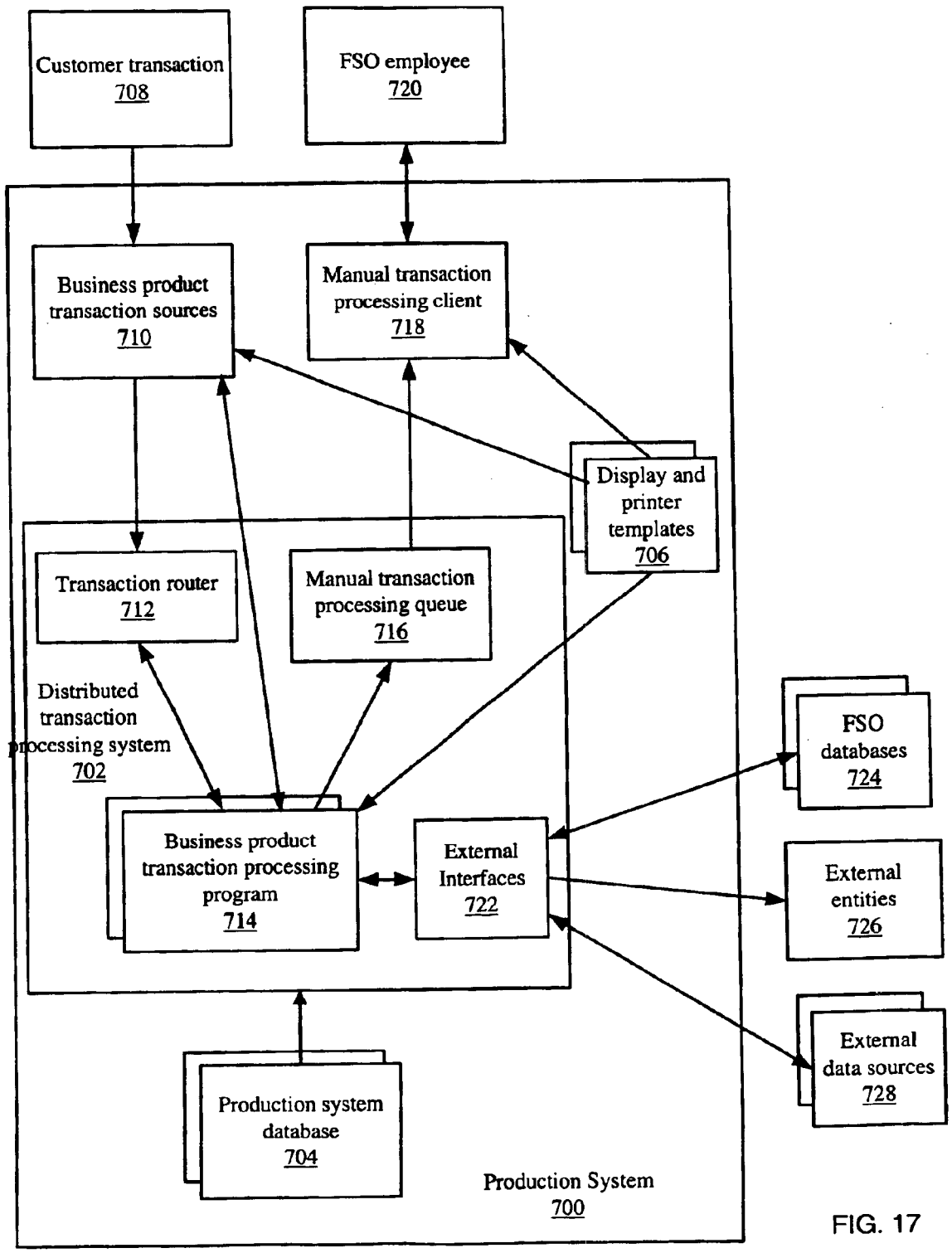
FIG. 17 is a block diagram of an embodiment of a production system illustrating the usage of a production system database.

FIG. 17: A Block Diagram of an Embodiment of a Production System Illustrating the Usage of a Production System Database FIG. 17 shows an embodiment of a production system 700 and is included to illustrate the usage of a production system database, display templates, and printer templates created by the process described in FIG. 14. This embodiment of a production system may be described as a client/server system configured to process business product transactions in a distributed, transaction-processing environment. A definition of a distributed, transaction-processing environment as used herein is a system including multiple computer systems acting as servers, wherein copies of a business product transaction processing program reside on one or more servers, and wherein a transaction router program configured to distribute transactions among the business product transaction processing programs resides on a server. A transaction may be executed by any of the business product transaction processing programs. The transaction router may choose a business product transaction processing program based upon available resources and workload. Users at client workstations may enter business product transactions into the system, and results of transaction processing may be reported to the users at the client workstations.

Referring to FIG. 17, production system 700 may include a distributed transaction processing system 702, one or more transaction sources 710, one or more manual transaction processing clients 718, a production system database 704, and display and printer templates 706. Distributed transaction processing system 702 may be configured to receive customer business product transactions 708 from one or more sources or clients, perform business product transaction processing on the received transactions, and report the results of the transaction processing back to the clients. Distributed transaction processing system 702 may include a transaction router 712, one or more copies of a business product transaction processing program 714 residing on one or more servers, one or more manual transaction processing queues 716, and one or more external interfaces 722.

Business product transaction processing program 714 may include one or more implementations of processing tasks. Processing tasks perform operations on work packets. A work packet may be defined as a collection of documents associated with a particular customer's business product transaction. Examples of operations that may be performed on work packets include, but are not limited to: adding documents to a work packet, modifying data elements in the documents, performing calculations with data elements, making decisions based upon data elements, invoking external interfaces, sending work packets to queues, and sending work packets to other organizational units.

Figure 18A:
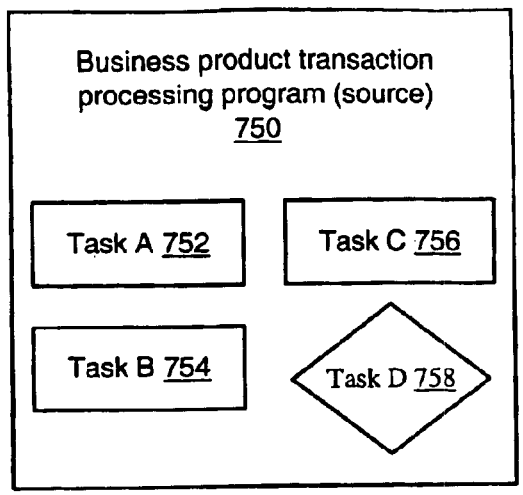
FIG. 18a illustrates one embodiment of a data-driven business product transaction processing program.
Figure 18B:
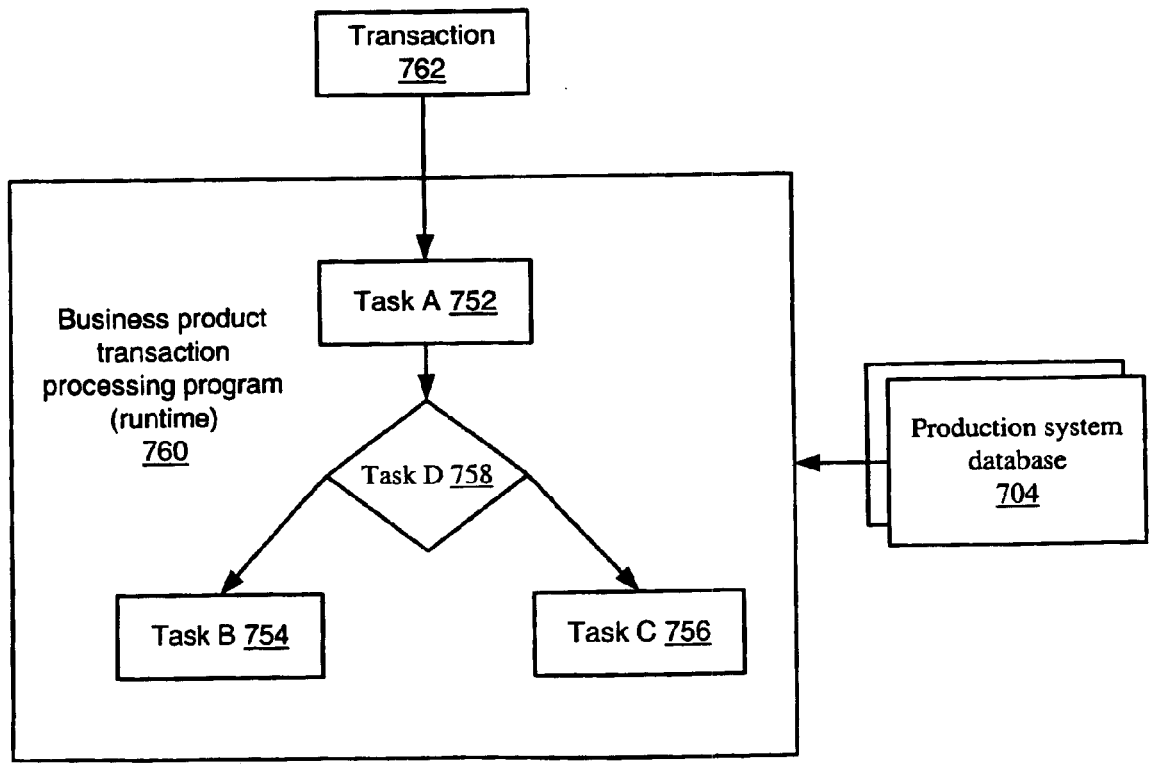
FIG. 18b illustrates another embodiment of a data-driven business product transaction processing program.

Production system 700 may be described as a data-driven system. The processing tasks included in business product transaction processing program 714 are preprogrammed into the system. However, the actual paths through the processing tasks that transactions may take while being processed by business product transaction processing program 714 are not preprogrammed. Instead, the paths through the processing tasks are dynamically defined by the contents of the production system database 704 at runtime. The formats and contents of documents, display screens, and printed output may also be defined in production system database 704 or in display and printer templates 706 and may be dynamically accessed by business product transaction processing program 714 at runtime. FIGS. 18*a* and 18*b*, described below, graphically illustrate a data-driven business product transaction processing program.

Referring to FIG. 17, a customer transaction 708 may enter production system 700 through one of several business product transaction sources. Examples of sources include, but are not limited to: a FSO employee entering data such as loan applications on a workstation, batches of transactions being fed automatically into the production system, and a customer directly initiating a transaction at a workstation or via the Internet. Transaction router 712 acquires incoming business product transactions and distributes the processing of the business product transactions among the processing tasks included in the copies of the business product transaction processing program.

Transaction router 712 may begin the processing of a business product transaction by sending the business product transaction to a first processing task in business product transaction processing program 714. When the first processing task completes, it may notify transaction router 712 that it has finished. The first processing task may also notify transaction router 712 of the next processing task for the business product transaction. Transaction router 712 may then send the business product transaction to the next processing task. Processing tasks may send feedback on the processing of the business product transaction to a client workstation 710 that was the source of the transaction. A FSO employee may enter additional information in response to the feedback. Processing tasks may request and receive data from one or more of the FSO's databases external to the production system through external interfaces 722. Processing tasks may also request and receive data from one or more sources external to the FSO through external interfaces 722. Examples of external data sources include, but are not limited to: credit bureaus and other FSOs. Processing tasks may also send correspondence documents to one or more external entities 726 through external interfaces 722. An example may be sending a letter to the customer associated with the business product transaction. Some processing tasks may be configured to delay the processing of the business product transaction for a length of time. An example may be delaying 30 days after sending a notice of delinquency before starting a next funds collections task.

The processing of the business product transaction continues until the transaction comes to a final resolution. If a business product transaction is successfully resolved automatically by the distributed transaction processing system 702, the results of the resolution may be reported back to the client workstation 710 that was the source of the transaction. Documents associated with the business product transaction may be sent to FSO databases 724 through external interfaces 722. If a business product transaction cannot be successfully resolved automatically by the distributed transaction processing system 702, the transaction may be sent to a manual transaction processing queue 716 for manual processing by a FSO employee 720 working at manual transaction processing client workstation 718. Customer documents may be sent to an external entity if the business product transaction was not successfully resolved automatically. An example may be reporting a customer to an external collections agency for funds collection if the FSO's internal collections strategy did not succeed with the customer. After resolution of a transaction, FSO databases 724 may be updated with documents associated with the business product transaction through external interfaces 722.

FIGS. 18*a* and 18*b*: A Data-Driven Business Product Transaction Processing Program FIGS. 18*a* and 18*b* illustrate one embodiment of a data-driven transaction processing program. FIG. 18*a* shows business product transaction processing program 750 including four tasks, task A 752, task B 754, task C 756, and decision task D 758. Tasks A through C are processing tasks and include one input for a business product transaction and one output for the business product transaction. Task D is a decision processing task and includes one input for a business product transaction and one or more outputs for the business product transaction. Tasks A through D may not be logically connected in the source code or compiled machine code of program 750. Program 750 may be defined as including a library of independent processing tasks.

In FIG. 18*b*, at runtime, business product transaction processing program 760 may access production system database 704 to determine transaction processing flow. When a transaction 762 enters program 760, a transaction type may be determined for the transaction by examining attributes of the transaction included in the transaction data. The transaction type may-then be compared with records in database 704 to determine a first processing task for this transaction type. For example, a transaction may be an application for a credit card type X and may have been entered at branch office A. A first processing task for a credit card type X at branch office A may be the first task defined in the branch office's master assignment map for credit card type X. In this example, task A 752 may be the first task. Processing task A 752 may access database 704 during execution of processing steps to read data values, data formats, or other data as required. When processing task A 752 completes its processing steps, it may access database 704 to determine the next processing task for this transaction type. In this example, decision task D 758 may be the next processing task. When decision task D completes, it may access database 704 to determine a next processing task, and may use transaction data along with the transaction type to choose among multiple possible next processing tasks for this transaction type. For example, a decision task may compare a customer's age to a customer age limit stored in database 704, send the transaction to task B 754 if the customer is under 30, or send the transaction to task C 756 if the customer is 30 or above.

Figure 19:
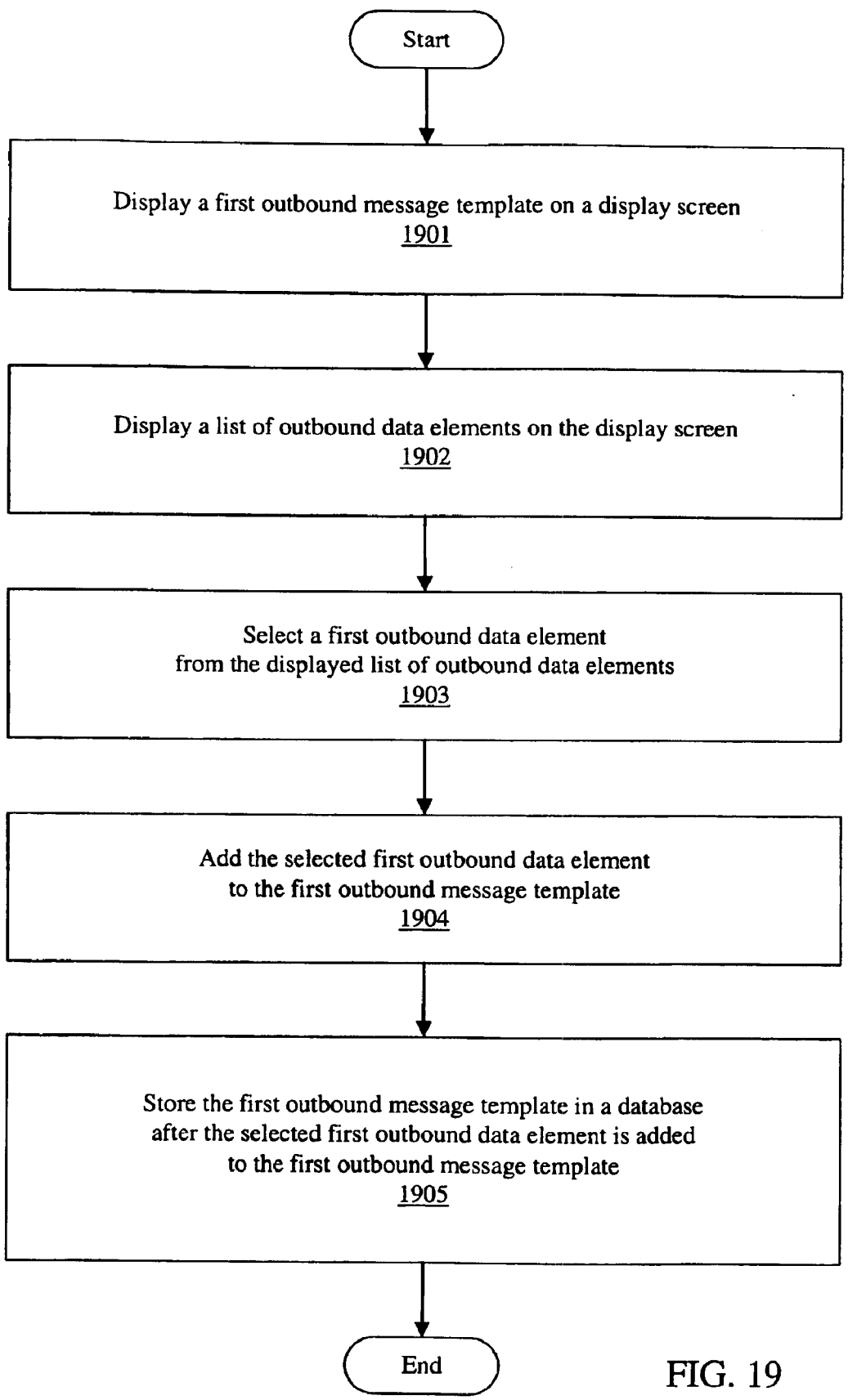
FIG. 19 is a flowchart illustrating an overview of storing an outbound message template according to one embodiment.

FIG. 19: Storing an Outbound Message Template

FIG. 19 shows an embodiment of the system and method for requesting data from an external computer system in a generic fashion. As shown in FIG. 19, according all to one embodiment, an initial process may include displaying a first outbound message template on a display screen in step 1901, wherein the first outbound message template represents a first outbound message wherein the first outbound message represents a request for financial service organization data to be used in a financial service organization computer system for processing a financial service organization transaction between a financial service organization and a financial service organization customer, wherein the first outbound message is configured for transmission between the financial service organization computer system and an external computer system that stores the financial service organization data, and wherein the external computer system is in data communication with the financial service organization computer system. The term "financial service organization transaction" is used synonymously with "FSO business product transaction" herein. In step 1902, a list of outbound data elements may be displayed on the display screen wherein each outbound data element when contained in the first outbound message is configured to be sent to the external computer system by the financial service organization computer system. In step 1903, a first outbound data element may be selected from the displayed list of outbound data elements. In step 1904, the selected first outbound data element may be added to the first outbound message template. In step 1905, the first outbound message template may be stored in a database after the selected first outbound data element is added to the first outbound message template.

Figure 20:
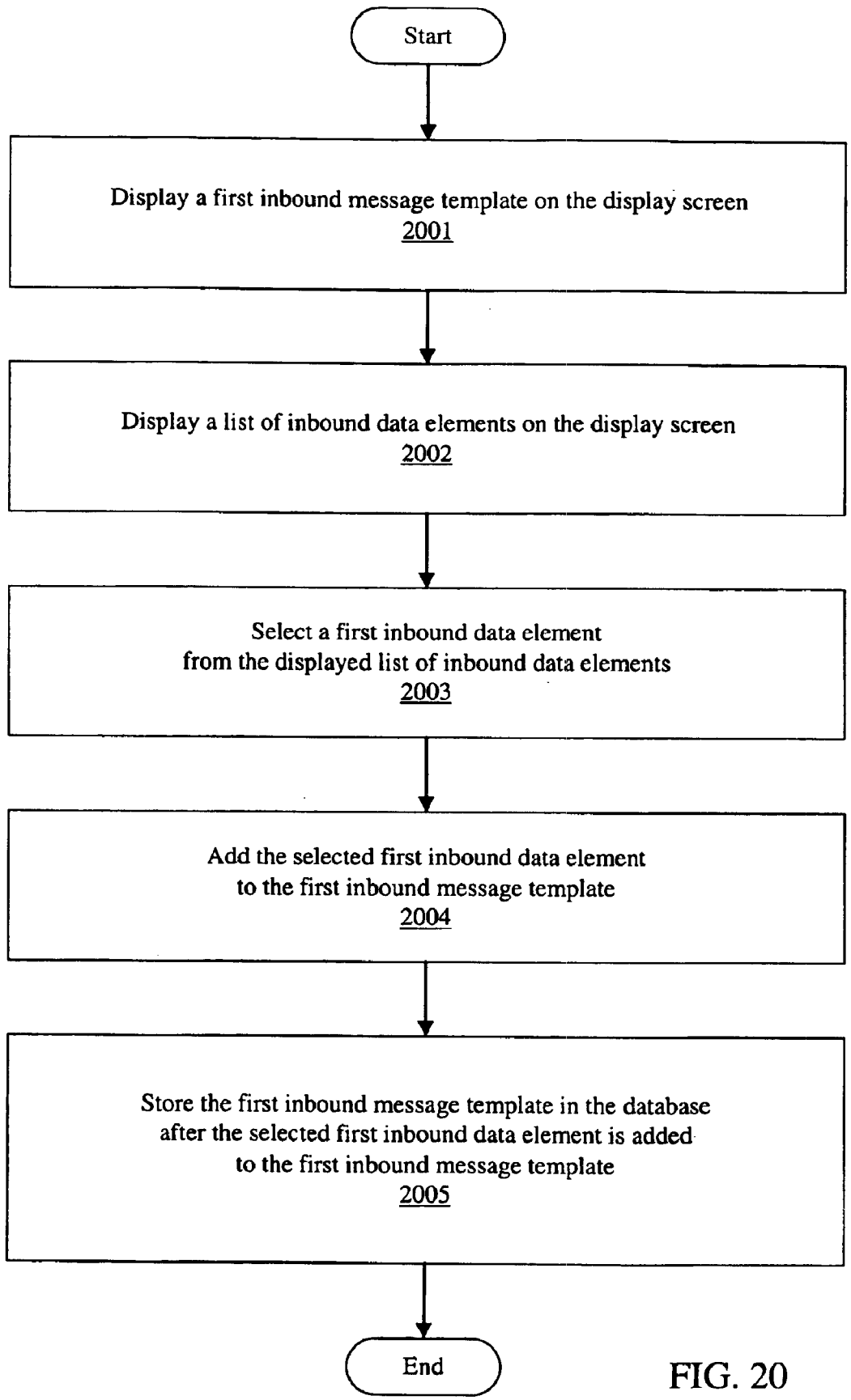
FIG. 20 is a flowchart illustrating an overview of storing an inbound message template according to one embodiment.

FIG. 20: Storing an Inbound Message Template

FIG. 20 shows an embodiment of the system and method for receiving data from an external computer system in a generic fashion. As shown in FIG. 20, according to one embodiment, an initial process may include displaying a first inbound message template on the display screen in step 2001, wherein the first inbound message template represents a first inbound message wherein the first inbound message represents a receipt of financial service organization data to be used in the financial service organization computer system for processing the financial service organization transaction between the financial service organization and the financial service organization customer, wherein the first inbound message is configured for transmission between the external computer system that stores the financial service organization data and the financial service organization computer system, and wherein the external computer system is in data communication with the financial service organization computer system. In step 2002, a list of inbound data elements may be displayed on the display screen wherein each inbound data element when contained in the first inbound message is configured to be received from the external computer system by the financial service organization computer system. In step 2003, a first inbound data element may be selected from the displayed list of inbound data elements. In step 2004, the selected first inbound data element may be added to the first inbound message template. In step 2005, the first inbound message template may be stored in a database after the selected first inbound data element is added to the first inbound message template.

Figure 21:
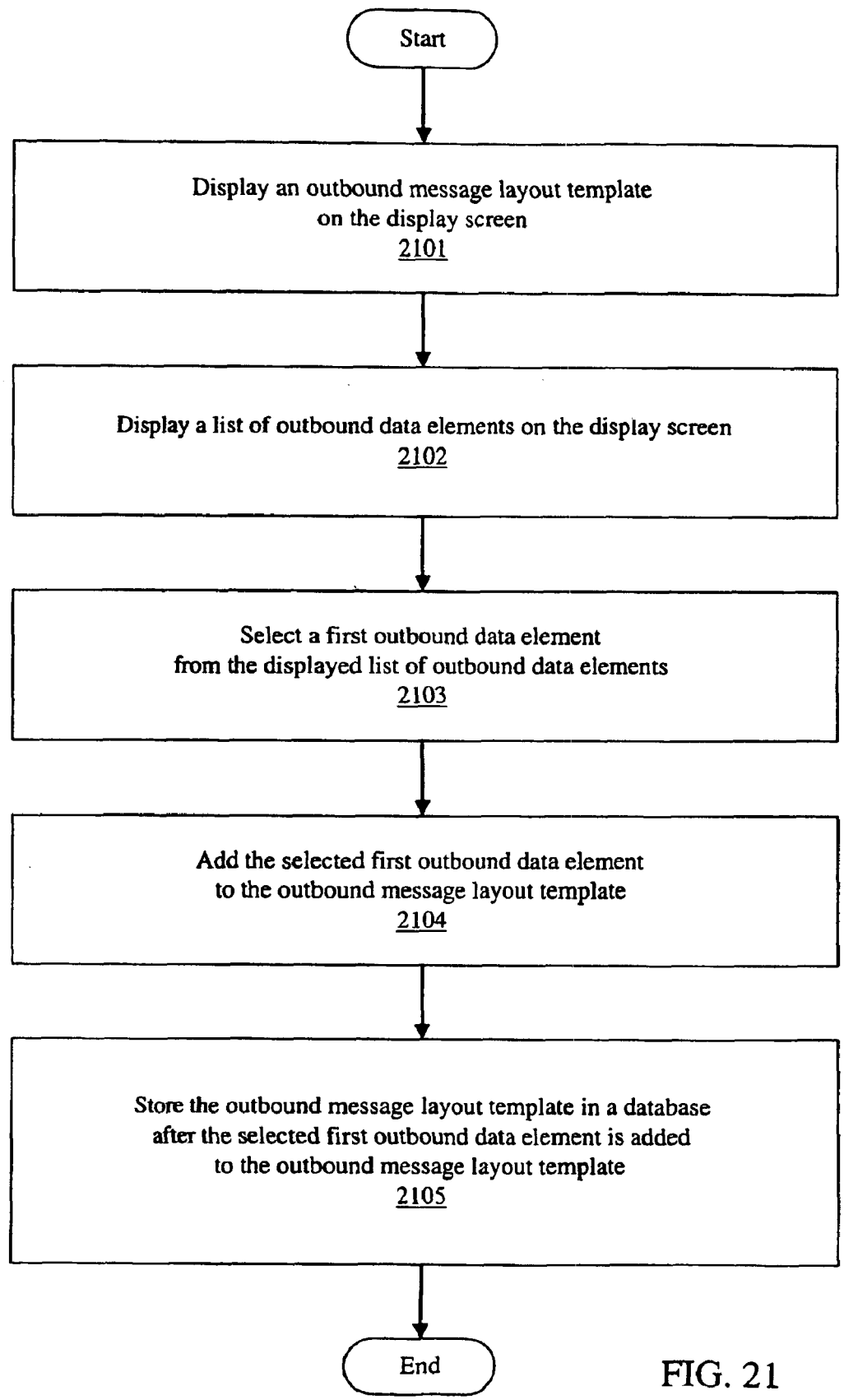
FIG. 21 is a flowchart illustrating an overview of storing an outbound message layout template according to one embodiment.

FIG. 21: Storing an Outbound Message Layout Template

FIG. 21 shows an embodiment of the system and method for requesting data from an external computer system in a generic fashion. As shown in FIG. 21, according to one embodiment, an initial process may include displaying an outbound message layout template on a display screen in step 2101, wherein the outbound message layout template represents a graphical presentation of the outbound message. In step 2102, a list of outbound data elements may be displayed on the display screen. In step 2103, a first outbound data element may be selected from the displayed list of outbound data elements. In step 2104, the selected first outbound data element may be added to the outbound message layout template. In step 2105, the outbound message layout template may be stored in a database after the selected first outbound data element is added to the outbound message layout template.

Figure 22:
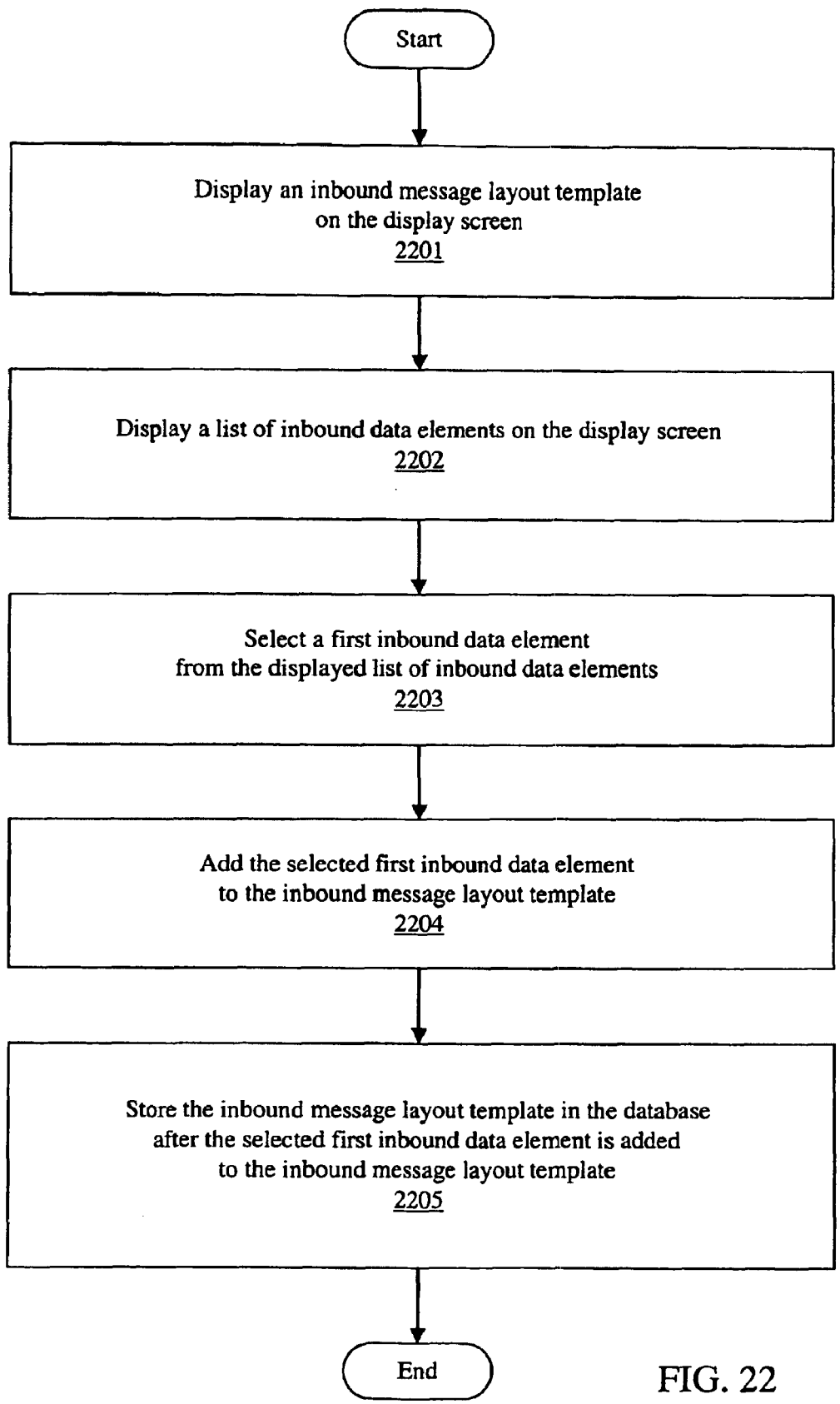
FIG. 22 is a flowchart illustrating an overview of storing an inbound message layout template according to one embodiment.

FIG. 22: Storing an Inbound Message Layout Template

FIG. 22 shows an embodiment of the system and method for receiving data from an external computer system in a generic fashion. As shown in FIG. 22, according to one embodiment, an initial process may include displaying an inbound message layout template on the display screen in step 2201, wherein the inbound message layout template represents a graphical presentation of the inbound message. In step 2202, the list of inbound data elements may be displayed on the display screen. In step 2203, the first inbound data element may be selected from the displayed list of inbound data elements. In step 2204, the selected first inbound data element may be added to the inbound message layout template. In step 2205, the inbound message layout template may be stored in the database after the selected first inbound data element is added to the inbound message layout template.

Figure 23:
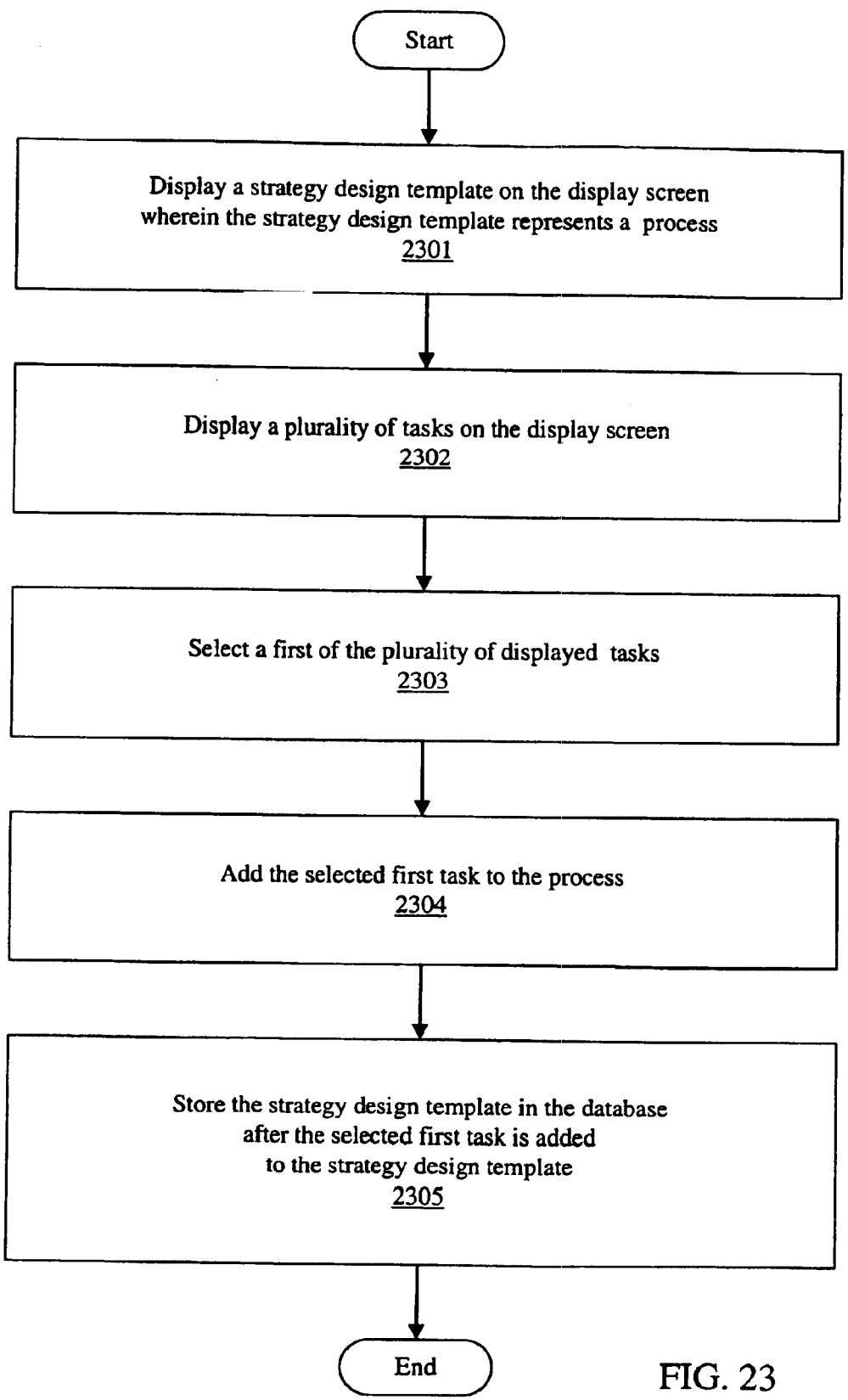
FIG. 23 is a flowchart illustrating an overview of storing a strategy design template according to one embodiment.

FIG. 23: Storing a Strategy Design Template

As shown in FIG. 23, according to one embodiment, a strategy design template may be displayed on the display screen in step 2301, wherein the strategy design template represents a process for processing the financial service organization transaction between the financial service organization and the financial service organization customer, the process including a plurality of tasks, wherein the tasks are executed in a sequential order. In step 2302, a plurality of tasks may be displayed on the display screen. In step 2303, a first of the plurality of displayed-tasks may be selected from the displayed list of tasks. In step 2304, the selected first task may be added to the process. According to one embodiment, the "selected first task" is an "Invoke External Interface" task. In step 2305, the strategy design template may be stored in the database after the selected first task is added to the strategy design template.

Figure 24:
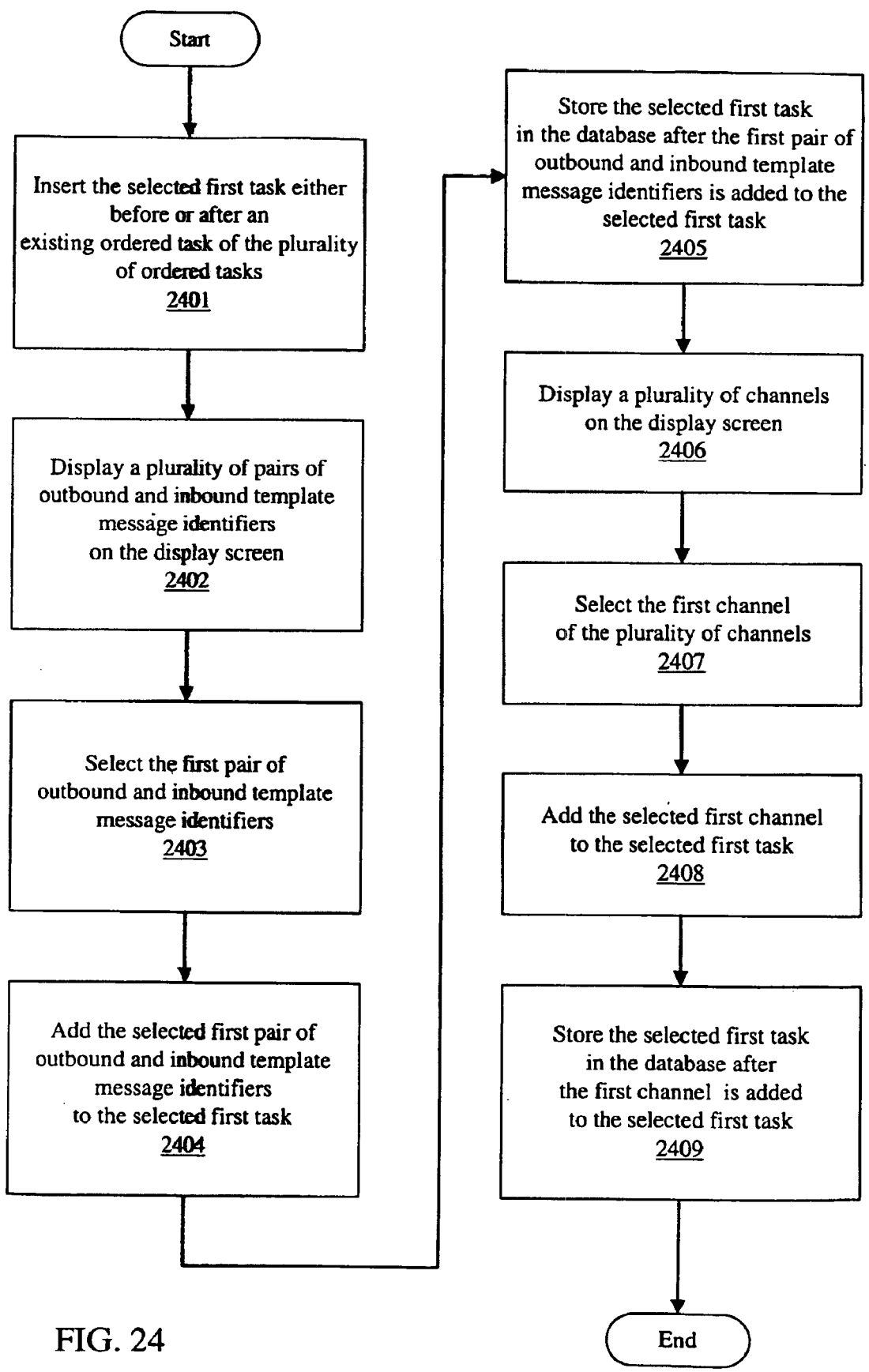
FIG. 24 is a flowchart illustrating an overview of storing an external interface task according to one embodiment.

FIG. 24: Storing an External Interface Task

FIG. 24 shows steps that may further illustrate adding the selected first task to the process, as shown by step 2304 in FIG. 23. The selection steps shown in FIG. 24 may be performed in any order, in various embodiments, including simultaneously. In step 2401, the selected first task may be inserted before or after an existing ordered task of the plurality of ordered tasks. In step 2402, a plurality of pairs of outbound and inbound template message identifiers may be displayed on the display screen, wherein the plurality of pairs of outbound and inbound template message identifiers include a first pair of outbound and inbound template message identifiers wherein the first pair of outbound and inbound template message identifiers represent the first outbound message request and the first inbound message receipt. In step 2403, the first pair of outbound and inbound template message identifiers may be selected. In step 2404, the selected first pair of outbound and inbound template message identifiers may be added to the selected first task. In step 2405, the selected first task may be stored in the database after the first pair of outbound and inbound template message identifiers is added to the selected first task. In step 2406, a plurality of channels may be displayed on the display screen. As used herein, a "channel" is a path that computers use to communicate and exchange information. An example of a channel is the IBM MQSeries available from IBM Corporation. The IBM MQSeries is an open, scalable, industrial-strength messaging and information infrastructure, providing any-to-any connectivity from desktop to mainframe platforms. Obtaining credit history information for a FSO customer from an external computer system belonging to a credit bureau is an example of using the IBM MQSeries channel. Another example of a channel is the Database channel, which allows communication between a computer system and a database. Adding records into a table in the Fraud database on a host FSO computer system is an example of using the Database channel. Another example of a channel is the Pseudo-Host channel, which is an application that emulates a mainframe computer system. In step 2407, the first channel of the plurality of channels may be selected. In step 2408, the selected first channel may be added to the selected first task. In step 2409, the selected first task may be stored in the database after the first channel is added to the selected first task.

Figure 25:
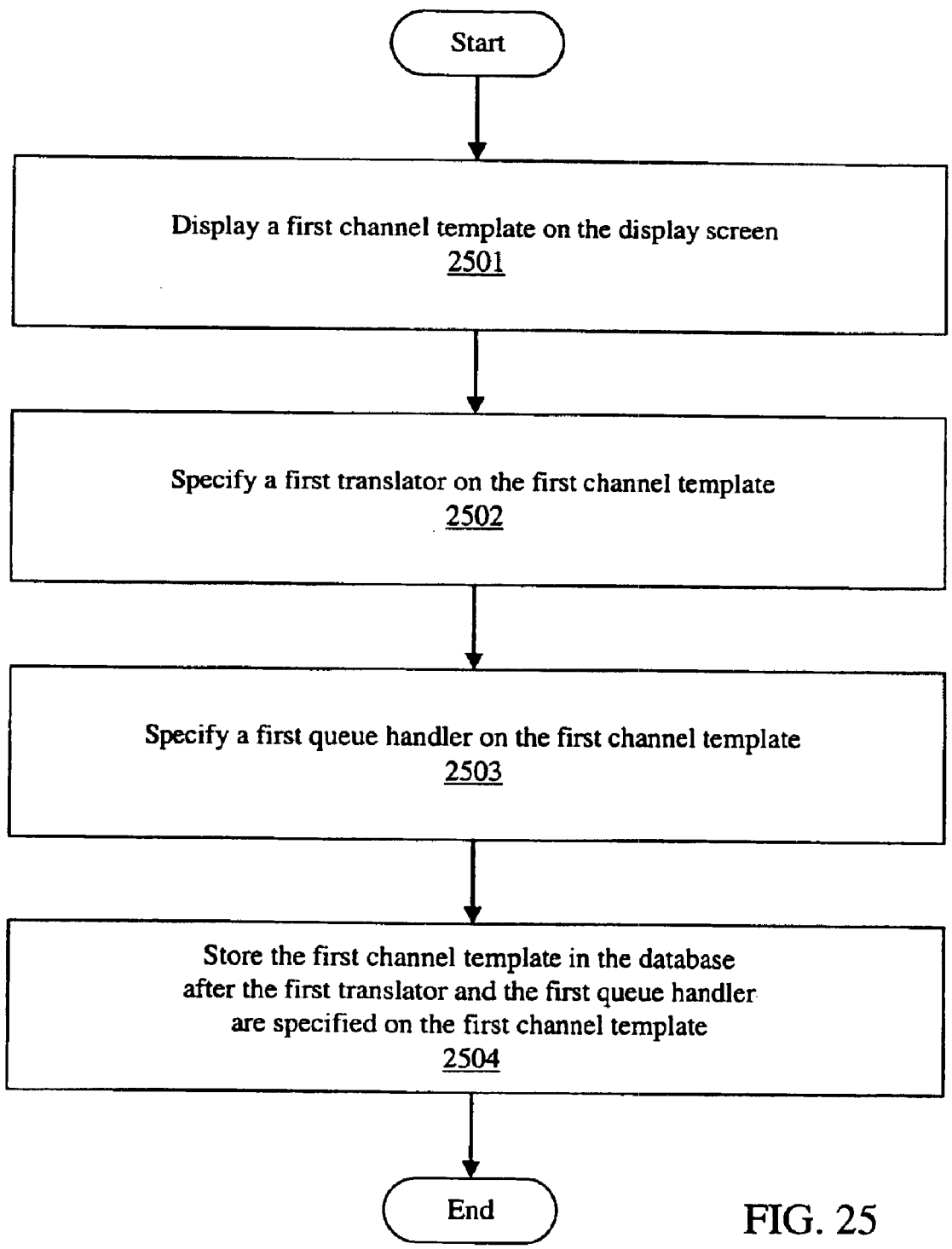
FIG. 25 is a flowchart illustrating an overview of storing a channel template according to one embodiment.

FIG. 25: Storing a Channel Template

As shown in FIG. 25, according to one embodiment, a first channel template may be displayed on the display screen in step 2501, wherein the first channel template represents a first channel wherein the first channel represents a means for transmitting data to and from the external computer system wherein the first channel is configured for transmitting data between the financial service organization computer system and the external computer system that stores the financial service organization data. As used herein, a "channel" is a path that computer systems use to communicate and exchange information. In step 2502, a first translator may be specified on the first channel template, wherein the first translator when contained in the first channel is configured to convert the first outbound message template to a format recognizable to the external computer system and to convert the first inbound message template to a format recognizable to the financial service organization computer system. In step 2503, a first queue handler may be specified on the first channel template, wherein the first queue handler when contained in the first channel is configured to move translated messages between a financial service organization computer system queue and an external computer system queue. In step 2504, the first channel template may be stored in the database after the first translator and the first queue handler are specified on the first channel template.

Figure 26:
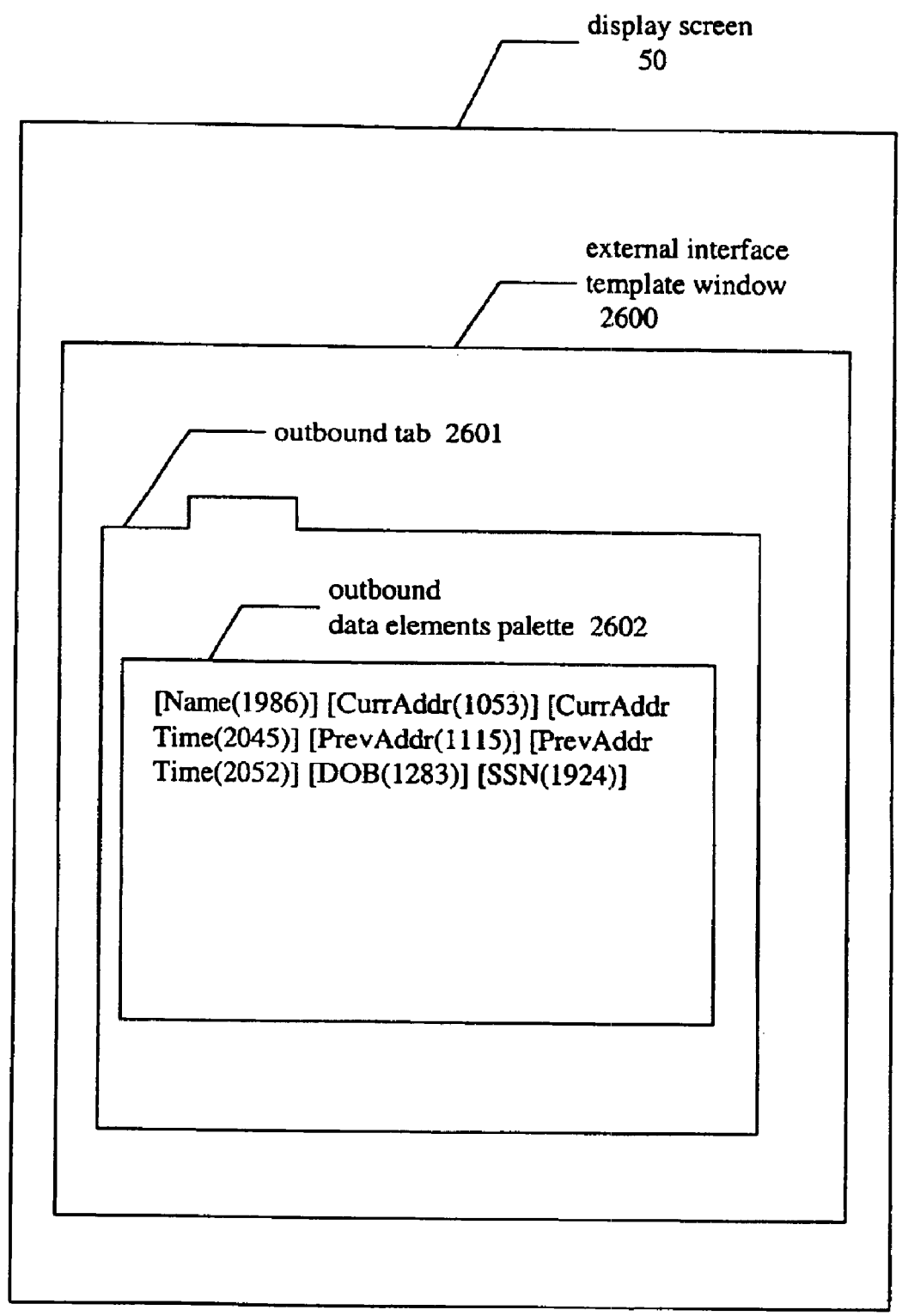
FIG. 26 is an illustration of an outbound tab of an external interface template window which is suitable for implementing various embodiments.

FIG. 26: Outbound Tab of an External Interface Template Window

FIG. 26 illustrates the outbound tab 2601 of the external interface template window 2600 according to one embodiment. The outbound tab 2601 of the external interface template window 2600 may include an outbound data elements palette 2602. The external interface template window 2600 may be displayed within a display screen 50. The display screen 50 may be connected to the computer system 10, of FIG. 1a. In one embodiment, where the financial service organization application is a collection system for delinquent accounts and the task to be invoked by the external interface is to obtain a credit report from a credit bureau company on a particular customer, the outbound data elements palette 2602 may include information about the particular customer, such as: name, current address, length of time at current address, previous address, length of time at previous address, date of birth, and social security number. As used herein, a "data element" may include an individual piece of information representing customer-related data. Data elements may include the following properties: name, unique identifier, data type (e.g., date, character, string, number, currency), maximum width, and display width. Data elements may be dragged from a list of data elements and dropped onto the outbound data elements palette 2602. When a data element is dropped onto the outbound data elements palette 2602, the data element may be represented on the outbound data elements palette 2602 by a combination of the data element name and the data element unique identifier, with the data element unique identifier surrounded by a pair of parenthesis and the combination of the data element name and the data element unique identifier surrounded by a pair of brackets. A single space may separate one data element from the next on the outbound data elements palette 2602.

Figure 27:
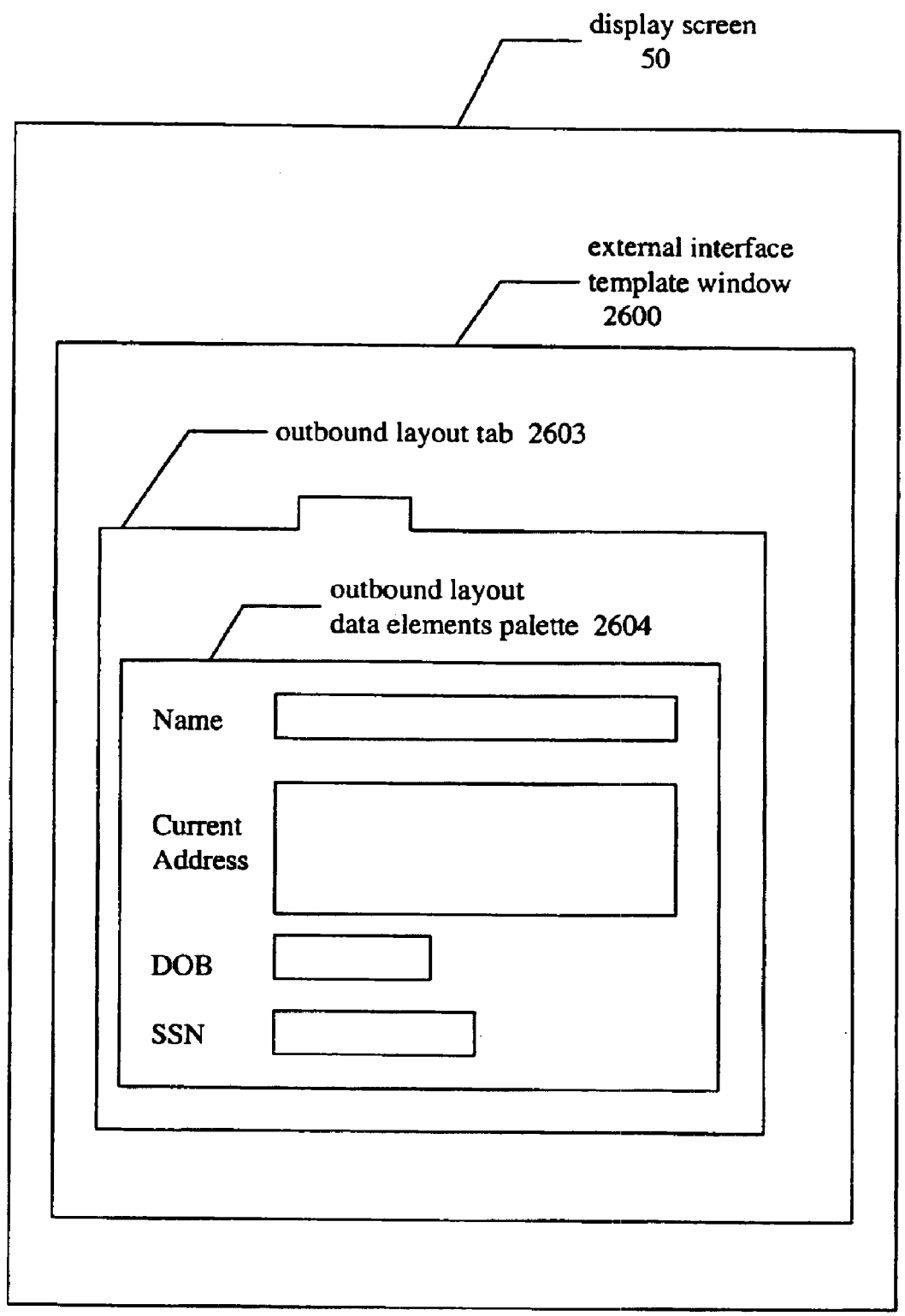
FIG. 27 is an illustration of an outbound layout tab of an external interface template window which is suitable for implementing various embodiments.

FIG. 27: Outbound Layout Tab of an External Interface Template Window

FIG. 27 illustrates the outbound layout tab 2603 of the external interface template window 2600 according to one embodiment. The outbound layout tab 2603 of the external interface template window 2600 may include an outbound layout data elements palette 2604. The external interface template window 2600 may be displayed within a display screen 50. The display screen 50 may be connected to the computer system 10, of FIG. 1a In one embodiment, where the financial service organization application is a collection system for delinquent accounts and the task to be invoked by the external interface is to obtain a credit report from a credit bureau company on a particular customer, the outbound layout data elements palette 2604 may include information about the particular customer, such as: name, current address, date of birth, and social security number. Data elements may be dragged from a list of data elements and dropped onto the outbound layout data elements palette 2604. When a data element is dropped onto the outbound layout data elements palette 2604, the data element may be represented on the outbound layout data elements palette 2604 by a user-specified adjustment of the data element name (e.g., adjusting the data element name "CurrAddr" to "Current Address") and a display field for the value of the "CurrAddr" data element. One advantage of allowing the user to specify an adjustment of the data element name is that the layout of the outbound message is more readable than if it were a continuous string of alphanumeric characters.

Figure 28:
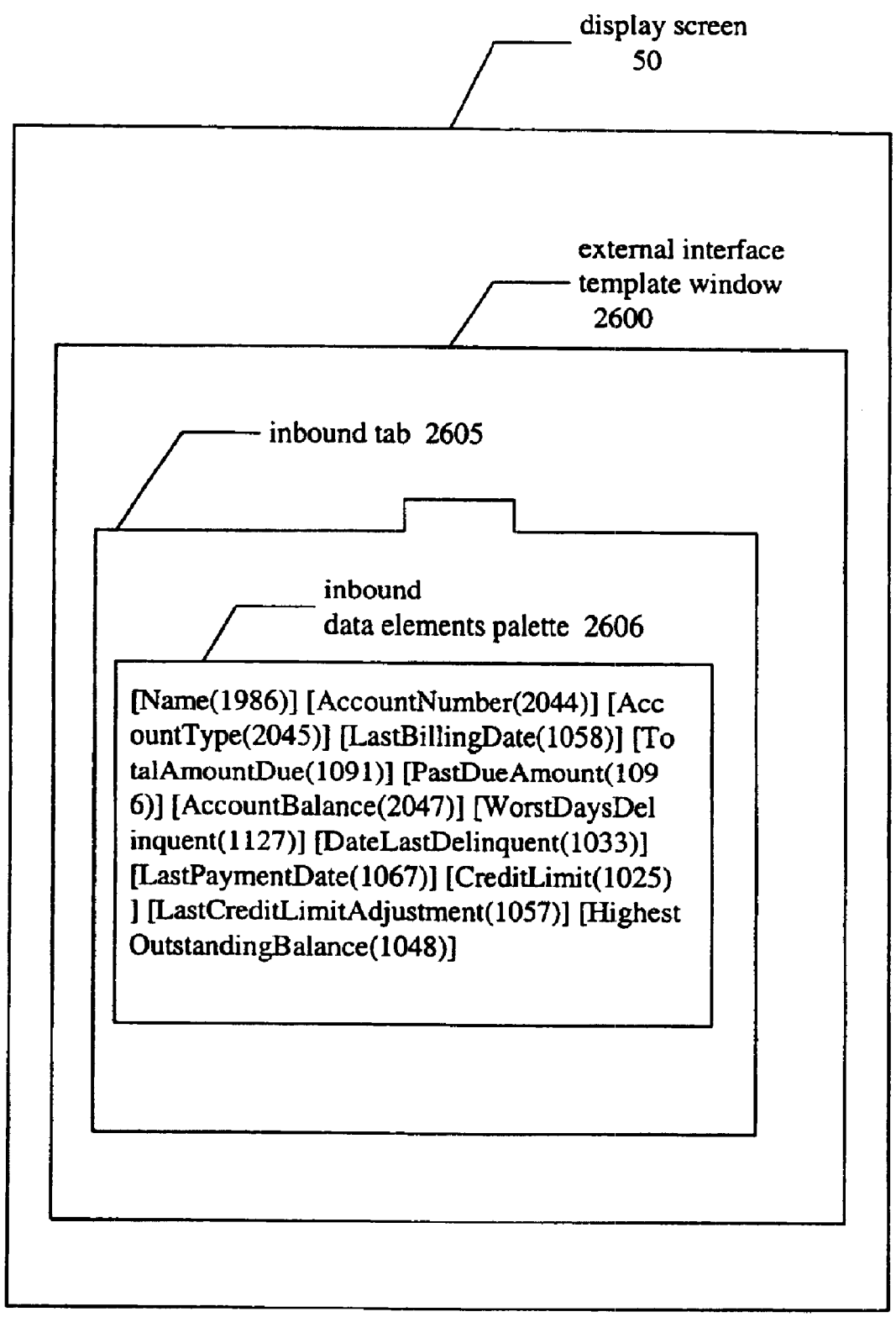
FIG. 28 is an illustration of an inbound tab of an external interface template window which is suitable for implementing various embodiments.

FIG. 28: Inbound Tab of an External Interface Template Window

FIG. 28 illustrates the inbound tab 2605 of the external interface template window 2600 according to one embodiment. The inbound tab 2605 of the external interface template window 2600 may include an inbound data elements palette 2606. The external interface template window 2600 may be displayed within a display screen 50. The display screen 50 may be connected to the computer system 10, of FIG. 1a. In one embodiment, where the financial service organization application is a collection system for delinquent accounts and the task to be invoked by the external interface is to obtain a credit report from a credit bureau company on a particular customer, the inbound data elements palette 2606 may include information about the particular customer, such as: name, account number, account type, last billing date, total amount due, past due amount, account balance, worst day delinquent, date last delinquent, last payment date, credit limit, last credit limit adjustment, and highest outstanding balance. Data elements may be dragged from a list of data elements and dropped onto the inbound data elements palette 2606. When a data element is dropped onto the inbound data elements palette 2606, the data element may be represented on the inbound data elements palette 2606 by a combination of the data element name and the data element unique identifier, with the data element unique identifier surrounded by a pair of parenthesis and the combination of the data element name and the data element unique identifier surrounded by a pair of brackets. A single space may, separate one data element from the next on the inbound data elements palette 2606.

Figure 29:
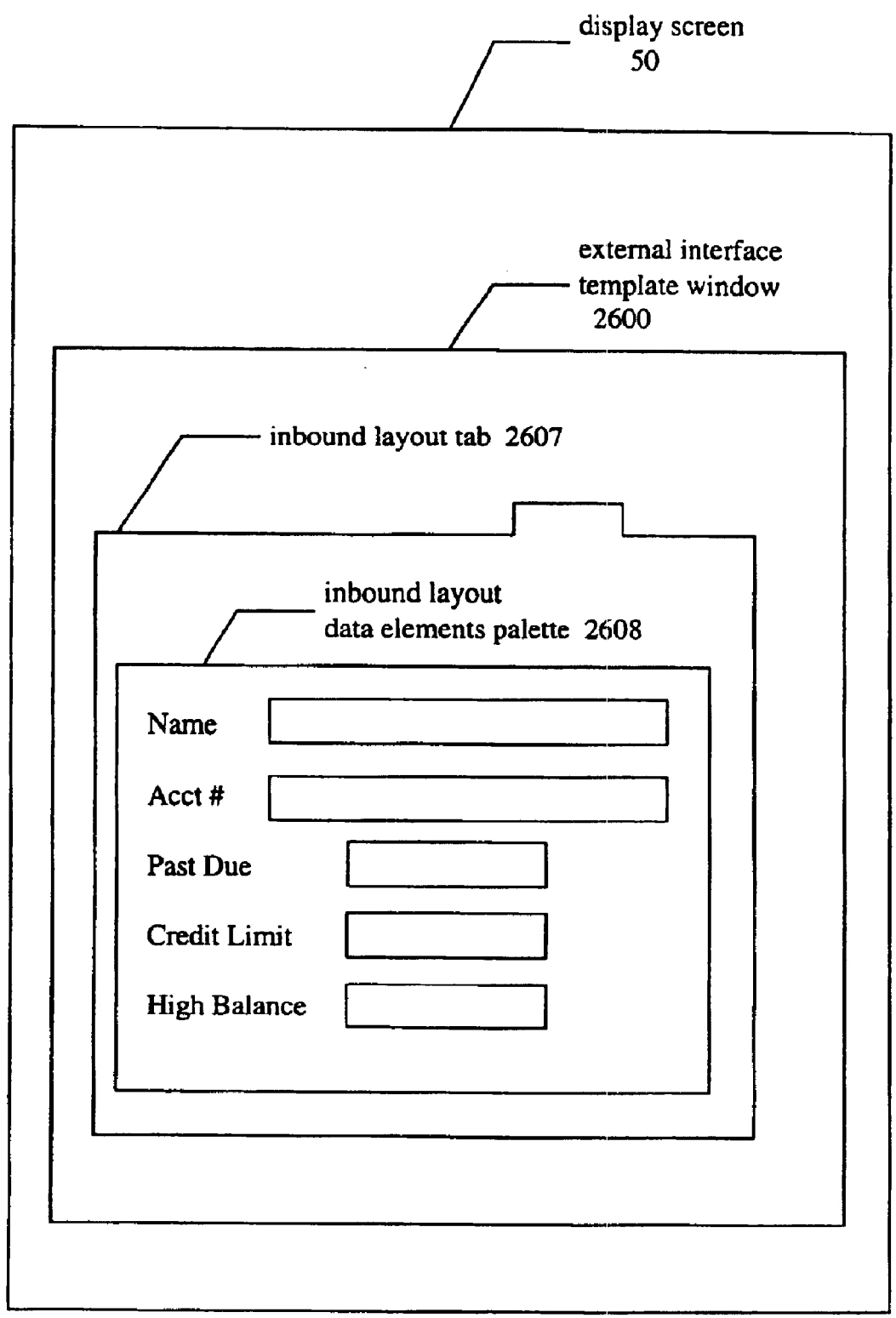
FIG. 29 is an illustration of an inbound layout tab of an external interface template window which is suitable for implementing various embodiments.

FIG. 29: Inbound Layout Tab of an External Interface Template Window

FIG. 29 illustrates the inbound layout tab 2607 of the external interface template window 2600 according to one embodiment. The inbound layout tab 2607 of the external interface template window 2600 may include an inbound layout data elements palette 2608. The external interface template window 2600 may be displayed within a display screen 50. The display screen 50 may be connected to the computer system 10, of FIG. 1a. In one embodiment, where the financial service organization application is a collection system for delinquent accounts and the task to be invoked by the external interface is to obtain a credit report from a credit bureau company on a particular customer, the inbound layout data elements palette 2608 may include information about the particular customer, such as: name, account number, past due amount, credit limit, and highest outstanding balance. Data elements may be dragged from a list of data elements and dropped onto the inbound layout data elements palette 2608. When a data element is dropped onto the inbound layout data elements palette 2608, the data element may be represented on the inbound layout data elements palette 2608 by a user-specified adjustment of the data element name (e.g., adjusting the data element name "HighestOutstandingBalance" to "High Balance") and a display field for the value of the "HighestOutstandingBalance" data element. One advantage of allowing the user to specify an adjustment of the data element name is that the layout of the inbound message is more readable than if it were a continuous string of alphanumeric characters.

Figure 30:
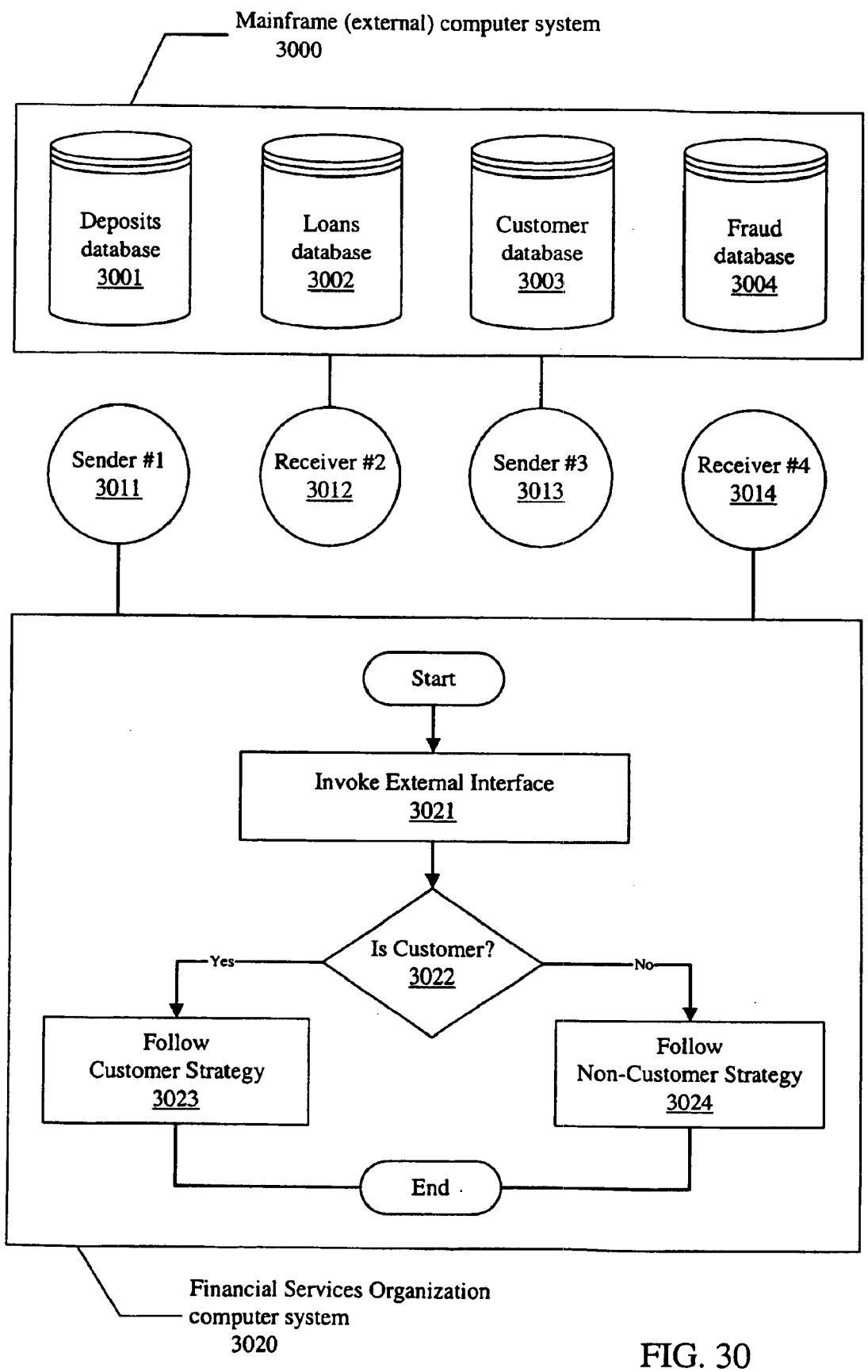
FIG. 30 is a block diagram illustrating an overview of an external interface on a financial service organization computer system requesting data from an external computer system according to one embodiment.

FIG. 30:
Overview of an External Interface Requesting Data from an External Computer System FIG. 30 illustrates an embodiment where the financial service organization application is a credit card application. The financial service organization computer system 3020 may include the financial service organization credit card application. The first step in the financial service organization credit card application may be to invoke an external interface, in step 3021. The task to be invoked by the external interface is to determine if the customer requesting a new credit card has any pre-existing accounts (e.g., checking account, savings account) with the financial service organization. This task may be accomplished by the financial service organization computer system 3020 sending an outbound message 3011 to the mainframe computer system 3000. This outbound message 3011 may include a customer number. The mainframe computer system 3000 receives the outbound message 3012, and checks each of its databases: deposits database 3001, loans database 3002, customer database 3003, and fraud database 3004, looking for the customer number provided. The mainframe computer system 3000 then sends any information found in an inbound message 3013 to the financial service organization computer system 3020. The financial service organization computer system 3020 receives the inbound message 3014, and determines if the customer has any pre-existing accounts with the financial service organization. If the customer is a preexisting customer of the financial service organization, then the customer strategy in step 3023 is followed; otherwise the non-customer strategy in step 3024 is followed.

Various embodiments further include receiving or storing instructions and/or data implemented in accordance with the foregoing description upon a carrier medium. Suitable carrier media include storage media or memory media such as magnetic or optical ,media, e.g., disk or CD-ROM, as well as signals such as electrical, electromagnetic, or digital signals, conveyed via a communication medium such as networks and/or a wireless link.

Although the system and method of the present invention have been described in connection with several embodiments, the invention is not intended to be limited to the a specific forms set forth herein, but on the contrary, it is intended to cover such alternatives, modifications, and equivalents as can be reasonably included within the spirit and scope of the invention as defined by the appended claims.

What is claimed is:

1. A method comprising:

displaying a first outbound message template on a display screen, wherein the first outbound message template represents a first outbound message, wherein the first outbound message represents a request for financial service organization data to be used in a financial service organization computer system for processing a financial service organization transaction between a financial service organization and a financial service organization customer, wherein the first outbound message is configured for transmission between the financial service organization computer system and an external computer system that stores the financial service organization data, and wherein the external computer system is in data communication with the financial service organization computer system;

displaying a list of outbound data elements on the display screen, wherein each outbound data element represents data necessary to access the financial service organization data from the external computer system;

selecting a first outbound data element from the displayed list of outbound data elements;

adding the selected first outbound data element to the first outbound message template;

storing the first outbound message template in a database after the selected first outbound data element is added to the first outbound message template;

displaying a first channel template on a display screen, wherein the first channel template represents a first channel, wherein the first channel represents a means for transmitting data to and from the external computer system, and wherein the first channel is configured for transmitting data between the financial service organization computer system and the external computer system that stores the financial service organization data;

specifying a first translator on the first channel template wherein the first translator is configured to convert the first outbound message template to a format recognizable to the external computer system; and storing the first channel template in the database after the first translator is specified on the first channel template.

2. The method of claim 1, wherein adding comprises dragging and dropping the selected first outbound data element.

3. The method of claim 1, further comprising:

displaying a first inbound message template on the display screen, wherein the first inbound message template represents a first inbound message wherein the first inbound message contains financial service organization data to be used in the financial service organization computer system for processing the financial service organization transaction between the financial service organization and the financial service organization customer, wherein the first inbound message is configured for transmission between the external computer system that stores the financial service organization data and the financial service organization computer system, and wherein the external computer system is in data communication with the financial service organization computer system;

displaying a list of inbound data elements on the display screen, wherein each inbound data element represents financial service organization data retrieved from the external computer system based on the data sent to the external computer system;

selecting a first inbound data element from the displayed list of inbound data elements;

adding the selected first inbound data element to the first inbound message template;

storing the first inbound message template in the database after the selected first inbound data element is added to the first inbound message template.

4. The method of claim 3, wherein adding the selected first inbound data element to the first inbound message template comprises dragging and dropping the selected first inbound data element.

5. The method of claim 1, further comprising:

displaying an outbound message layout template on the display screen, wherein the outbound message layout template represents a graphical presentation of the outbound message;

displaying a list of outbound layout elements on the display screen;

selecting a first outbound layout element from the displayed list of outbound data elements;

adding the selected first outbound layout element to the outbound message layout template;

storing the outbound message layout template in the database after the selected first outbound layout element is added to the outbound message layout template.

6. The method of claim 5, further comprising:
  displaying an inbound message layout template on the display screen, wherein the inbound message layout template represents a graphical presentation of the inbound message;
  displaying a list of inbound layout elements on the display screen;
  selecting the first inbound layout element from the displayed list of inbound data elements;
  adding the selected first inbound layout element to the inbound message layout template;
  storing the inbound message layout template in the database after the selected first inbound layout element is added to the inbound message layout template.

7. The method of claim 1, further comprising:
  displaying a strategy design template on the display screen, wherein the strategy design template represents a process for processing the financial service organization transaction between the financial service organization and the financial service organization customer, the process comprising a plurality of tasks, wherein the tasks are executed in a sequential order;
  displaying a plurality of tasks on the display screen;
  selecting a first of the plurality of displayed tasks;
  adding the selected first task to the process;
  storing the strategy design template in the database after the selected first task is added to the strategy design template.

8. The method of claim 7 wherein adding the selected first task to the process further comprises:
  inserting the selected first task either before or after an existing ordered task of the plurality of ordered tasks;
  displaying a plurality of pairs of outbound and inbound template message identifiers on the display screen, wherein the plurality of pairs of outbound and inbound template message identifiers comprise a first pair of outbound and inbound template message identifiers wherein the first pair of outbound and inbound template message identifiers represent the first outbound message request and the first inbound message receipt;
  selecting the first pair of outbound and inbound template message identifiers;
  adding the selected first pair of outbound and inbound template message identifiers to the selected first task;
  storing the selected first task in the database after the first pair of outbound and inbound template message identifiers is added to the selected first task.

9. The method of claim 7, further comprising:
  displaying a plurality of channels on the display screen;
  selecting the first channel of the plurality of channels;
  adding the selected first channel to the selected first task;
  storing the selected first task in the database after the first channel is added to the selected first task.

10. The method of claim 1, further comprising specifying a first queue handler on the first channel template wherein the first queue handler when contained in the first channel is configured to move translated messages between a financial service organization computer system queue and an external computer system queue.

11. The method of claim 1, wherein the financial service organization transaction further comprises an application for a financial service organization product or service.

12. The method of claim 1, wherein the financial service organization transaction further comprises one or more actions to be taken by the financial service organization in response to a customer's delinquency status relating to an existing financial service organization product or service.

13. A system comprising:
  a network;
  a CPU coupled to the network;
  a system memory coupled to the CPU, wherein the system memory stores one or more computer programs executable by the CPU; wherein the computer programs are executable to:
    display a first outbound message template on a display screen, wherein the first outbound message template represents a first outbound message, wherein the first outbound message represents a request for financial service organization data to be used in a financial service organization computer system for processing a financial service organization transaction between a financial service organization and a financial service organization customer, wherein the first outbound message is configured for transmission between the financial service organization computer system and an external computer system that stores the financial service organization data, and wherein the external computer system is in data communication with the financial service organization computer system;
    display a list of outbound data elements on the display screen, wherein each
    outbound data element represents data necessary to access the financial service organization data from the external computer system;
    select a first outbound data element from the displayed list of outbound data elements;
    add the selected first outbound data element to the first outbound message template;
    store the first outbound message template in a database after the selected first outbound data element is added to the first outbound message template;
    display a first channel template on a display screen, wherein the first channel template represents a first channel, wherein the first channel represents a means for transmitting data to and from the external computer system, and wherein the first channel is configured for transmitting data between the financial service organization computer system and the external computer system that stores the financial service organization data;
    specify a first translator on the first channel template wherein the first translator is configured to convert the first outbound message template to a format recognizable to the external computer system; and
    store the first channel template in the database after the first translator is specified on the first channel template.

14. The system of claim 13, wherein the computer programs are further executable to:
  display a first inbound message template on the display screen, wherein the first inbound message template represents a first inbound message wherein the first inbound message represents a receipt of financial service organization data to be used in the financial service organization computer system for processing the financial service organization transaction between the financial service organization and the financial service organization customer, wherein the first inbound message is configured for transmission between the external computer system that stores the financial service organization data and the financial service organization computer system, and wherein the external computer system is in data communication with the financial service organization computer system;

display a list of inbound data elements on the display screen, wherein each inbound data element represents financial service organization data retrieved from the external computer system based on the data sent to the external computer system;

select a first inbound data element from the displayed list of inbound data elements;

add the selected first inbound data element to the first inbound message template;

store the first inbound message template in the database after the selected first inbound data element is added to the first inbound message template.

15. The system of claim 13, wherein the computer programs are further executable to:

display an outbound message layout template on the display screen, wherein the outbound message layout template represents a graphical presentation of the outbound message;

display a list of outbound layout elements on the display screen;

select the first outbound layout element from the displayed list of outbound layout elements;

add the selected first outbound layout element to the outbound message layout template;

store the outbound message layout template in the database after the selected first outbound layout element is added to the outbound message layout template.

16. The system of claim 15, wherein the computer programs are further executable to:

display an inbound message layout template on the display screen, wherein the inbound message layout template represents a graphical presentation of the inbound message;

display a list of inbound layout elements on the display screen;

select the first inbound layout element from the displayed list of inbound layout elements;

add the selected first inbound layout element to the inbound message layout template;

store the inbound message layout template in the database after the selected first inbound layout element is added to the inbound message layout template.

17. The system of claim 13, wherein the computer programs are further executable to:

display a strategy design template on the display screen, wherein the strategy design template represents a process for processing the financial service organization transaction between the financial service organization and the financial service organization customer, the process comprising a plurality of tasks, wherein the tasks are executed in a sequential order;

display a plurality of tasks on the display screen;

select a first of the plurality of displayed tasks;

add the selected first task to the process;

store the strategy design template in the database after the selected first task is added to the strategy design template.

18. The system of claim 17, wherein in adding the selected first task to the process, the computer programs are further executable to:

insert the selected first task either before or after an existing ordered task of the plurality of ordered tasks;

display a plurality of pairs of outbound and inbound template message identifiers on the display screen, wherein the plurality of pairs of outbound and inbound template message identifiers comprise a first pair of outbound and inbound template message identifiers wherein the first pair of outbound and inbound template message identifiers represent the first outbound message request and the first inbound message receipt;

select the first pair of outbound and inbound template message identifiers;

add the selected first pair of outbound and inbound template message identifiers to the selected first task;

store the selected first task in the database after the first pair of outbound and inbound template message identifiers is added to the selected first task.

19. The system of claim 17, wherein the computer programs are further executable to:

display a plurality of channels on the display screen;

select the first channel of the plurality of channels;

add the selected first channel to the selected first task;

store the selected first task in the database after the first channel is added to the selected first task.

20. The system of claim 13, wherein the computer programs are further executable to specify a first queue handler on the first channel template wherein the first queue handler when contained in the first channel is configured to move translated messages between a financial service organization computer system queue and an external computer system queue.

21. A carrier medium which stores program instructions, wherein the program instructions are executable to implement:

displaying a first outbound message template on a display screen, wherein the first outbound message template represents a first outbound message wherein the first outbound message represents a request for financial service organization data to be used in a financial service organization computer system for processing a financial service organization transaction between a financial service organization and a financial service organization customer, wherein the first outbound message is configured for transmission between the financial service organization computer system and an external computer system that stores the financial service organization data, and wherein the external computer system is in data communication with the financial service organization computer system;

displaying a list of outbound data elements on the display screen, wherein each outbound data element represents data necessary to access the financial service organization data from the external computer system;

selecting a first outbound data element from the displayed list of outbound data elements;

adding the selected first outbound data element to the first outbound message template;

storing the first outbound message template in a database after the selected first outbound data element is added to the first outbound message template;

displaying a first channel template on a display screen, wherein the first channel template represents a first channel, wherein the first channel represents a means for transmitting data to and from the external computer system, and wherein the first channel is configured for transmitting data between the financial service organization computer system and the external computer system that stores the financial service organization data;

specifying a first translator on the first channel template wherein the first translator is configured to convert the first outbound message template to a format recognizable to the external computer system; and storing the first channel template in the database after the first translator is specified on the first channel template.

22. The carrier medium of claim 21, wherein the program instructions are further executable to implement:

displaying a first inbound message template on the display screen, wherein the first inbound message template represents a first inbound message wherein the first inbound message represents a receipt of financial service organization data to be used in the financial service organization computer system for processing the financial service organization transaction between the financial service organization and the financial service organization customer, wherein the first inbound message is configured for transmission between the external computer system that stores the financial service organization data and the financial service organization computer system, and wherein the external computer system is in data communication with the financial service organization computer system;

displaying a list of inbound data elements on the display screen, wherein each inbound data element represents financial service organization data retrieved from the external computer system based on the data sent to the external computer system;

selecting a first inbound data element from the displayed list of inbound data elements;

adding the selected first inbound data element to the first inbound message template;

storing the first inbound message template in the database after the selected first inbound data element is added to the first inbound message template.

23. The carrier medium of claim 22, wherein the program instructions are further executable to implement:

displaying an outbound message layout template on the display screen, wherein the outbound message layout template represents a graphical presentation of the outbound message;

displaying a list of outbound layout elements on the display screen;

selecting the first outbound layout element from the displayed list of outbound layout elements;

adding the selected first outbound layout element to the outbound message layout template;

storing the outbound message layout template in the database after the selected first outbound layout element is added to the outbound message layout template.

24. The carrier medium of claim 23, wherein the program instructions are further executable to implement:

displaying an inbound message layout template on the display screen, wherein the inbound message layout template represents a graphical presentation of the inbound message;

displaying a list of inbound layout elements on the display screen;

selecting the first inbound layout element from the displayed list of inbound layout elements;

adding the selected first inbound layout element to the inbound message layout template;

storing the inbound message layout template in the database after the selected first inbound layout element is added to the inbound message layout template.

25. The carrier medium of claim 21, wherein the program instructions are further executable to implement:

displaying a strategy design template on the display screen, wherein the strategy design template represents a process for processing the financial service organization transaction between the financial service organization and the financial service organization customer, the process comprising a plurality of tasks, wherein the tasks are executed in a sequential order;

displaying a plurality of tasks on the display screen;

selecting a first of the plurality of displayed tasks;

adding the selected first task to the process;

storing the strategy design template in the database after the selected first task is added to the strategy design template.

26. The carrier medium of claim 25, wherein in adding the selected first task to the process, the program instructions are further executable to implement:

inserting the selected first task either before or after an existing ordered task of the plurality of ordered tasks;

displaying a plurality of pairs of outbound and inbound template message identifiers on the display screen, wherein the plurality of pairs of outbound and inbound template message identifiers comprise a first pair of outbound and inbound template message identifiers wherein the first pair of outbound and inbound template message identifiers represent the first outbound message request and the first inbound message receipt;

selecting the first pair of outbound and inbound template message identifiers;

adding the selected first pair of outbound and inbound template message identifiers to the selected first task;

storing the selected first task in the database after the first pair of outbound and inbound template message identifiers is added to the selected first task.

27. The carrier medium of claim 25, wherein the program instructions are further executable to implement:

displaying a plurality of channels on the display screen;

selecting the first channel of the plurality of channels;

adding the selected first channel to the selected first task;

storing the selected first task in the database after the first channel is added to the selected first task.

28. The carrier medium of claim 21, wherein the program instructions are further executable to implement:

specifying a first queue handler on the first channel template wherein the first queue handler when contained in the first channel is configured to move translated messages between a financial service organization computer system queue and an external computer system queue.

* * * * *